United States Patent [19]
Yamamoto et al.

[11] Patent Number: 6,058,095
[45] Date of Patent: May 2, 2000

[54] OBJECTIVE LENS HAVING A DOUBLET LENS WITH HIGH NUMERICAL APERTURE

[75] Inventors: Kenji Yamamoto, Tokyo; Isao Ichimura, Kanagawa; Fumisada Maeda, Tokyo; Toshio Watanabe, Kanagawa; Kiyoshi Ohsato, Chiba, all of Japan

[73] Assignee: Sony Corporation, Tokyo, Japan

[21] Appl. No.: 08/957,427

[22] Filed: Oct. 24, 1997

[30] Foreign Application Priority Data

Oct. 24, 1996 [JP] Japan .................................. P08-282750

[51] Int. Cl.⁷ ................................. G11B 7/00; G02B 3/02
[52] U.S. Cl. .................. 369/112; 369/44.23; 369/44.32; 359/365; 359/796
[58] Field of Search .................................... 369/112, 44.14, 369/44.23, 44.24, 44.32; 359/565, 566, 569, 571, 664, 822, 819, 708, 712, 570, 743, 362, 744, 399, 365, 796

[56] References Cited

U.S. PATENT DOCUMENTS

| | | | |
|---|---|---|---|
| 4,953,959 | 9/1990 | Ishiwata et al. | 359/708 |
| 4,973,832 | 11/1990 | Marchant et al. | 250/201.5 |
| 5,050,970 | 9/1991 | Kittaka | 359/653 |
| 5,204,781 | 4/1993 | Ishibai et al. | 359/708 |
| 5,241,423 | 8/1993 | Chiu et al. | 359/727 |
| 5,349,471 | 9/1994 | Morris et al. | 359/565 |
| 5,444,569 | 8/1995 | Broome | 359/365 |
| 5,467,225 | 11/1995 | Manabe | 359/661 |
| 5,504,628 | 4/1996 | Borchard | 359/796 |
| 5,555,131 | 9/1996 | Horton | 359/661 |
| 5,764,613 | 6/1998 | Yamamoto et al. | 369/112 |
| 5,774,281 | 6/1998 | Maeda et al. | 359/822 |
| 5,790,323 | 8/1998 | Caplan et al. | 359/744 |
| 5,883,744 | 3/1999 | Maruyama | 359/565 |

FOREIGN PATENT DOCUMENTS

| | | |
|---|---|---|
| 0 727 777 A1 | 8/1996 | European Pat. Off. . |
| 195 34 638 A1 | 3/1996 | Germany . |
| 59-140414 | 8/1984 | Japan . |
| WO 96/03669 A1 | 2/1996 | WIPO . |

*Primary Examiner*—Tan Dinh
*Assistant Examiner*—Kim-Kwok Chu
*Attorney, Agent, or Firm*—Ronald P. Kananen; Rader, Fishman & Grauer

[57] ABSTRACT

An objective lens having a doublet structure and a number of apertures of 0.7 or more and an optical pickup apparatus having the objective lens to be adaptable to a optical recording medium having a high information recording density, the objective lens being structured such that at least one side is formed into a aspheric surface and the lens elements are made of low-diffusion glass having an Abbe's number of 40 or greater.

8 Claims, 55 Drawing Sheets

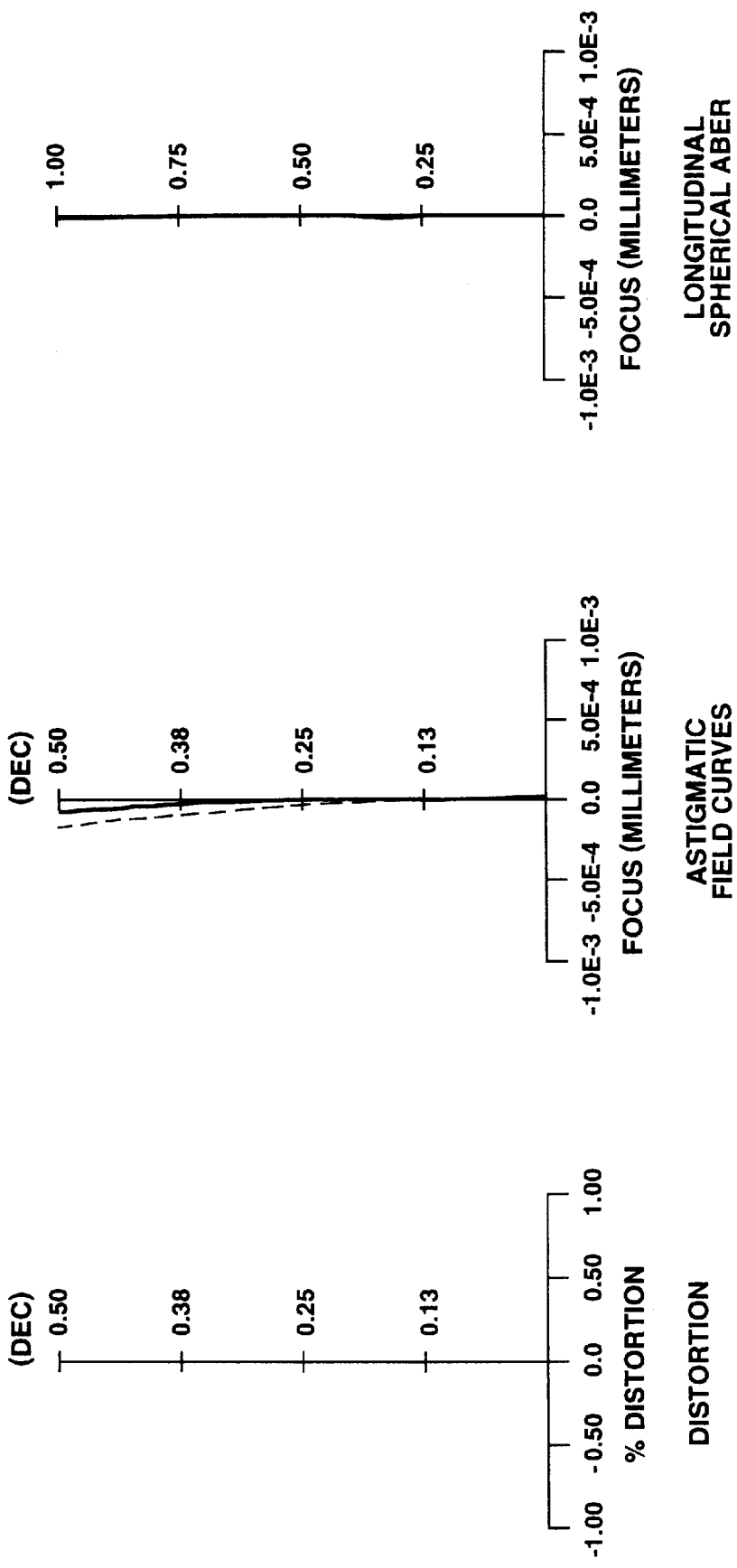

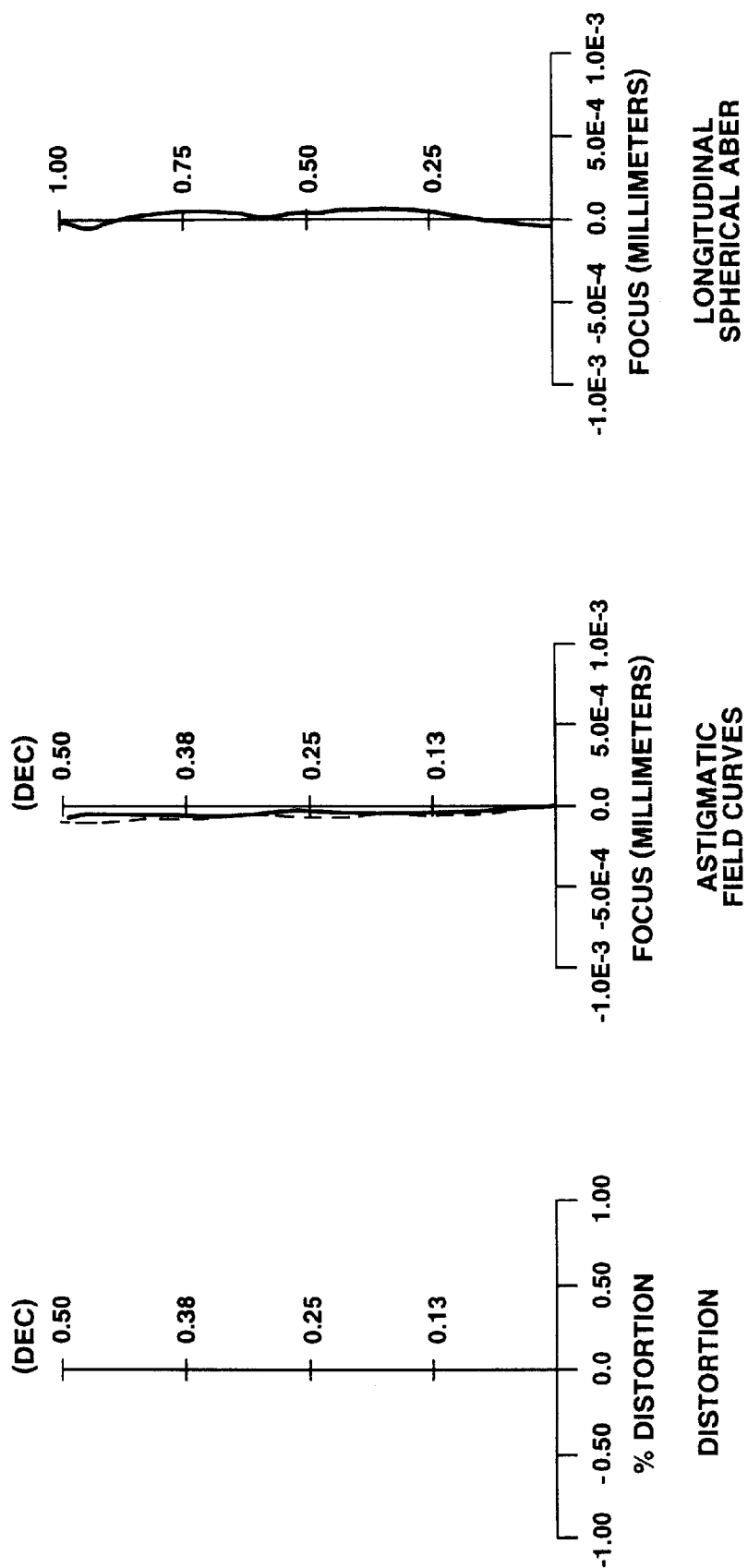

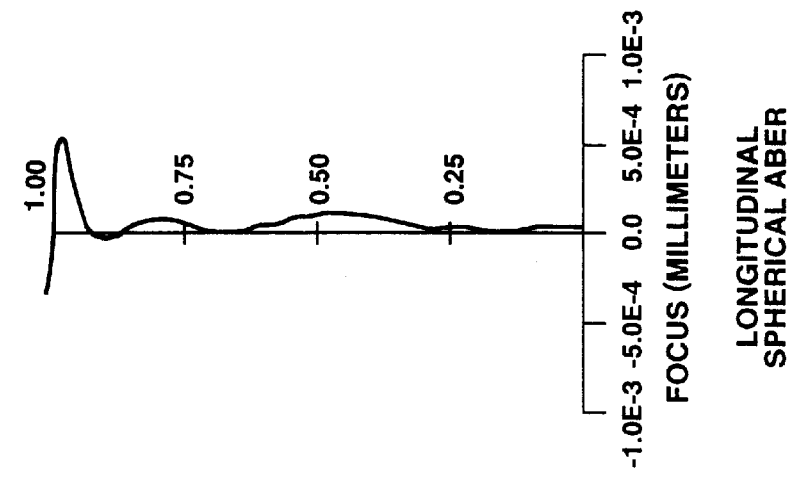
FIG. 18
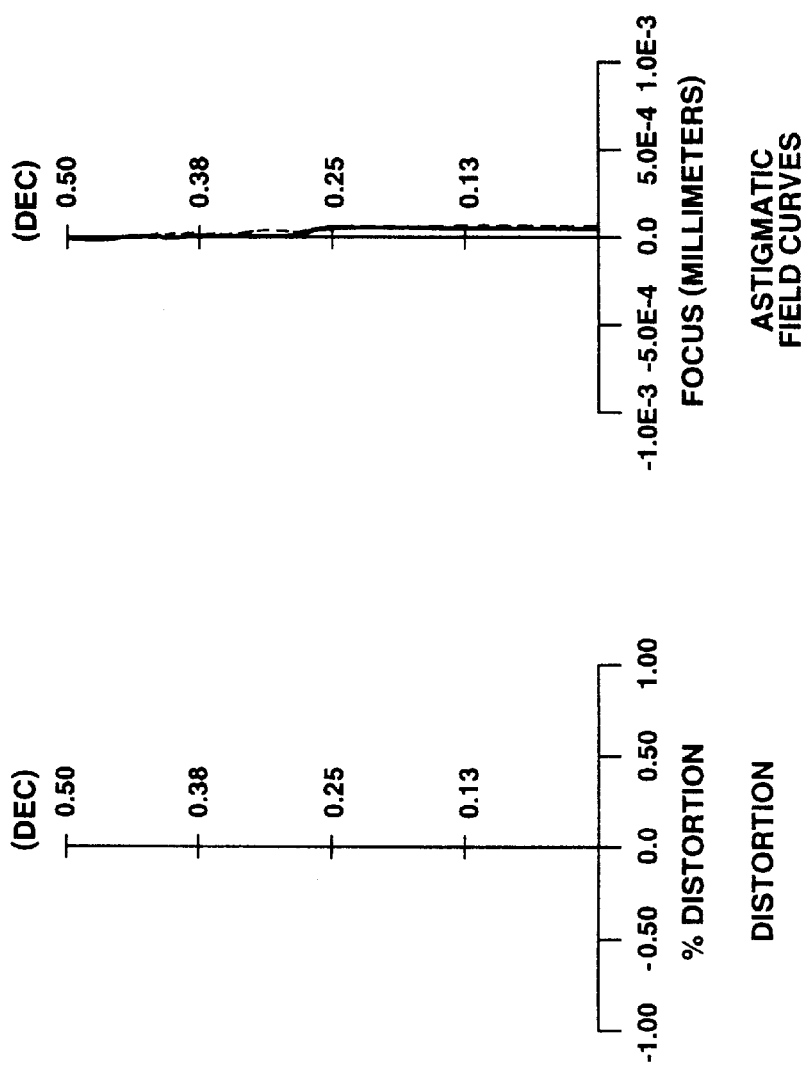
FIG. 17
FIG. 16

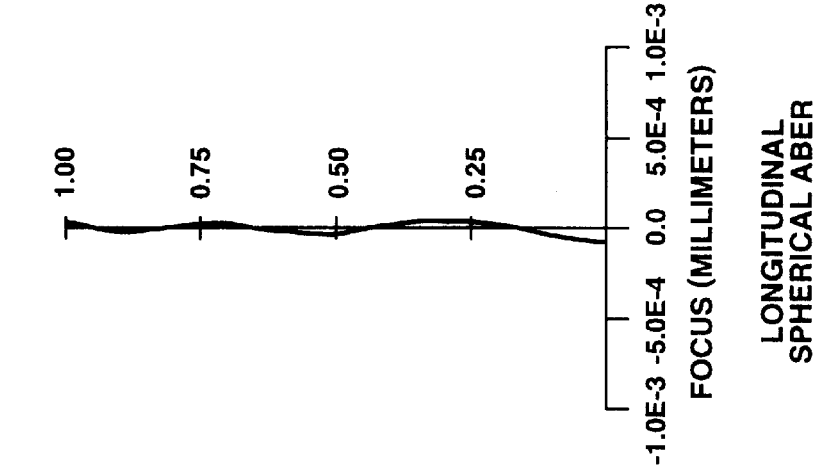
FIG. 41 LONGITUDINAL SPHERICAL ABER
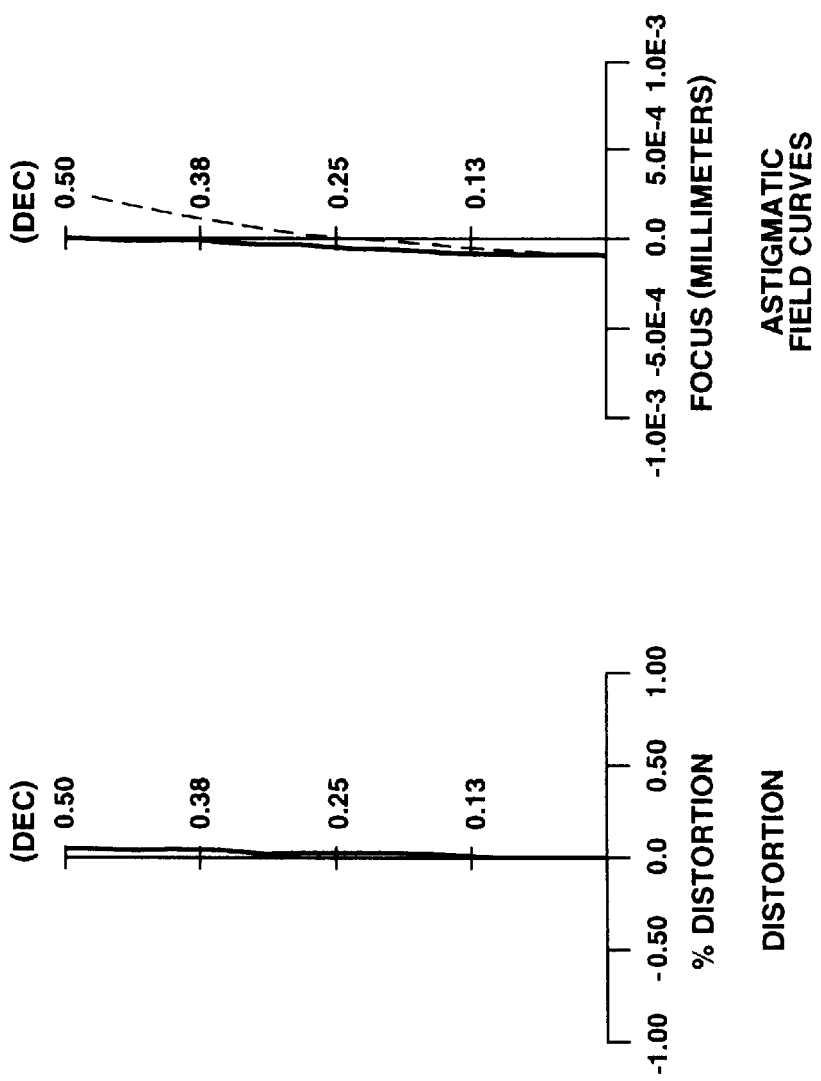
FIG. 40 ASTIGMATIC FIELD CURVES
FIG. 39 DISTORTION

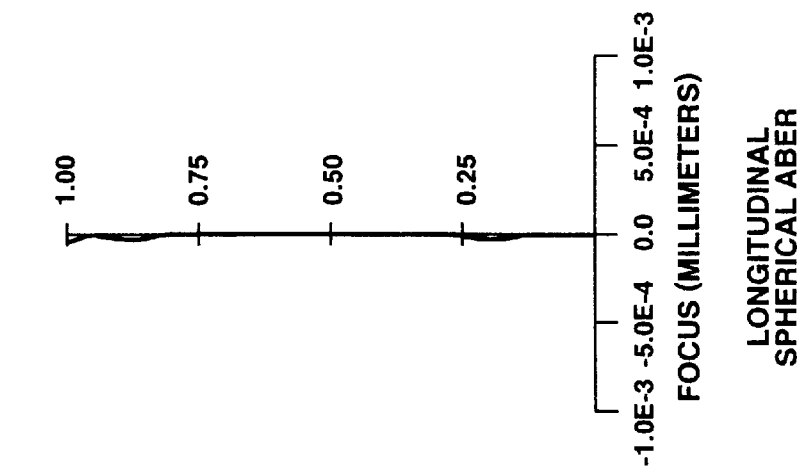
FIG. 47
FIG. 46
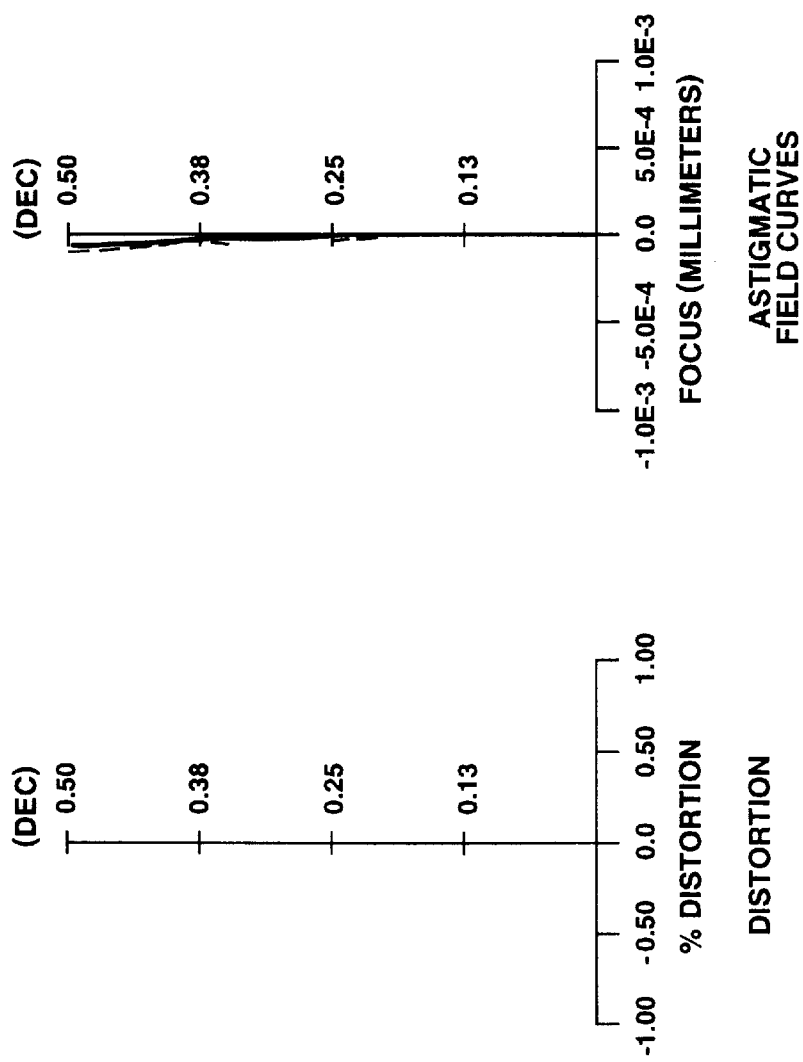
FIG. 45

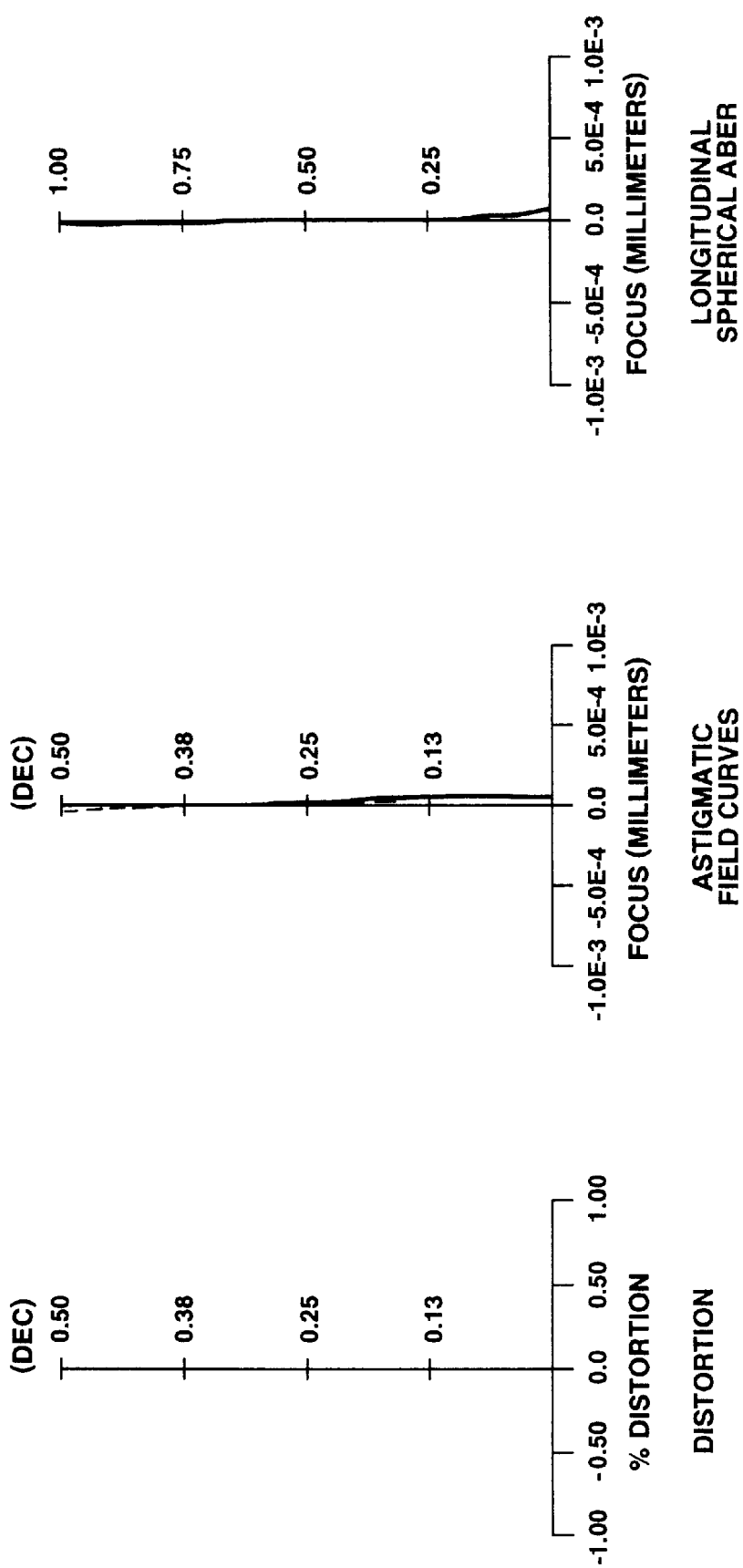

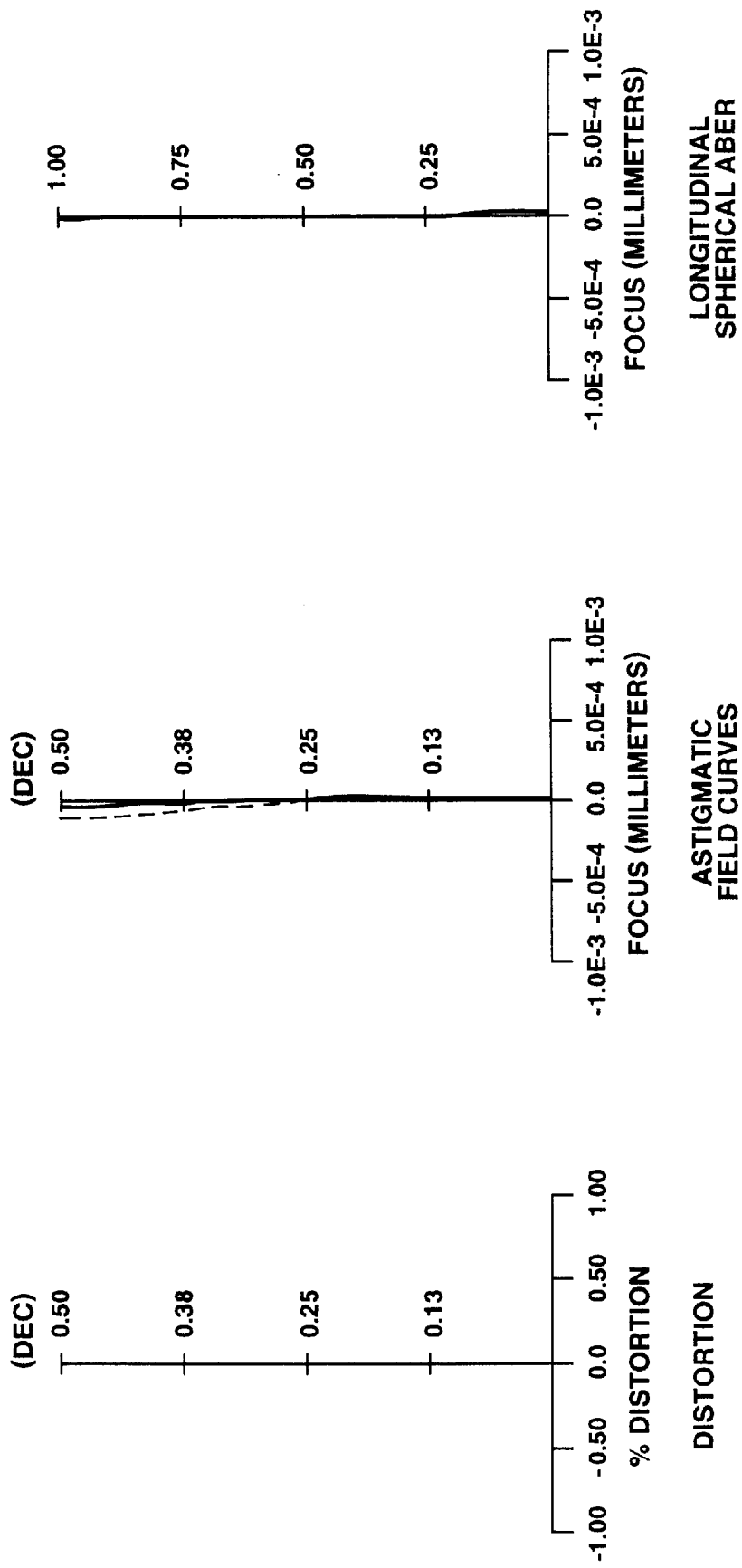
FIG.59 LONGITUDINAL SPHERICAL ABER
FIG.58 ASTIGMATIC FIELD CURVES
FIG.57 DISTORTION

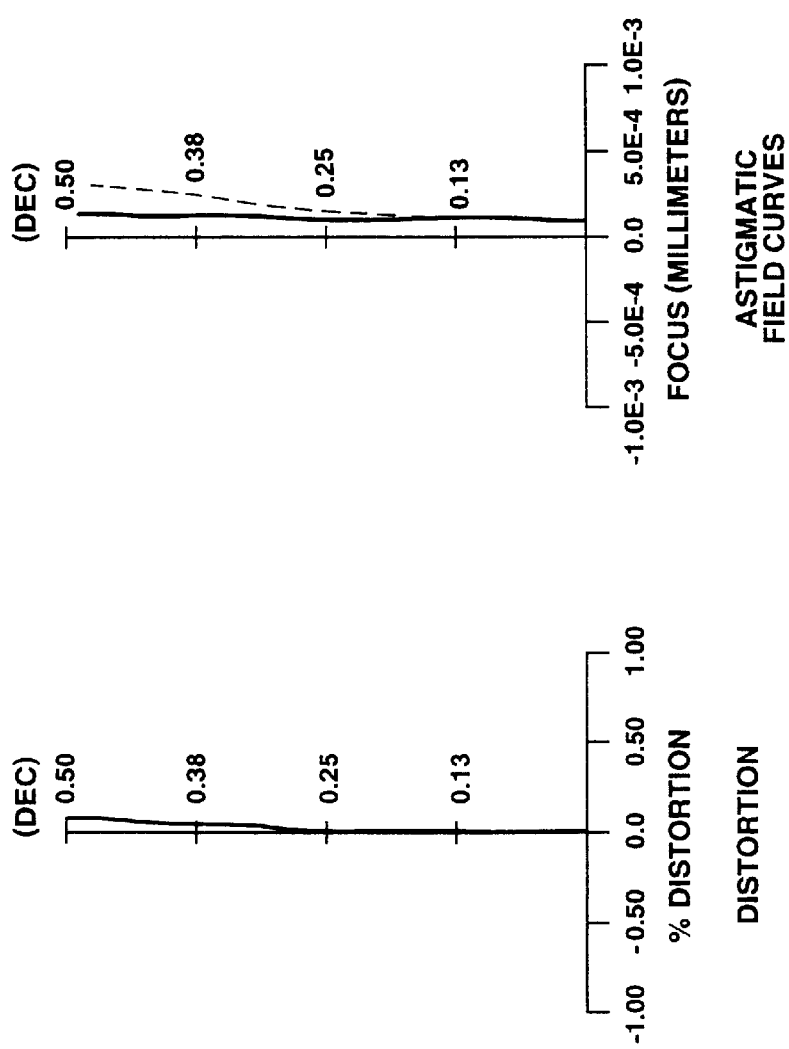
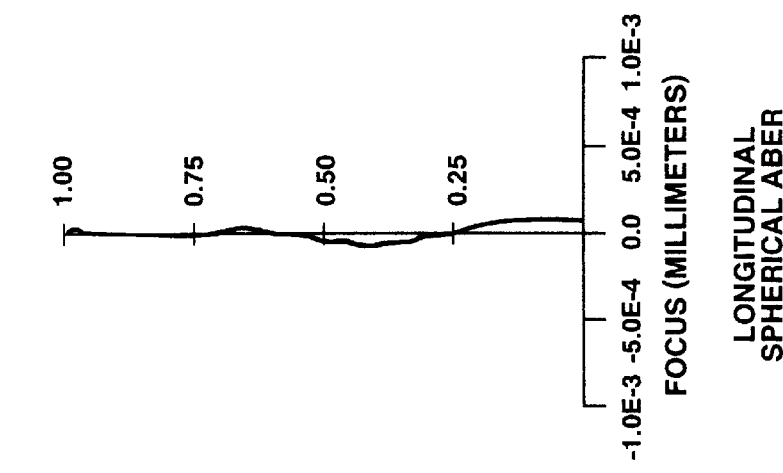
FIG. 65 LONGITUDINAL SPHERICAL ABER
FIG. 64 ASTIGMATIC FIELD CURVES
FIG. 63 DISTORTION

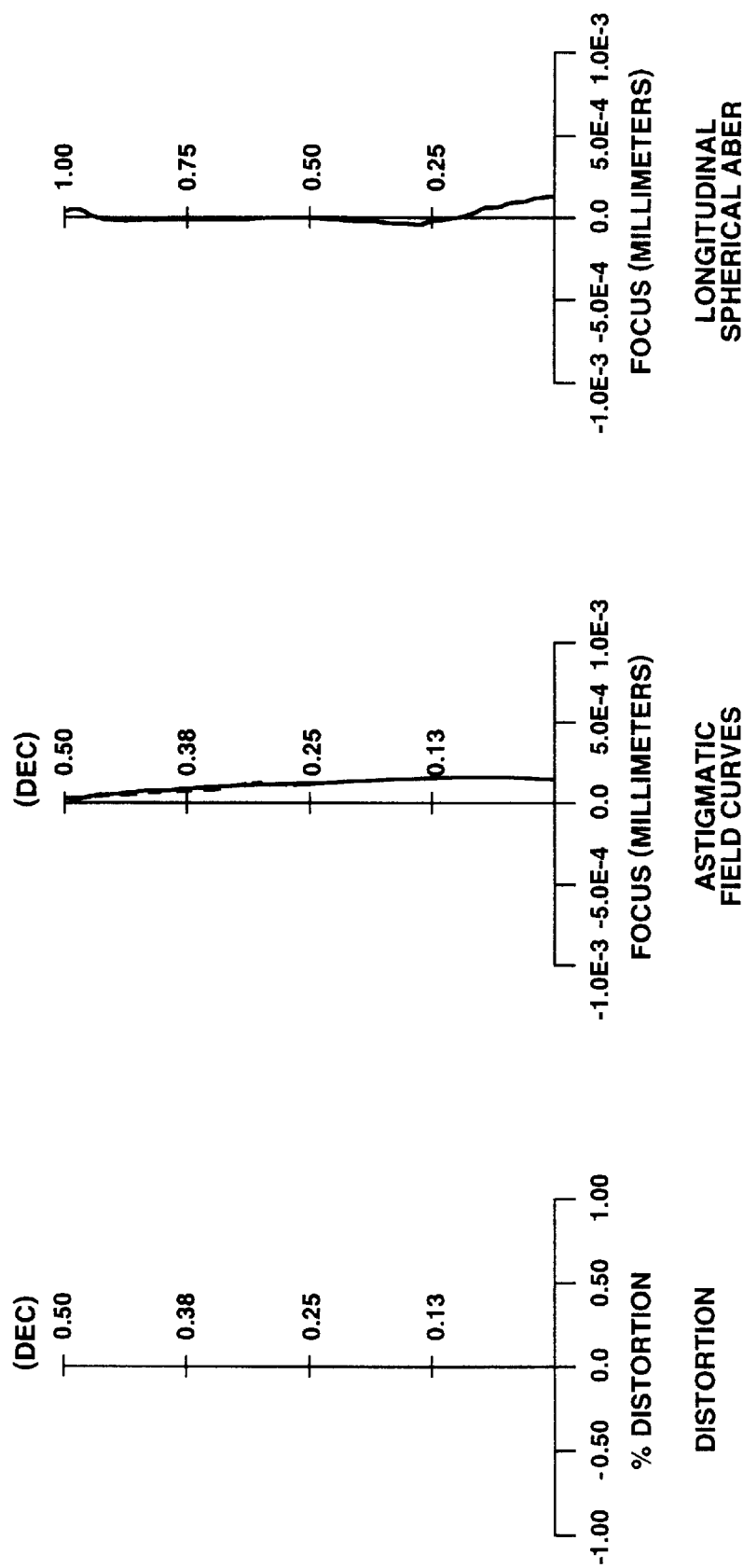

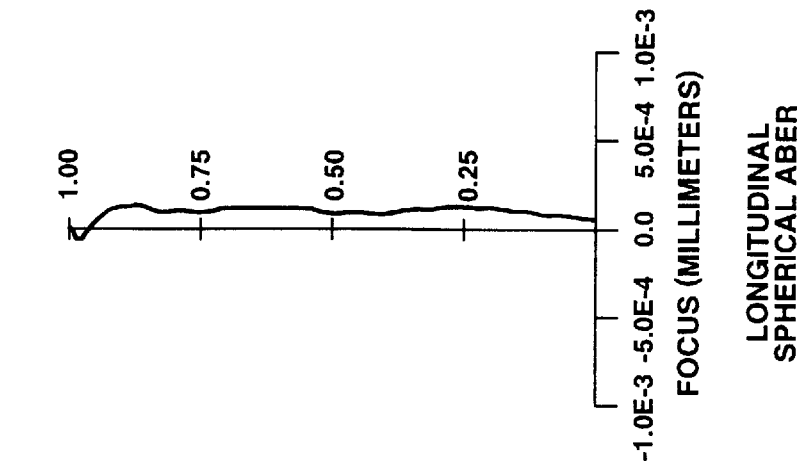
FIG. 77
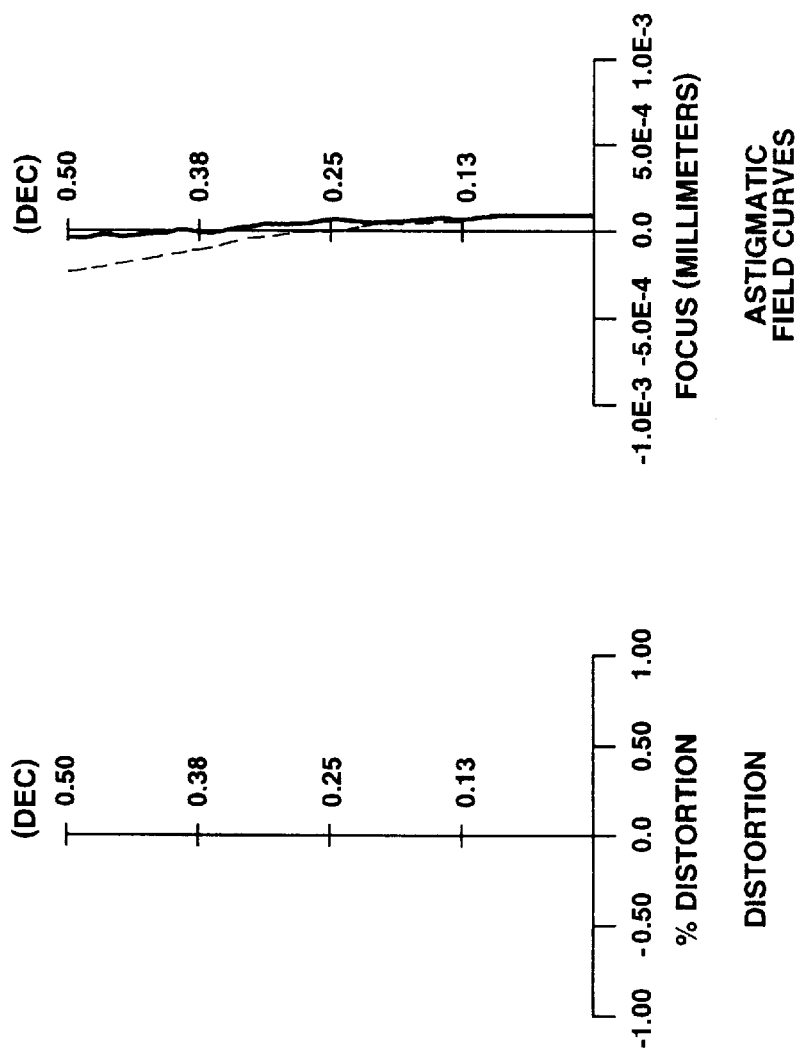
FIG. 76
FIG. 75

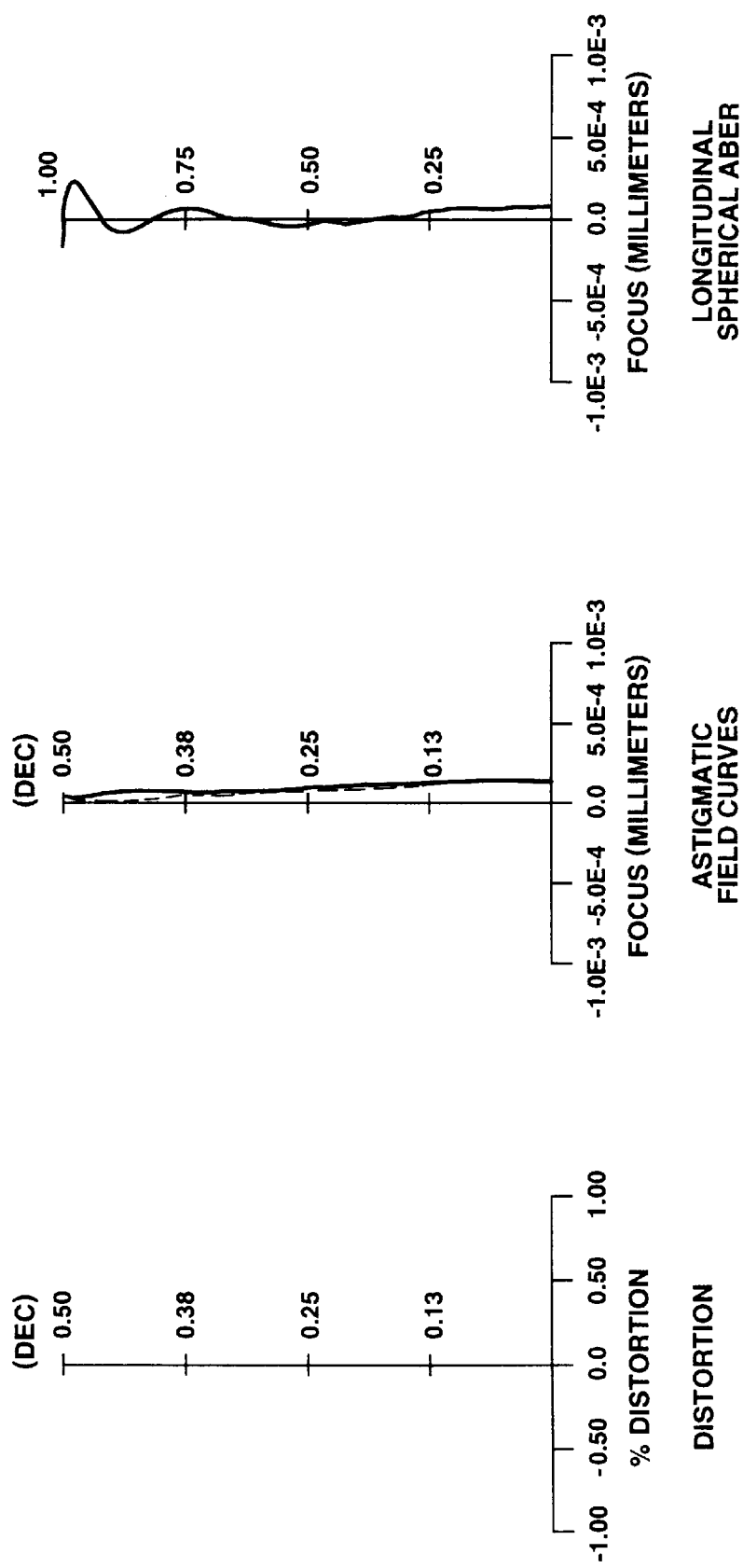

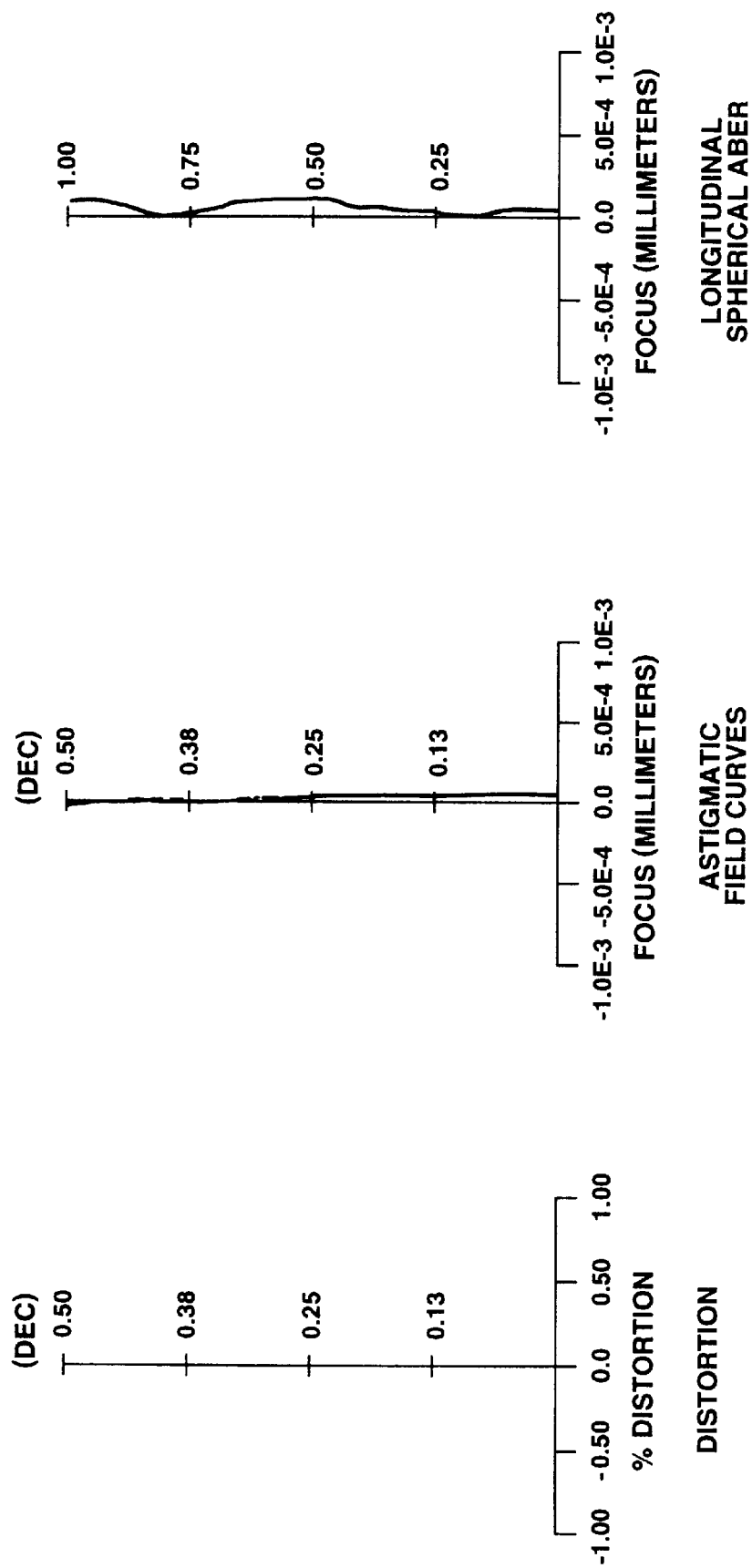

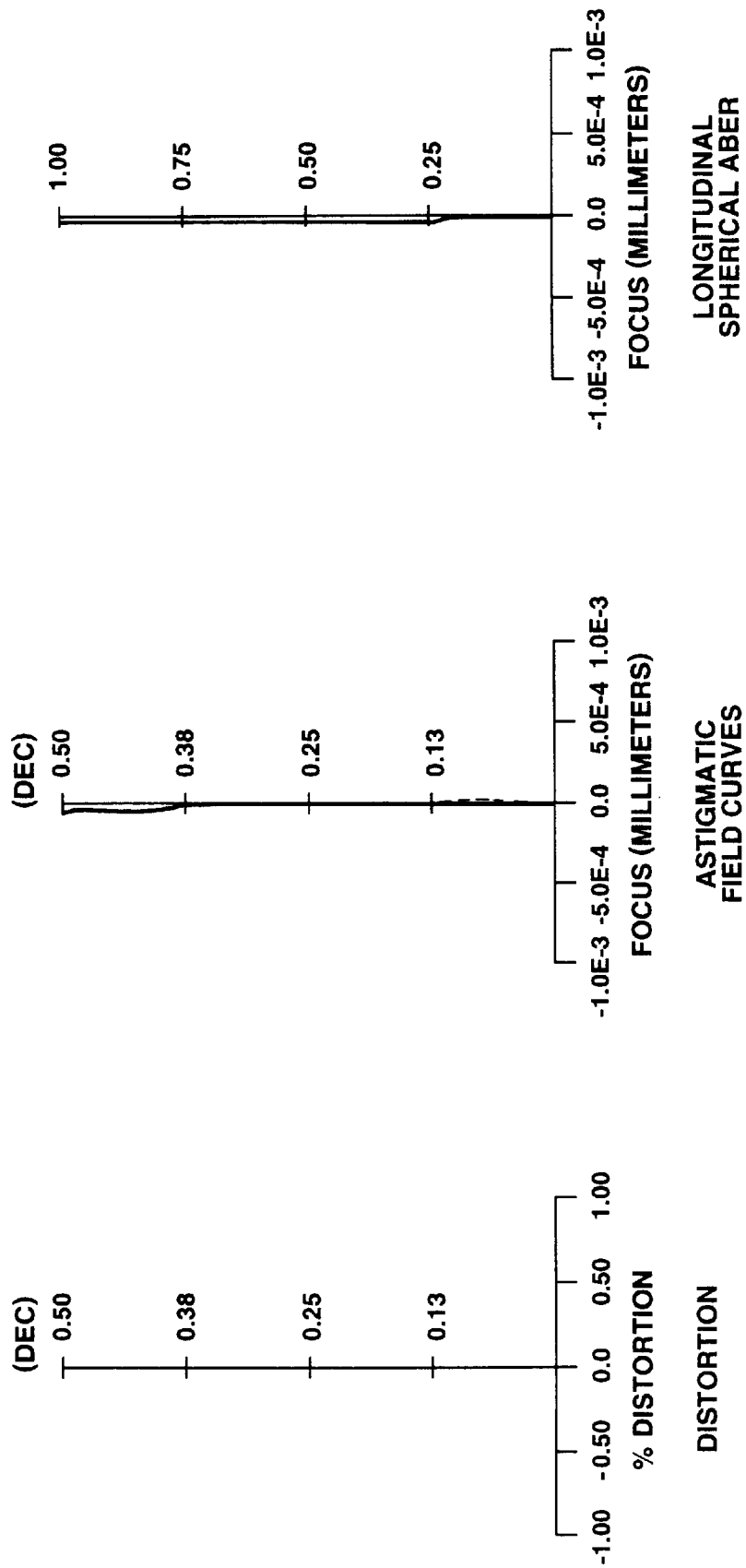

OBJECTIVE LENS HAVING A DOUBLET LENS WITH HIGH NUMERICAL APERTURE

BACKGROUND OF THE INVENTION

1. Field of the Invention

The present invention relates to an objective lens and an optical pickup apparatus having the objective lens and arranged to read and write an information signal to and from an optical recording medium, such as an optical disk, a magneto-optical disk or an optical card.

2. Description of Related Art:

Hitherto, optical recording mediums, such as optical disks, magneto-optical disks and optical cards, have been widely used to store data of dynamic image information, voice information and data for computers because the optical recording mediums can easily be manufactured and the cost can be reduced. In recent years there is more need for raising the density of information signals, which can be recorded, and enlarging the capacity owning to rapid progress of the information society.

To raise the density of information signals, which can be recorded on an optical recording medium of the foregoing type, shortening of the wavelength of the laser beam for reading the information signal and raising of the NA {(that is, use of an objective lens having a high NA (the number of apertures)} of the objective lens for converging the laser beams onto the optical recording medium are effective means. The reason for this lies in that the minimum size of a beam spot, which is formed by converging the laser beams, cannot be reduced to $\lambda/NA$ ($\lambda$: the wavelength of the light beam) or smaller.

To shorten the wavelength of the laser beam, a blue laser diode, a blue SHG laser and a green SHG laser have been developed. On the other hand, raising of the NA of the objective lens has been attempted by making the NA of the objective lens of a so-called "digital video disk (DVD)" (a digital optical disk adapted to a video signal) having a recording density higher than that of a so-called "compact disk (CD)" (digital optical disk adapted to an audio signal or computer data) to be 0.6 in comparison to the NA of the "compact disk (CD)" which is 0.45. The objective lens of the optical disk is formed into an aspheric single lens (a monocyte aspheric lens) made of a synthetic resin material or a glass material.

To eliminate influence of a coma aberration occurring because of an inclination of the "digital video disk (DVD)", the substrate of the "digital video disk (DVD)" has a thickness of 0.6 mm which is half of that of the substrate of the "compact disk" and that of the magneto-optical disk.

In order to further raise the density of information signals, which can be recorded, as compared with the density realized by the "digital video disk (DVD)", an objective lens having an NA higher than 0.6 is required.

However, to manufacture an objective lens having an NA not lower than 0.7, various requirements must be satisfied.

An objective lens having a high NA suffers from chromatic aberration which is generated attributable to change in the wavelength of a semiconductor laser (vertical-mode hop which takes place when the environmental temperature is changed). Since the conventional monocyte objective lens has an NA which is not higher than 0.6 with which chromatic aberration is not generated considerably, the lens of the foregoing type can be made of optical glass, the Abbe's number of which is 50 or less and which therefore has relatively high diffusion and high refractivity. Since the cost of the optical glass, having high diffusion and frequency, can be reduced, the foregoing optical glass can satisfactorily be mass-produced. Therefore, the foregoing material has been widely used.

However, high NA objective lenses of a type having an NA of 0.7 or higher encounter great chromatic aberration if the foregoing objective lens is made of high diffusion optical glass. In this case excessive defocus takes place on the surface of an optical disk on which a signal is recorded. Therefore, chromatic aberration must be prevented by using low-diffusion optical glass.

Since the major part of the low-diffusion optical glass has a low refractivity, the curvature of the surface is sharpened excessively if an objective lens having a short focal distance and a high NA is manufactured. In this case, a mold for manufacturing the lens cannot easily be machined. The present level of the technique for machining the aspheric surface cannot accurately manufacture a mold by using a diamond bite if the angle $\theta$ made between the contact surface of the aspheric surface and a plane perpendicular to the optical axis is larger than 50 degrees (according to a report satisfactory lenses have been obtained when the angle $\theta$ is about 55 degrees or smaller).

However, the objective lens having a short focal distance and a high NA is usually designed to have the above-mentioned angle $\theta$ which exceeds 55 degrees. In this case, permissible decentering for the distance between two sides of the lens when the mold or the lens is manufactured is reduced excessively. Thus, the manufacturing efficiency deteriorates excessively.

It might therefore be considered feasible to employ a doublet lens structure to distribute the curvature to the four surfaces. However, even the doublet lens attempted to maintain a satisfactorily long working distance involves excessively sharp curvature of the surface. Moreover, permissible decentering between the surfaces of the lens and the permissible angle of field to be reduced when the lens is manufactured. Thus, the manufacturing efficiency deteriorates excessively. To reduce the aperture of an objective lens, that is, to reduce the diameter of an objective lens is an important fact because the reduction enables the size of the optical pickup apparatus to be reduced and thus an economic advantage can be realized. To maintain a sufficiently long working distance is an important factor to prevent contact between the objective lens and the optical disk which is rotated at high speed.

Therefore, the doublet objective lens must comprise a lens having a gentle curvature of the surface without deterioration in the manufacturing efficiency.

Although the curvature of the objective lens can be made to be gentle and thus the manufacturing efficiency of the objective lens can be improved if the aperture of the objective lens is enlarged, the weight of the portion including the objective lens is enlarged. In this case the size of the optical pickup apparatus cannot be reduced. Moreover, the performance of the actuator (a mechanism for driving the objective lens) for moving the objective lens to follow the optical disk must be improved. In this case, the size and cost of the optical pickup apparatus cannot be reduced.

If the objective lens having a high NA is employed, there arises another problem in that the RF signal deteriorates even with a small amount of disk skew and the signal cannot easily be reproduced from the optical disk because the coma-aberration, which is generated attributable to the skew of the optical disk, is enlarged in proportion to the cube of the NA.

SUMMARY OF THE INVENTION

In view of the foregoing, an object of the present invention is to provide an objective lens which has a sufficiently large numerical aperture (NA) which is capable of sufficiently correcting chromatic aberration and which can easily be manufactured.

Another object of the present invention is to provide an optical pickup apparatus having the objective lens according to the present invention and arranged to be capable of satisfactorily writing and reading an information signal to and from an optical recording medium.

In order to realize the above-mentioned objects, the present invention is structured such that the chromatic aberration of a doublet lens having a high NA (the number of apertures) is prevented by using low-diffusion optical glass having an Abbe's number of 40 or more to manufacture the two lens elements. To reduce the diameter of the aperture or to obtain a satisfactorily long working distance, a first means is arranged in such a way that a lens having a sharper curvature is made of optical glass having a refractivity which is higher than the refractivity of optical glass for making a lens having a gentler curvature. Thus, the curvature can be made to be gentle and the deterioration in the manufacturing efficiency can be prevented. Since the optical glass for making the lens having the sharper curvature encounters great diffusion of wavelength in this case, a somewhat disadvantage is realized in view of correcting the chromatic aberration. A second means is arranged such that the aperture is limited to be 4.5 mm or smaller to reduce the aperture and the size of the optical pickup apparatus. While employing the aperture of 4.5 mm or smaller, the preferred ranges for the NA (the numerical aperture), the diameter of the aperture and the working distance are limited to prevent the sharp curvature. Thus, deterioration in the manufacturing efficiency can be prevented. The above-mentioned lenses have the curvature of the surface, the tilt (inclination) and the permissible decentering which satisfy the range with which the lens can be manufactured. A thus-obtained lens is able to have optimized distribution of the refracting power of the two lens elements of the doublet lens. The distribution of the refracting power can be optimized because the manufacturing tolerance for the lens can be enlarged significantly if the ratio $F_1/F$ of the focal distance $F_1$ of the lens adjacent to the object (adjacent to the light source) and the focal distance F of the overall system satisfies the following relationship:

$$1.7<(F_1/F)<2.5.$$

The optical pickup apparatus (a high-NA lens system) having the high-NA objective lens is arranged to correspond to an inclination (disk skew) of an optical recording medium by reducing the thickness of a transparent substrate (the disk substrate) to prevent generation of coma-aberration.

According to one aspect of the present invention, there is provided an objective lens comprising two lens elements made of optical glass having an Abbe's number of 40 or greater on a d-line and having a doublet structure, wherein at least either surface is formed into an aspheric surface and the number of apertures is 0.7 or more.

An optical pickup apparatus according to the present invention is structured such that the Abbe's number of the optical glass forming the two lens elements on the d-line is 60 or greater and the numerical aperture is made to be 0.8 or more.

An objective lens according to the present invention is structured such that when an assumption is made that the refractivity of optical glass for forming either lens element in which an angle made between a tangential plane of a plane in the periphery of the lens element and a plane perpendicular to an optical axis is larger than the angle of the other lens element is $n_1$ and the refractivity of the optical glass forming the other lens element is $n_2$, the following relationship is satisfied:

$$n_1 > n_2.$$

An objective lens according to the present invention is structured such that when an assumption is made that the diameter of an incidental laser beam is BW, the working distance is WD and the numerical aperture is NA, the following relationships are satisfied:

if $$1.0 \leq BW < 4.5, \ 0.05 \leq WD$$

and $$0.7 \leq NA < 0.8,$$

then $$WD \leq 0.25676BW + 0.039189,$$

if $$0.8 \leq NA < 0.9,$$

then $$WD \leq 0.14054BW - 0.064865,$$

and if $$0.9 \leq NA,$$

then $$WD \leq 0.096429BW - 0.244640.$$

An objective lens according to the present invention is structured such that ratio $F_1/F$ of focal distance $F_1$ of the lens disposed on the side on which a laser beam is made incident and focal distance F of the overall system of the lens satisfies the following relationship:

$$1.7<(F_1/F)<2.5.$$

An objective lens according to the present invention is structured such that the aberration of the objective lens is corrected to correspond to thickness T of a transparent substrate of an optical recording medium disposed on a signal recording surface and supporting the signal recording surface and the objective lens satisfies the following relationships:

if $$0.7 \leq NA \text{ (the numerical aperture)} < 0.8,$$

then $$T \leq 0.32 \text{ mm},$$

if $$0.8 \leq NA < 0.9,$$

then $$T \leq 0.20 \text{ mm},$$

and
if $$0.9 \leq NA,$$

then $$T \leq 0.11 \text{ mm}.$$

According to another aspect of the present invention, there is provided an optical pickup apparatus according to the present invention comprising a light source; and an objective lens for converging a laser beam emitted from the light source onto a signal recording surface of an optical recording medium, wherein the lens has two lens elements made of optical glass having an Abbe's number of 40 or greater on a d-line and having a doublet structure, at least either surface is formed into an aspheric surface and the number of apertures is 0.7 or more.

An optical pickup apparatus according to the present invention is structured such that the Abbe's number of the optical glass forming the two lens elements on the d-line is 60 or greater and the number of apertures is made to be 0.8 or more.

Other objects, features and advantages of the invention will be evident from the following detailed description of the preferred embodiments described in conjunction with the attached drawings.

BRIEF DESCRIPTION OF THE DRAWINGS

FIG. 2 is a graph showing distortion of the objective lens shown in FIG. 1;

FIG. 3 is a graph showing astigmatism of the objective lens shown in FIG. 1;

FIG. 4 is a graph showing spherical aberration of the objective lens shown in FIG. 1;

FIG. 10 is a graph showing distortion of the objective lens shown in FIG. 9;

FIG. 11 is a graph showing astigmatism of the objective lens shown in FIG. 9;

FIG. 12 is a graph showing spherical aberration of the objective lens shown in FIG. 9;

FIG. 16 is a graph showing distortion of the objective lens shown in FIG. 15;

FIG. 17 is a graph showing astigmatism of the objective lens shown in FIG. 15;

FIG. 18 is a graph showing spherical aberration of the objective lens shown in FIG. 15;

FIG. 39 is a graph showing distortion of the objective lens shown in FIG. 38;

FIG. 40 is a graph showing astigmatism of the objective lens shown in FIG. 38;

FIG. 41 is a graph showing spherical aberration of the objective lens shown in FIG. 38;

FIG. 45 is a graph showing distortion of the objective lens shown in FIG. 44;

FIG. 46 is a graph showing astigmatism of the objective lens shown in FIG. 44;

FIG. 47 is a graph showing spherical aberration of the objective lens shown in FIG. 44;

FIG. 51 is a graph showing distortion of the objective lens shown in FIG. 50;

FIG. 52 is a graph showing astigmatism of the objective lens shown in FIG. 50;

FIG. 53 is a graph showing spherical aberration of the objective lens shown in FIG. 50;

FIG. 57 is a graph showing distortion of the objective lens shown in FIG. 56;

FIG. 58 is a graph showing astigmatism of the objective lens shown in FIG. 56;

FIG. 59 is a graph showing spherical aberration of the objective lens shown in FIG. 56;

FIG. 63 is a graph showing distortion of the objective lens shown in FIG. 62;

FIG. 64 is a graph showing astigmatism of the objective lens shown in FIG. 62;

FIG. 65 is a graph showing spherical aberration of the objective lens shown in FIG. 62;

FIG. 69 is a graph showing distortion of the objective lens shown in FIG. 68;

FIG. 70 is a graph showing astigmatism of the objective lens shown in FIG. 68;

FIG. 71 is a graph showing spherical aberration of the objective lens shown in FIG. 68;

FIG. 75 is a graph showing distortion of the objective lens shown in FIG. 74;

FIG. 76 is a graph showing astigmatism of the objective lens shown in FIG. 74;

FIG. 77 is a graph showing spherical aberration of the objective lens shown in FIG. 74;

FIG. 81 is a graph showing distortion of the objective lens shown in FIG. 80;

FIG. 82 is a graph showing astigmatism of the objective lens shown in FIG. 80;

FIG. 83 is a graph showing spherical aberration of the objective lens shown in FIG. 80;

FIG. 93 is a graph showing distortion of the objective lens shown in FIG. 92;

FIG. 94 is a graph showing astigmatism of the objective lens shown in FIG. 92;

FIG. 95 is a graph showing spherical aberration of the objective lens shown in FIG. 92;

FIG. 99 is a graph showing distortion of the objective lens shown in FIG. 98;

FIG. 100 is a graph showing astigmatism of the objective lens shown in FIG. 98;

FIG. 101 is a graph showing spherical aberration of the objective lens shown in FIG. 98;

DETAILED DESCRIPTION OF PREFERRED EMBODIMENTS

Embodiments of the present invention will now be described with reference to the drawings in the following sequential order.

1. Schematic structure of objective lens
2. Lens of a type using low-diffusion optical glass which has an Abbe's number vd not smaller than 40 ($vd \geq 40$) on d-line as optical glass of two lens elements.
3. Lens satisfying $n_1 > n_2$ on an assumption that the refractivity of a lens having a sharper curvature is $n_1$ and the refractivity of a lens having a gentler curvature is $n_2$.
4. Lens having beam diameter BW and working distance WD limited as follows:
  if $$1.0 \leq BW < 4.5, \ 0.05 \leq WD$$

and $$0.7 \leq NA \text{ (the numerical aperture)} < 0.8,$$

then $$WD \leq 0.25676 BW + 0.039189,$$

if $$0.8 \leq NA < 0.9,$$

then $$WD \leq 0.14054 BW - 0.064865,$$

and if $$0.9 \leq NA,$$

then $$WD \leq 0.096429 BW = 0.244640$$

4-1. Upper limit of the diameter of the beam
  4-2. Lower limit of the working distance
  4-3. Upper limit of the working distance
5. Lens in which the ratio ($F_1/F$) of focal distance $F_1$ of the lens adjacent to an object (adjacent to the light source) and focal distance F of the overall system satisfies $1.7 < (F_1/F) < 2.5$.
6. Lens corrected to correspond to thickness T of a transparent substrate of an optical recording medium as follows:
  if $$0.7 \leq NA \text{ (the numerical aperture)} < 0.8,$$

then $$T \leq 0.32 \text{ mm},$$

if $$0.8 \leq NA < 0.9,$$

then $$T \leq 0.20 \text{ mm},$$

and if $$0.9 \leq NA,$$

then $$T \leq 0.11 \text{ mm}.$$

7. Structure of optical pickup apparatus
8. Modification

1. Schematic Structure

Figure 1:
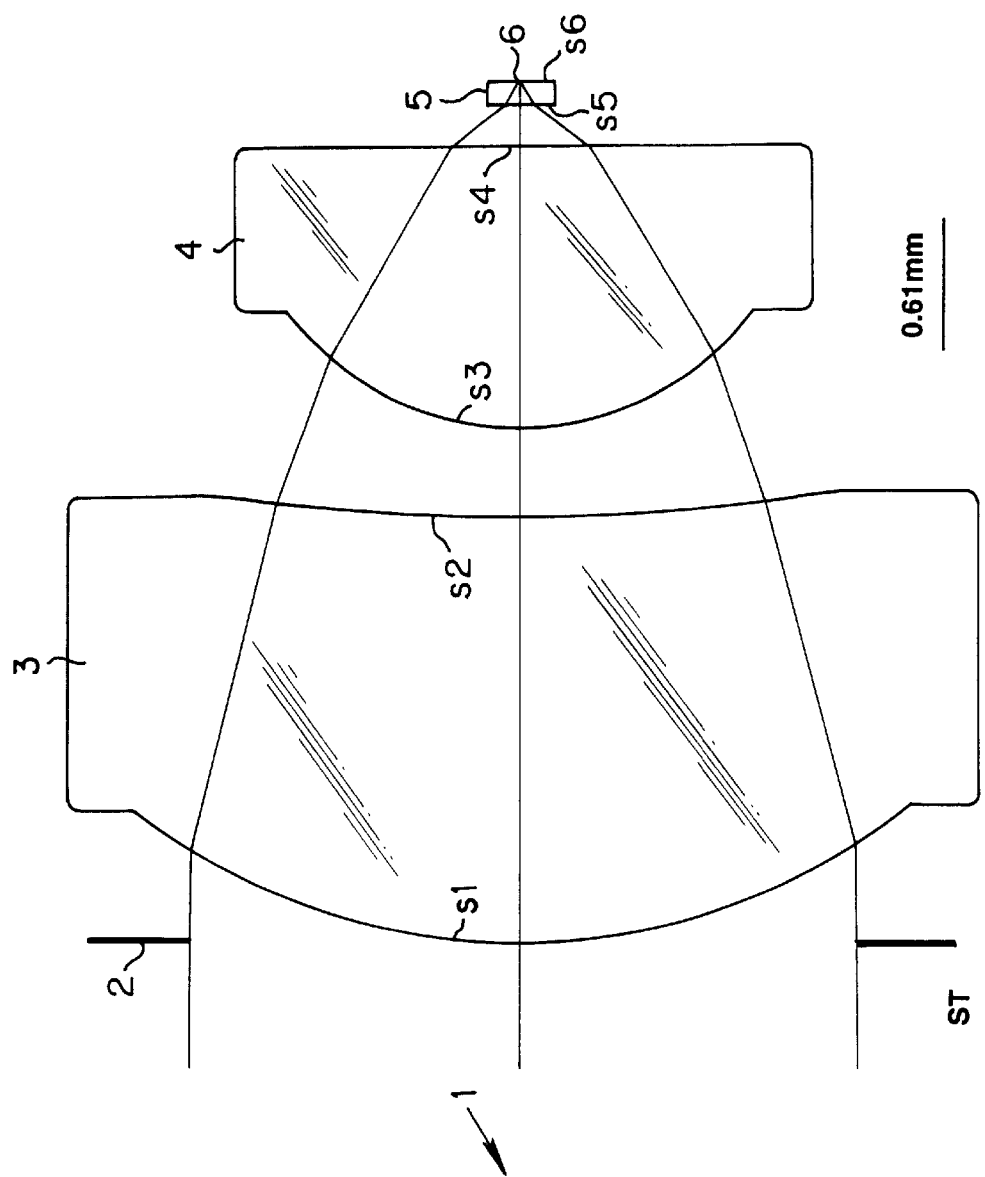
FIG. 1 is a vertical cross sectional view showing an optical pickup apparatus according to the present invention and made of optical glass having an Abbe's number of 50 or smaller.

The objective lens according to the present invention is a doublet lens (two elements in two groups) having at least either side formed into an aspheric surface, as shown in FIG. 1 and Table 1, the objective lens according to the present invention being a high-NA (the numerical aperture) objective lens having an NA of 0.7 or more. That is, the objective lens according to the present invention comprises a first lens 3 disposed adjacent to an object (adjacent to the light source) and a second lens 4 disposed adjacent to an image (an optical recording medium). A parallel flat plate 5 corresponding to S5 (an incidental surface of the parallel flat plate 5). The laser beam is then imaged on an imaging point (IMG) on a sixth surface S6 (an emission surface of the parallel flat plate 5).

TABLE 1

| Surface | RDY (Curvature Radius) | THI (Thickness) | GLA (Name of Glass) |
|---|---|---|---|
| OBJ | Infinity | Infinity | |
| STO | Infinity | 0.0 | |
| s1 | 2.41728 | 1.920128 | 731.405 |
| | K: −0.098342 | | |
| | A: −.335213E − 02 | B: −.612803E − 03 | C: −.167781E − 03 |
| | D: −.786690E − 04 | E: 0.145905E − 04 | F: −.103594E − 04 |
| s2 | 6.10659 | 0.381566 | |
| | K: −5.574578 | | |
| | A: 0.266412E − 02 | B: −.160850E − 02 | C: −.152011E − 02 |
| | D: −.183517E − 02 | E: 0.275197E − 03 | F: 0.258063E − 03 |
| s3 | 1.135 | 1.268447 | 731.405 |
| | K: −0.113115 | | |
| | A: 0.564267E − 02 | B: −.239467E − 02 | C: 0.536980E − 02 |
| | D: −.139509E − 01 | E: −.831405E − 02 | F: 0.194854E − 02 |
| s4 | 2.22598 | 0.2 | |
| | K: −34.597713 | | |
| | A: −.172244E + 00 | B: 0.317741E + 00 | C: 0.543683E + 01 |
| | D: −.295791E + 02 | E: 0.127036E − 15 | F: 0.951503E − 17 |
| s5 | Infinity | 0.1 | CG |
| s6 | Infinity | 0.0 | |
| IMG | Infinity | 0.0 | |

Equation of Aspheric Surface $$X = \frac{Y^2/R}{1 + \{1 - (1+K)(Y/R)^2\}^{1/2}} + AY^4 + BY^6 + CY^8 + DY^{10} + EY^{12} + FY^{14}$$

X: depth from vertex of surface
Y: height from optical axis
R: paraxis R
K: cone constant
A: aspheric coefficient of term $Y^4$
B: aspheric coefficient of term $Y^6$
C: aspheric coefficient of term $Y^8$
D: aspheric coefficient of term $Y^{10}$
E: aspheric coefficient of term $Y^{12}$
F: aspheric coefficient of term $Y^{14}$

| | |
|---|---|
| EPD | 2.928 |
| (Diameter of Entrance Pupil (mm)) | |
| WL (Wavelength (nm)) | 635.0 |
| Refractivity/Abbe's Number | |
| Name of Glass | |
| 731.405 | 1.727/40.5 |
| CG | 1.533 |
| F | 1.83 |
| (Focal Distance of Overall System) | |
| $F_1$ | 4.5136 |
| (Focal Distance of Lens adjacent to Object) | | a transparent of an optical recording medium is provided for the objective lens according to the present invention at a position adjacent to the image.

Figure 5:
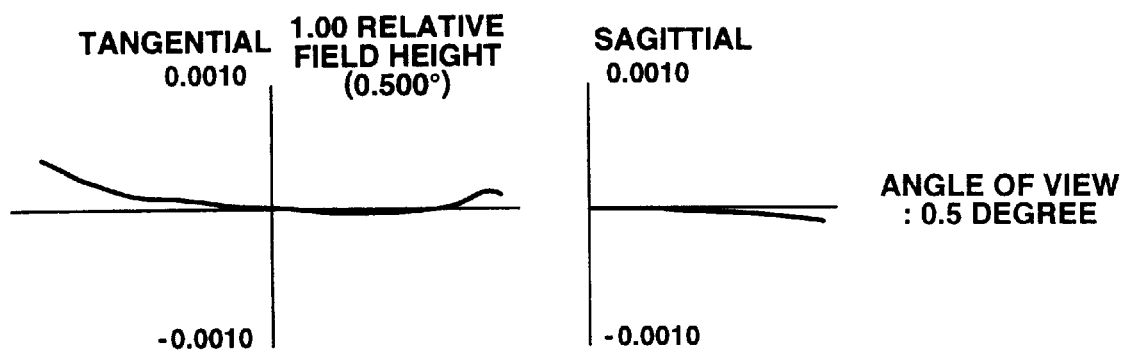
FIG. 5 is a graph showing lateral aberration (angle of view: 0.5 degree) of the objective lens shown in FIG. 1.
Figure 6:
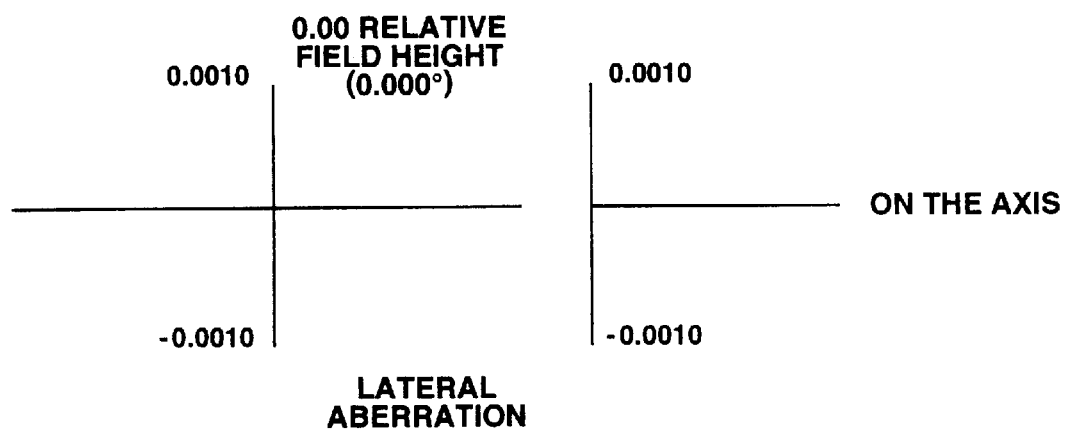
FIG. 6 is a graph showing the lateral aberration (on the axis) of the objective lens shown in FIG. 1.

The objective lens according to the present invention is a so-called infinite lens having an object point (OBJ)(light source) positioned at an infinitely distant position. A light beam emitted from the object point is formed into a parallel beam, and then allowed to pass through a stop (STO) 2 so that the laser beam is made incident on first surface S1 (an incidental surface of the first lens 3). The laser beam is then emitted from second surface S2 (an emission surface of the first lens 3), and then made incident on third surface S3 (an incidental surface of the second lens 4). The laser beam is then emitted from fourth surface S4 (an emission surface of the second lens 4), and then made incident on fifth surface A graph showing distortion of the objective lens according to the present invention is shown in FIG. 2, that showing astigmatism of the same is shown in FIG. 3 and that showing spherical aberration of the same is shown in FIG. 4. A graph showing the lateral aberration (angle of view: 0.5 degree) is shown in FIG. 5 and that showing the lateral aberration (on the axis) is shown in FIG. 6.

2. Lens using low-diffusion optical glass which has Abbe's number vd not smaller than 40 (vd≧40) on d-line as optical glass of two lens elements Since the objective lens according to the present invention responds to change in the wavelength of the semiconductor laser, which is the light source, because the objective lens according to the present invention has a high NA, correction of the chromatic aberration must be considered. The chromatic aberration is an aberration which is generated because the refractivity of the optical glass becomes different depending on the wavelength of light. The position and size of the image become different according as the wavelength changes.

Since the conventional objective lens having a low NA for use in an optical disk, such as the conventional CD (Compact Disk), or a laser beam printer does not generate a large quantity of the chromatic aberration, optical glass (having an Abbe's number smaller than 40) is widely used. The reason for this lies in that the above-mentioned optical glass can easily be manufactured and thus mass production is permitted.

However, the lens system has higher refracting power in proportion to the NA and thus the chromatic aberration takes place considerably due to changes in the refractivity when the wavelength has been changed. Moreover, the chromatic aberration takes place considerably in a long focal distance system.

Figure 21:
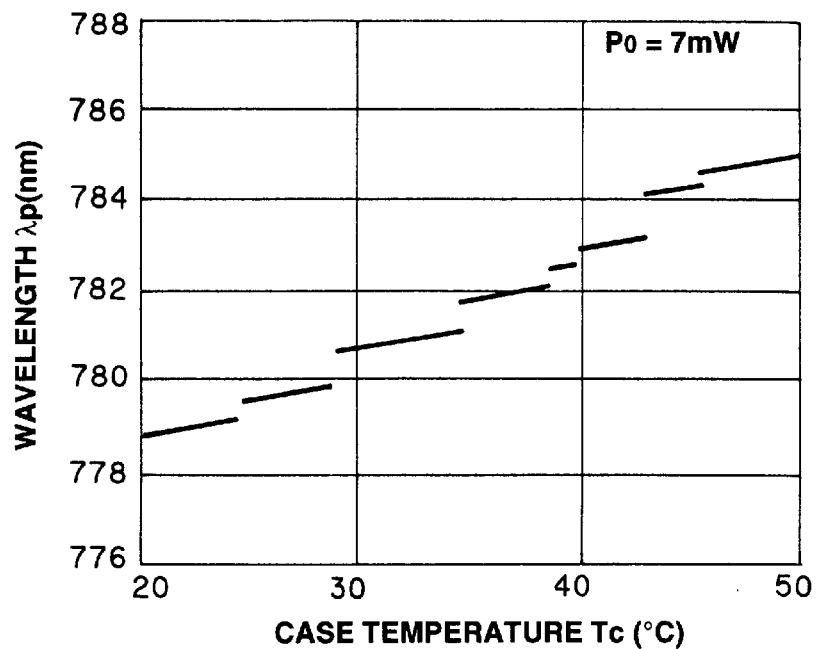
FIG. 21 is a graph showing mode hop in a single mode laser diode.

On the other hand, the semiconductor laser encounters mode hop as shown in FIG. 21 according as the change in the temperature of the laser diode and thus the output wavelength is rapidly changed. If chromatic aberration is generated in the objective lens, defocus occurring attributable to the mode hop cannot be followed and removed by a biaxial actuator for moving the objective lens.

Accordingly, the lens must be made of low-diffusion optical glass to prevent generation of the chromatic aberration. The objective lens designed as described above, as shown in FIG. 1 and Table 1, comprises the first and second lenses 3 and 4 both of which have an Abbe's number vd of 40.5 and a refractivity of 1.73. When the degree of opening is limited by the stop 2, defocus with respect to change in the wavelength of a +5 nm semiconductor laser is 0.478 μm when the NA is 0.8.

Figure 7:
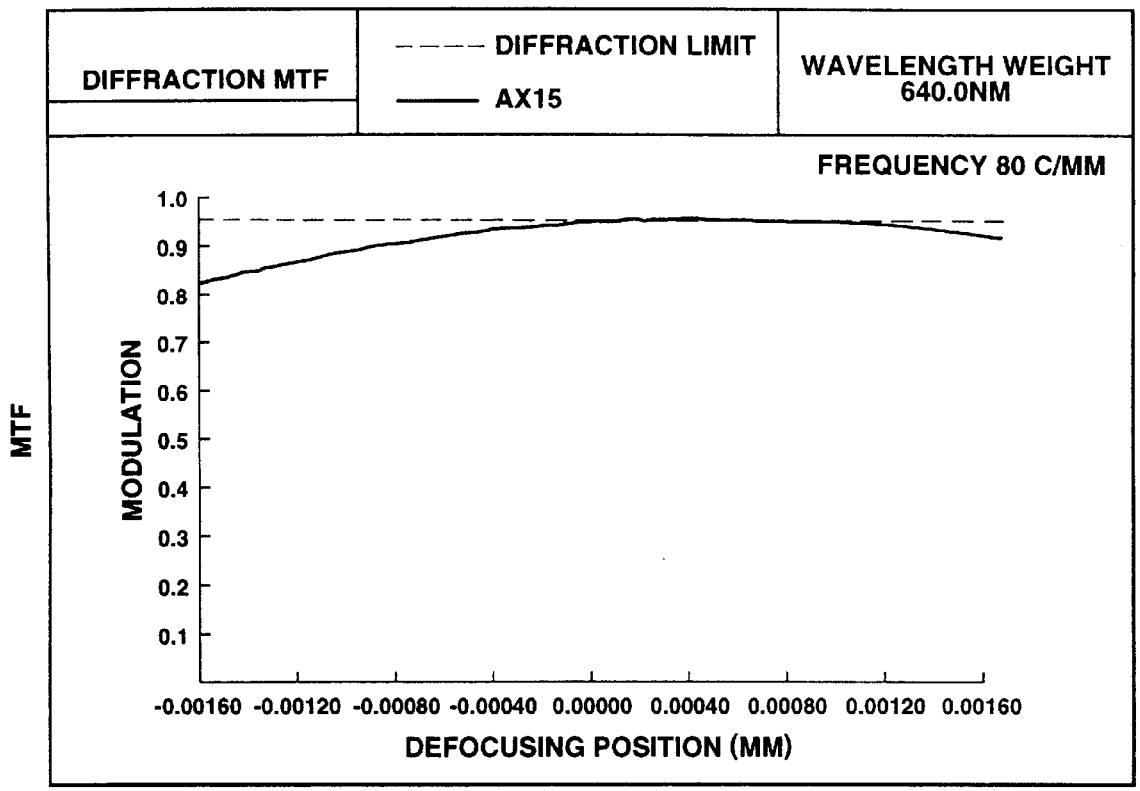
FIG. 7 is a graph showing MTF (Modulation Transfer Function) of the objective lens shown in FIG. 1.
Figure 8:
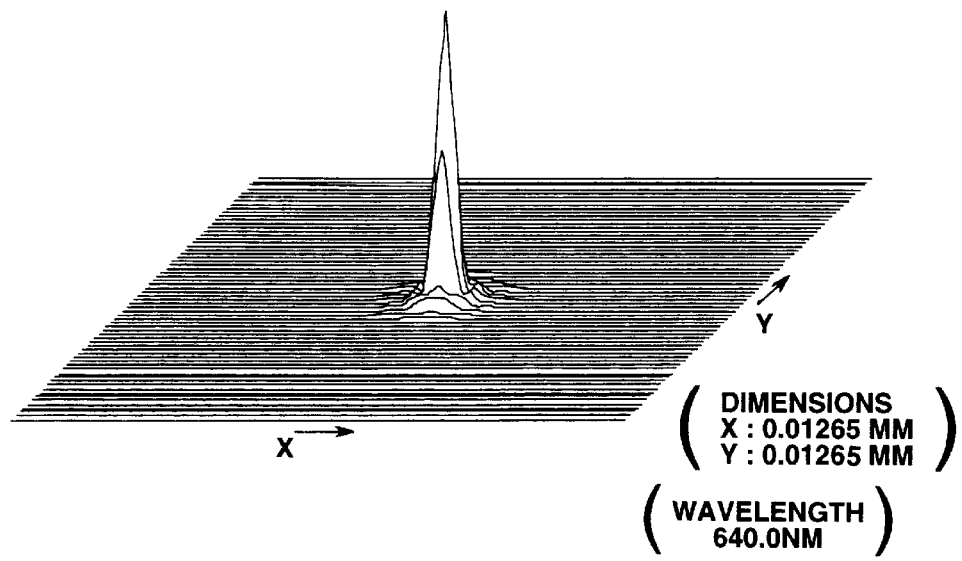
FIG. 8 is a graph showing PSF of the objective lens shown in FIG. 1.

An MTF (Modulation Transfer Function) in the direction of the optical axis when the spatial frequency is 80/mm is shown in FIG. 7, and PSF (Point Strength Function) is shown in FIG. 8.

If a high NA objective lens adaptable to an optical disk serving as an optical recording medium generates defocus greater than 0.496 μm which is half of the focal depth of 0.992 μm when the wavelength of the semiconductor laser has been changed by P-P10 nm (±5 nm), the beam spot on the signal recording surface of the optical disk cannot completely be stopped. When the wavelength has been changed by P-P10 nm (±5 nm), the lens made of the optical glass shown in FIG. 1 and having the Abbe's number vd of 40.5 generates defocus of 0.475 μm which is substantially the permissible defocus. Therefore, the present invention is structured such that the lower limit of the proper Abbe's number vd of the optical glass for making the lens is made to be 40 in order to prevent chromatic aberration. It is preferable that the upper limit of the Abbe's number vd be a large value to prevent the chromatic aberration. Therefore, the present invention is structured such that the range of the Abbe's number vd of the optical glass for manufacturing the lens having the NA of 0.7 or more is determined to be 40 or larger to effectively prevent the chromatic aberration.

In a first embodiment to be described later, an example of an objective lens made of optical glass having a larger Abbe's number (vd=61.3) will be described. In this case, the chromatic aberration can be prevented even if the focal distance is elongated or the NA is enlarged.

3. Lens satisfying $n_1 > n_2$ on an assumption that the refractivity of a lens having a sharper curvature is $n_1$ and the refractivity of a lens having a gentler curvature is $n_2$.

Even if the chromatic aberration is prevented by using the above-mentioned low-diffusion optical glass, there arises the following problem: the curvature of the lens is sharpened excessively to manufacture the lens if the low-diffusion optical glass having a low refractivity is used because large refracting force is required for the optical glass for manufacturing the objective lens having a high NA. In this case, the optical glass must be changed to raise the refractivity and to make the curvature gentle.

In this case, however, diffusion in the available optical glass deteriorates. Therefore, the two lenses must be made of optical glass having the Abbe's number of 40 or larger. If optical glass having a larger Abbe's number is employed to manufacture the lens having a gentle curvature and if the optical glass having a smaller Abbe's number (however, not less than 40) is employed to manufacture the lens having a sharper curvature, deterioration in the chromatic aberration can be prevented most significantly.

Figure 9:
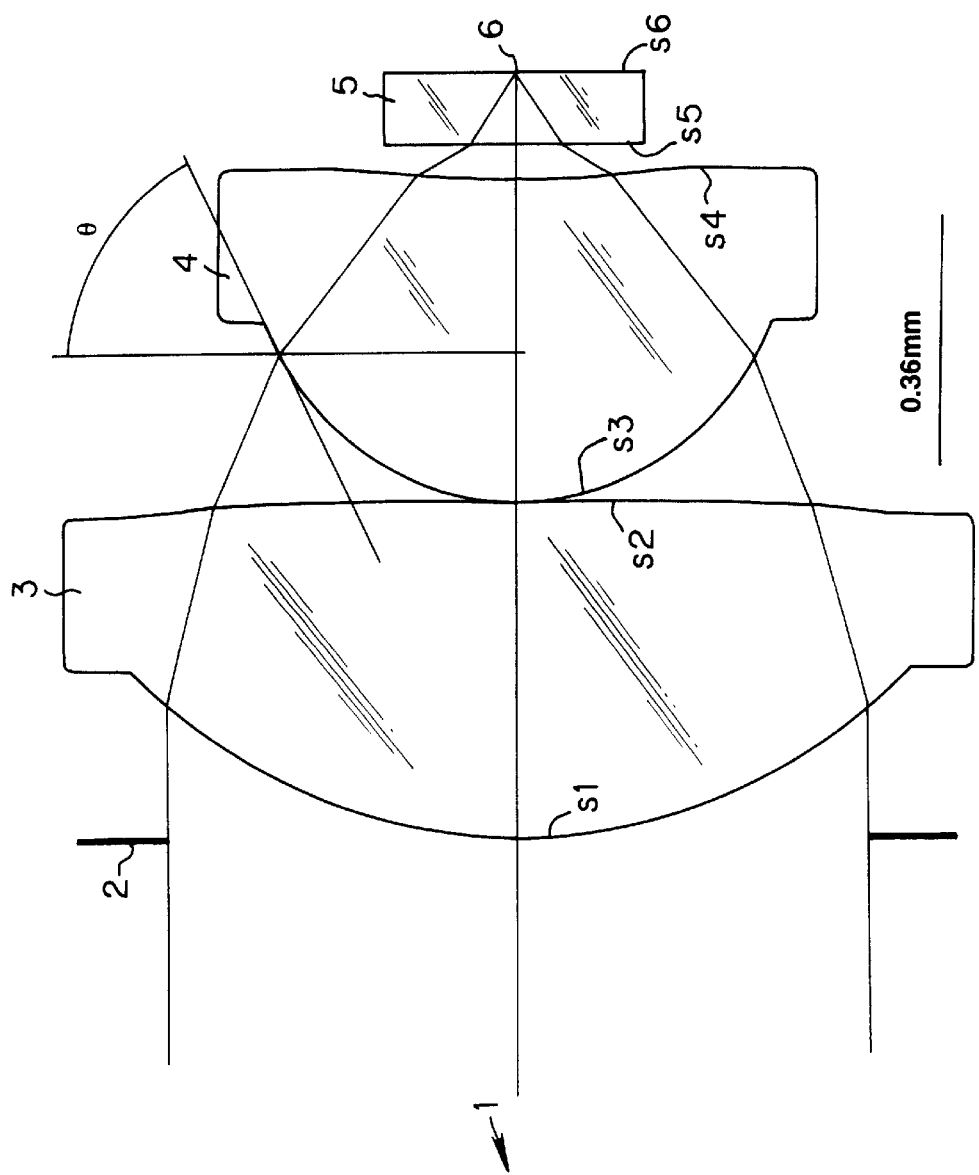
FIG. 9 is a vertical cross sectional view showing the structure of a lens element of the objective lens according to the present invention having a sharper curvature.

The state where the curvature is too sharp to manufacture the lens is a state where the angle θ made between a tangent (a tangential plane) of the surface of a lens at a position, on which a laser beam which has the largest height among the incident laser beams is made incident, and a perpendicular (a plane perpendicular to the optical axis) to the optical axis exceeds 55 degrees (65 degrees in the case shown in FIG. 9) on the surface (plane S3 in the case shown in FIG. 9) having the sharpest curvature as shown in FIG. 9. In this case, a mold for manufacturing the foregoing lens cannot accurately be manufactured. The designed values of the objective lens shown in FIG. 9 are as shown in Table 2.

TABLE 2

| Surface | RDY (Curvature Radius) | THI (Thickness) | GLA (Name of Glass) |
|---|---|---|---|
| OBJ | Infinity | Infinity | |
| STO | Infinity | 0.0 | |
| s1 | 0.65323 | 0.471733 | FCD1 |
| | K: −0.143186 | | |
| | A: −.239735E + 00 | B: −.409752E + 00 | C: −.277114E + 00 |
| | D: −.167201E + 01 | E: 0.337892E + 01 | F: −.405421E + 02 |
| s2 | −6.89267 | 0.002068 | |
| | K: −490.930053 | | |
| | A: 0.188677E − 01 | B: 0.377014E − 01 | C: −.110654E + 01 |
| | D: 0.199457E + 01 | E: −.181894E + 02 | F: 0.288857E + 02 |
| s3 | 0.36152 | 0.451734 | FCD1 |
| | K: −0.024229 | | |
| | A: 0.152164E + 00 | B: 0.250036E + 01 | C: −.916245E + 01 |
| | D: 0.348714E + 02 | E: 0.146318E − 03 | F: 0.299313E − 03 |

TABLE 2-continued

| | | | |
|---|---|---|---|
| s4 | 0.90849 | 0.05 | |
| | K: −192.038095 | | |
| | A: 0.160336E + 02 | B: −.113006E + 04 | C: 0.384911E + 05 |
| | D: −.487143E + 06 | E: 0.873041E − 11 | F: 0.321727E − 11 |
| s5 | Infinity | 0.1 | CG |
| s6 | Infinity | 0.0 | |
| IMG | Infinity | 0.0 | |

Equation of Aspheric Surface $$X = \frac{Y^2/R}{1 + \{1 - (1+K)(Y/R)^2\}^{1/2}} + AY^4 + BY^6 + CY^8 + DY^{10} + EY^{12} + FY^{14}$$

X: depth from vertex of surface
Y: height from optical axis
R: paraxis R
K: cone constant
A: aspheric coefficient of term $Y^4$
B: aspheric coefficient of term $Y^6$
C: aspheric coefficient of term $Y^8$
D: aspheric coefficient of term $Y^{10}$
E: aspheric coefficient of term $Y^{12}$
F: aspheric coefficient of term $Y^{14}$

| | |
|---|---|
| EPD | 0.977 |
| (Diameter of Entrance Pupil (mm)) | |
| WL (Wavelength (nm)) | 635 |
| Refractivity/Abbe's Number | |
| Name of Glass | |
| FCD1 | 1.494122/81.6 |
| CG | 1.533 |
| F | 0.5747 |
| (Focal Distance of Overall System) | |
| $F_1$ | 1.2331 |
| (Focal Distance of Lens adjacent to Object) | |

Figure 13:
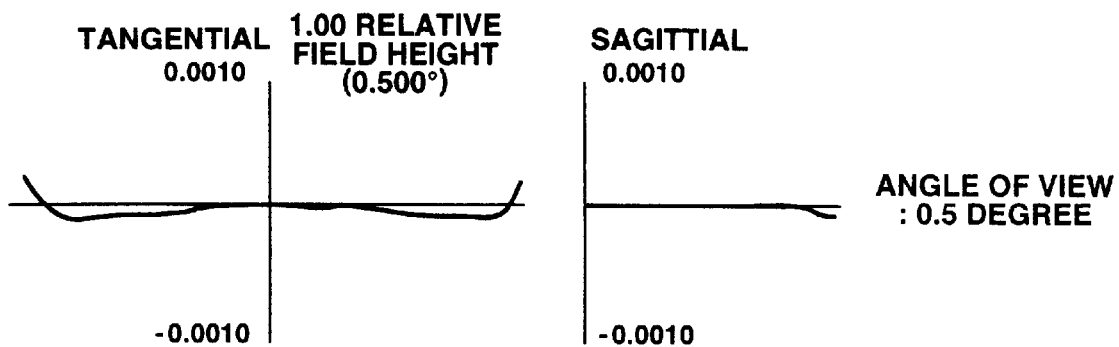
FIG. 13 is a graph showing lateral aberration (angle of view: 0.5 degree) of the objective lens shown in FIG. 9.
Figure 14:
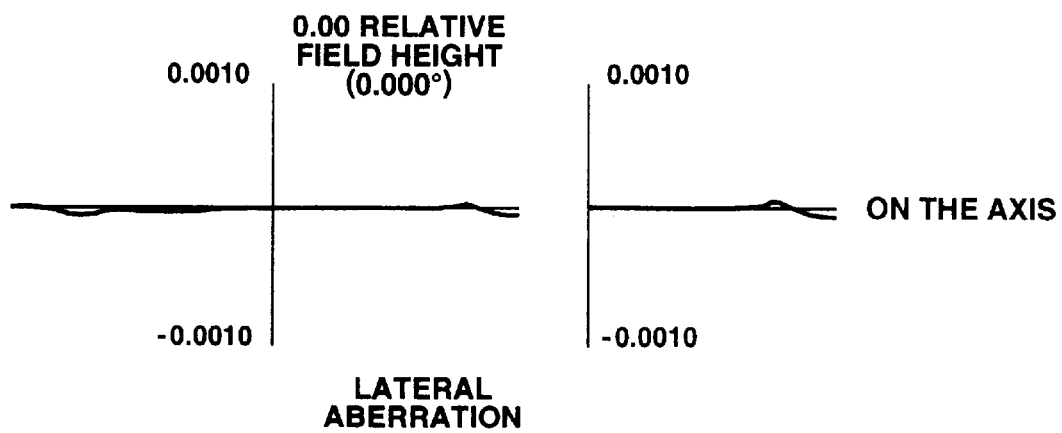
FIG. 14 is a graph showing the lateral aberration (on the axis) of the objective lens shown in FIG. 9.

A graph showing distortion of the foregoing objective lens is shown in FIG. 10, astigmatism of the same is shown in FIG. 11 and spherical aberration of the same is shown in FIG. 12. A graph showing the lateral aberration (angle of view: 0.5 degree) is shown in FIG. 13 and a graph showing the lateral aberration (on the axis) is shown in FIG. 14.

As described above, the curvature of the lens is made to be gentle to satisfy the range with which the lens can be manufactured while satisfactorily preventing the chromatic aberration so that the efficiency of manufacturing the lens is effectively improved.

An objective lens designed as described above will be described in a second embodiment.

4. Lens having beam diameter BW and working distance WD limited as follows:
if $$1.0 \leq BW < 4.5, \ 0.05 \leq WD$$

and $$0.7 \leq NA \text{ (the number of apertures)} < 0.8,$$

then $$WD \leq 0.25676BW + 0.039189,$$

if $$0.8 \leq NA < 0.9,$$

then $$WD \leq 0.14054BW = 0.064865,$$

and
if $$0.9 \leq NA,$$

then $$WD \leq 0.096429BW = 0.244640$$

The doublet objective lens attempted to be adaptable to an optical recording medium, such as an optical disk, is next required to have a reduced aperture (a shortened focal distance) in order to reduce the size and cost of the optical pickup apparatus. Since the objective lens according to the present invention is composed of two lens elements, reduction in the aperture is an important fact. The reason for this lies in that the weight of the foregoing lens is enlarged as compared with a single-element lens if the aperture is large.

If the aperture of a large-diameter lens is simply reduced, the working distance WD is undesirably shortened. In actual, the reduction cannot sometimes be performed as desired because at least a working distance of 50 μm must be provided to prevent contact between the objective lens and dust on the surface of the optical recording medium. If provision of a satisfactorily long working distance is attempted, the quantity of correction of the spherical aberration is enlarged excessively. In this case, the aspheric coefficient is enlarged and the curvature of the surface is rapidly sharpened. As a result, the manufacturing efficiency deteriorates.

The limit for reducing the aperture is made to be different depending upon the NA, as well as the working distance.

The reason for this lies in that the quantity of correction of the spherical aberration varies depending upon the NA of the lens.

In viewpoints of designing and manufacturing a lens, a lens having improved performance can easily be manufactured when the aperture is large.

Therefore, ranges of the diameter of the beam, the working distance (WD) and NA suitable to manufacture the doublet lens will now be described with reference to FIGS. 22 to 24.

4-1. Upper Limit of Diameter of Beam

Figure 22:
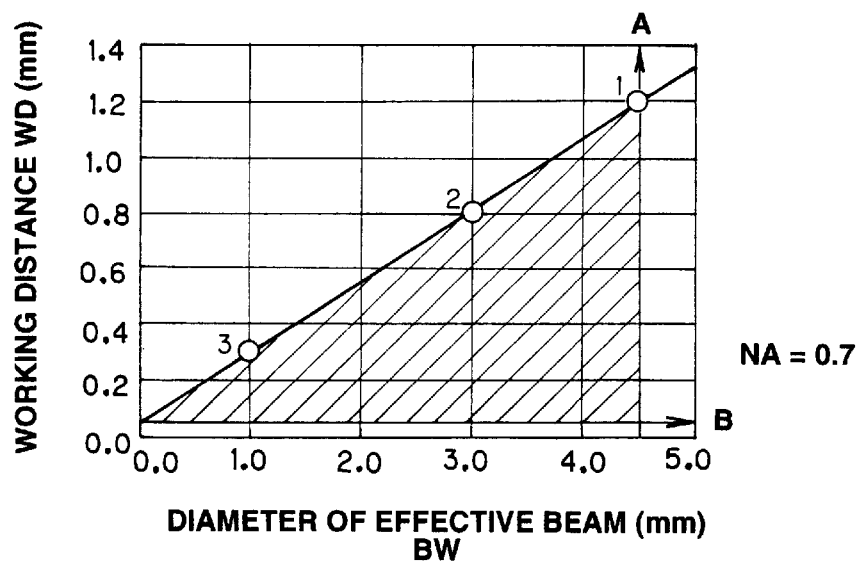
FIG. 22 is a graph showing preferred ranges of the direction of the beam, the working distance and NA (in a case where NA=0.7)
Figure 24:
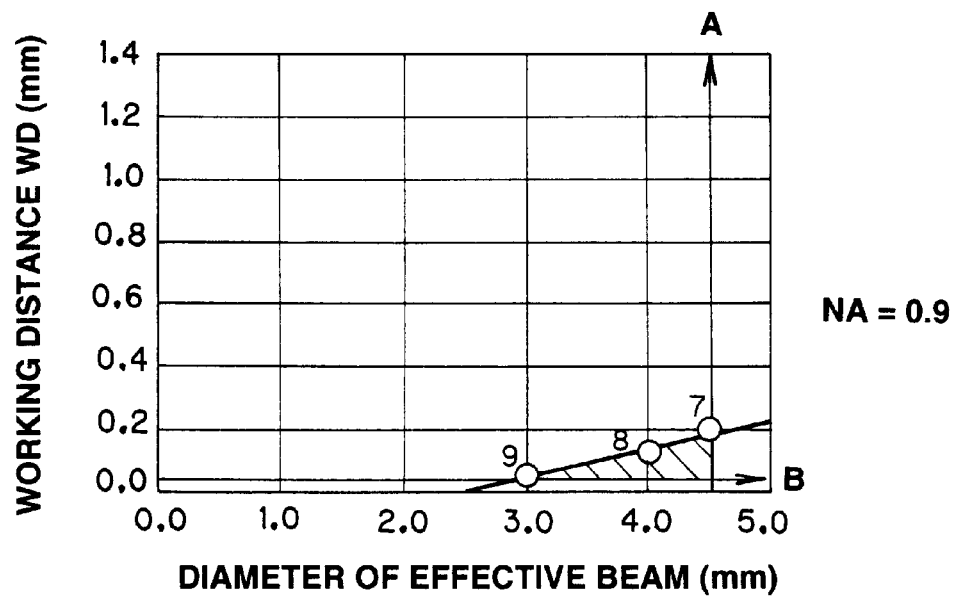
FIG. 24 is a graph showing preferred ranges of the direction of the beam, the working distance and NA (in a case where NA=0.9)

As indicated with A shown in FIGS. 22 and 24, the upper limit of the diameter of the beam is determined. If the diameter of the diameter of the beam is large, the size of the optical pickup apparatus cannot be reduced and the weight of the objective lens and that of the lens barrel (the lens holder) are enlarged. In this case, the actuator for performing focus servo must have improved performance that is disadvantageous with respect to the economic viewpoint.

Figure 15:
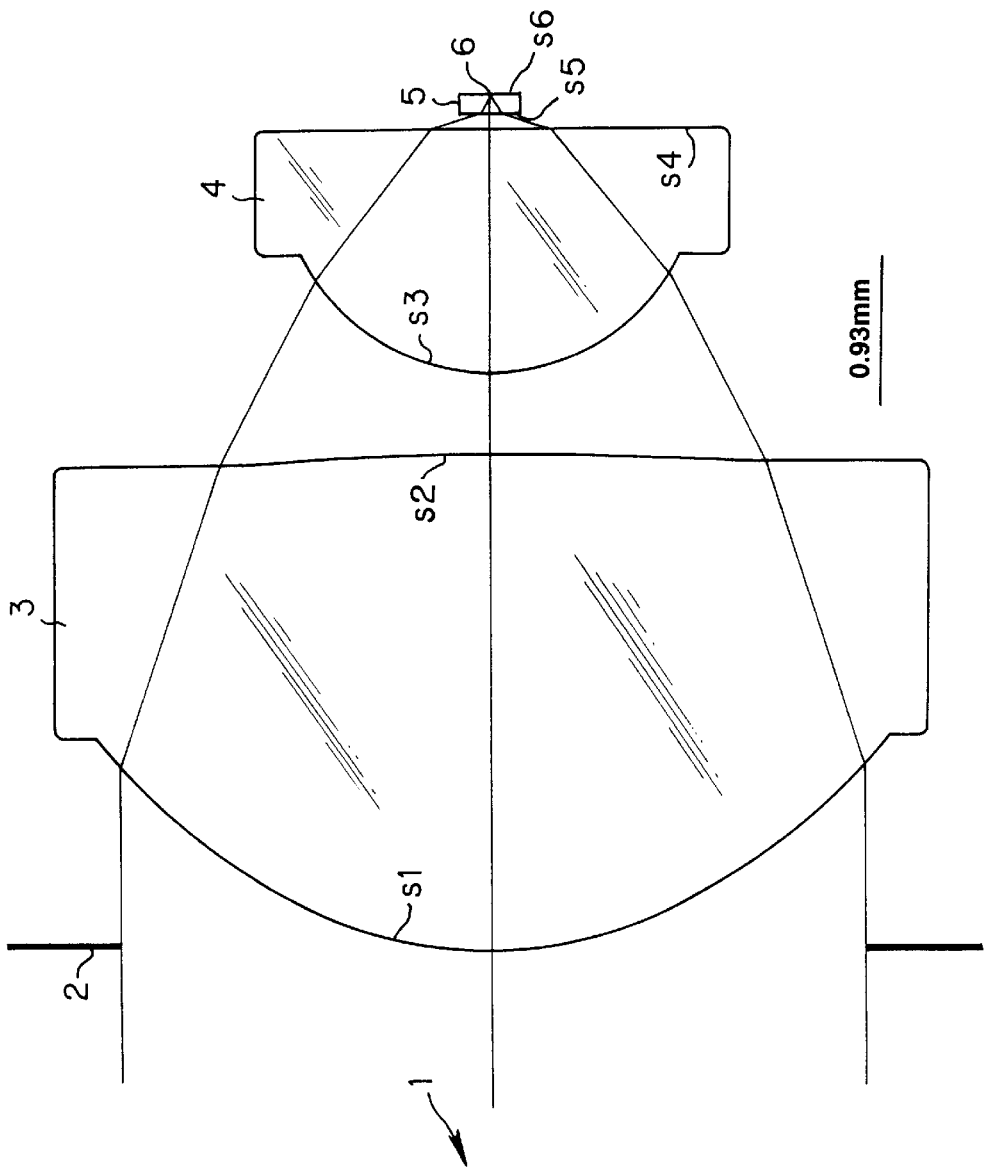
FIG. 15 is a vertical cross sectional view showing the structure of the structure showing the upper limit of the objective lens according to the present invention.

For example, an objective lens shown in FIG. 15 having an effective beam diameter of 4.5 mm and comprising two lens elements has a large weight of about 250 mg. The weight of the objective lens adaptable to the CD (Compact Disk) or the DVD (Digital Video Disk) is about 200 mg including the lens housing. Since a relationship as f=k/2 m (m: mass, k: spring constant and f: resonant frequency) is satisfied in consideration of the performance of the biaxial actuator, f is enlarged in inverse proportion to the weight of the objective lens preferably for servo control because f is brought to a position outside the focus servo. If the preferred overall weight of the objective lens including the lens housing is made to be 500 mg or smaller, a lens having a weight of 500 mg or smaller including the lens housing cannot easily be designed because a lens heavier than the objective lens having an effective diameter of 4.5 mm and shown in FIG. 15 has a weight of 250 mg. In this case, the biaxial actuator must have improved performance and the manufacturing cost is raised excessively for practical use. Therefore, it is preferable that the effective diameter of the doublet lens be 4.5 mm or smaller.

Figure 19:
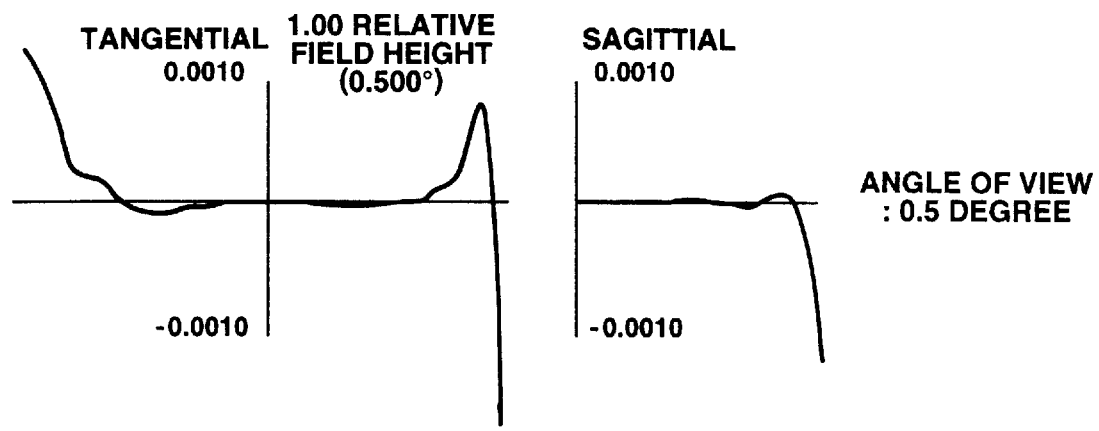
FIG. 19 is a graph showing lateral aberration (angle of view: 0.5 degree) of the objective lens shown in FIG. 15.
Figure 20:
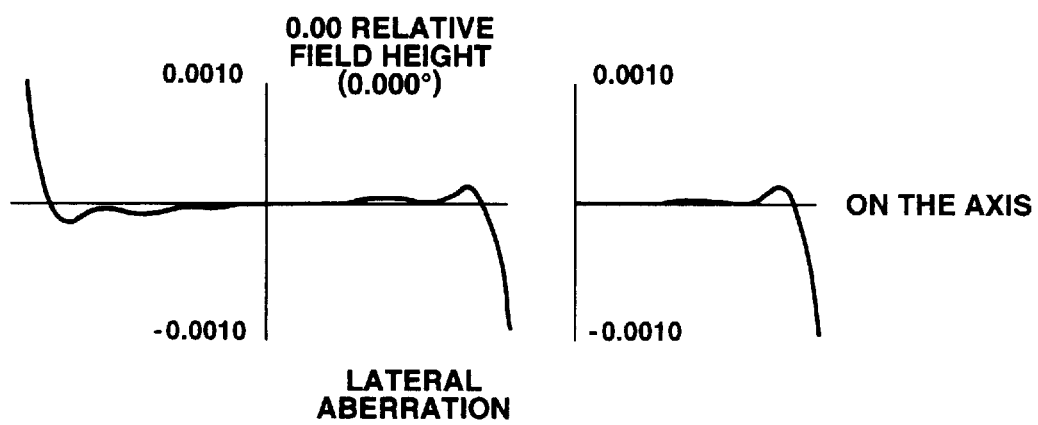
FIG. 20 is a graph showing the lateral aberration (on the axis) of the objective lens shown in FIG. 15.

Design data for the objective lens shown in FIG. 15 is shown in Table 3. A graph showing distortion of the foregoing objective lens is shown in FIG. 16, astigmatism of the same is shown in FIG. 17 and spherical aberration of the same is shown in FIG. 18. A graph showing the lateral aberration (angle of view: 0.5 degree) is shown in FIG. 19 and a graph showing the lateral aberration (on the axis) is shown in FIG. 20.

TABLE 3

| Surface | RDY (Curvature Radius) | THI (Thickness) | GLA (Name of Glass) |
|---|---|---|---|
| OBJ | Infinity | Infinity | |
| STO | Infinity | 0.0 | |
| s1 | 2.46917 | 3.042666 | FCD1 |
| | K: −0.177274 | | |
| | A: −.353215E − 02 | B: −.452433E − 03 | C: −.556160E − 05 |
| | D: −.991159E − 05 | E: −.128023E − 07 | F: −.159371E − 06 |
| s2 | −12.58525 | 0.491772 | |
| | K: −13.032252 | | |
| | A: 0.307368E − 02 | B: 0.799138E − 04 | C: 0.242782E − 03 |
| | D: −.981829E − 04 | E: −.324027E − 04 | F: 0.162258E − 04 |
| s3 | 1.25000 | 1.481326 | BK7 |
| | K: 0.0 | | |
| | A: 0.0 | B: 0.0 | C: 0.0 |
| | D: 0.0 | E: 0.0 | F: 0.0 |
| s4 | Infinity | 0.1 | |
| | K: 0.0 | | |
| | A: 0.0 | B: 0.0 | C: 0.0 |
| | D: 0.0 | E: 0.0 | F: 0.0 |
| s5 | Infinity | 0.1 | CG |
| s6 | Infinity | 0.0 | |
| IMG | Infinity | 0.0 | |

Equation of Aspheric Surface $$X = \frac{Y^2/R}{1 + \{1 - (1+K)(Y/R)^2\}^{1/2}} + AY^4 + BY^6 + CY^8 + DY^{10} + EY^{12} + FY^{14}$$

X: depth from vertex of surface
Y: height from optical axis
R: paraxis R
K: cone constant
A: aspheric coefficient of term $Y^4$
B: aspheric coefficient of term $Y^6$
C: aspheric coefficient of term $Y^8$
D: aspheric coefficient of term $Y^{10}$
E: aspheric coefficient of term $Y^{12}$
F: aspheric coefficient of term $Y^{14}$

| | |
|---|---|
| EPD (Diameter of Entrance Pupil (mm)) | 4.5000 |
| WL (Wavelength (nm)) | 635 |
| Refractivity/Abbe's Number | |
| Name of Glass | |
| FCD1 | 1.494122/81.6 |
| BK7 | 1.515014 |

TABLE 3-continued

| | |
|---|---|
| CG | 1.533 |
| F | 2.3684 |
| (Focal Distance of Overall System) | |
| $F_1$ | 4.4767 |
| (Focal Distance of Lens adjacent to Object) | |

4-2. Lower Limit of Working Distance

Figure 23:
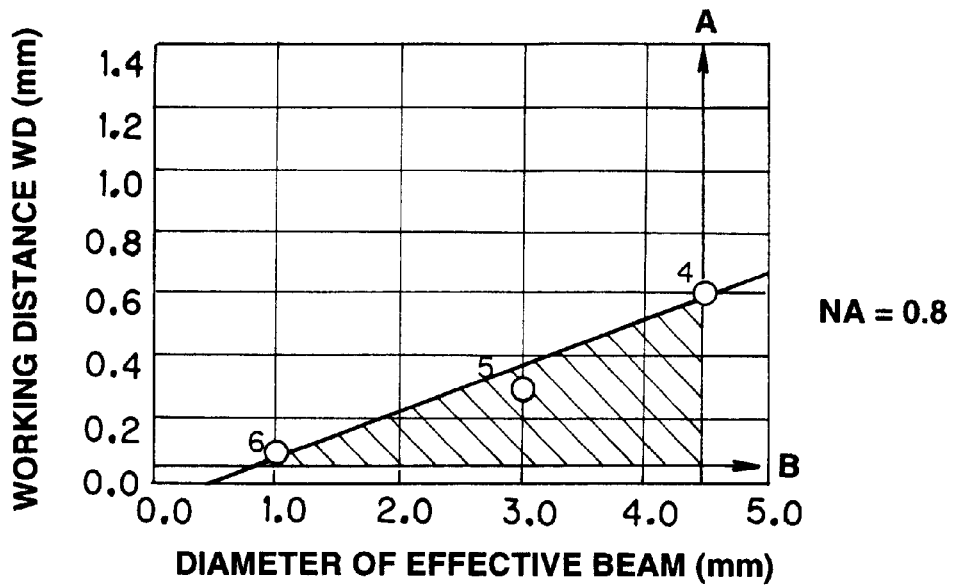
FIG. 23 is a graph showing preferred ranges of the direction of the beam, the working distance and NA (in a case where NA=0.8)

The lower limit of the working distance WD is determined as indicated with B shown in FIGS. 22 to 24. Since the quantity of correction of the spherical aberration can be reduced in proportion to the working distance, the lens can easily be manufactured. In a viewpoint of actual use, a certain working distance must be provided in order to prevent a collision between the objective lens and an optical recording medium, for example, an optical disk, which is being rotated at high speed, when focus search is performed or contact between dust on the surface of the optical recording medium and the objective lens when focus servo is started.

Figure 25:
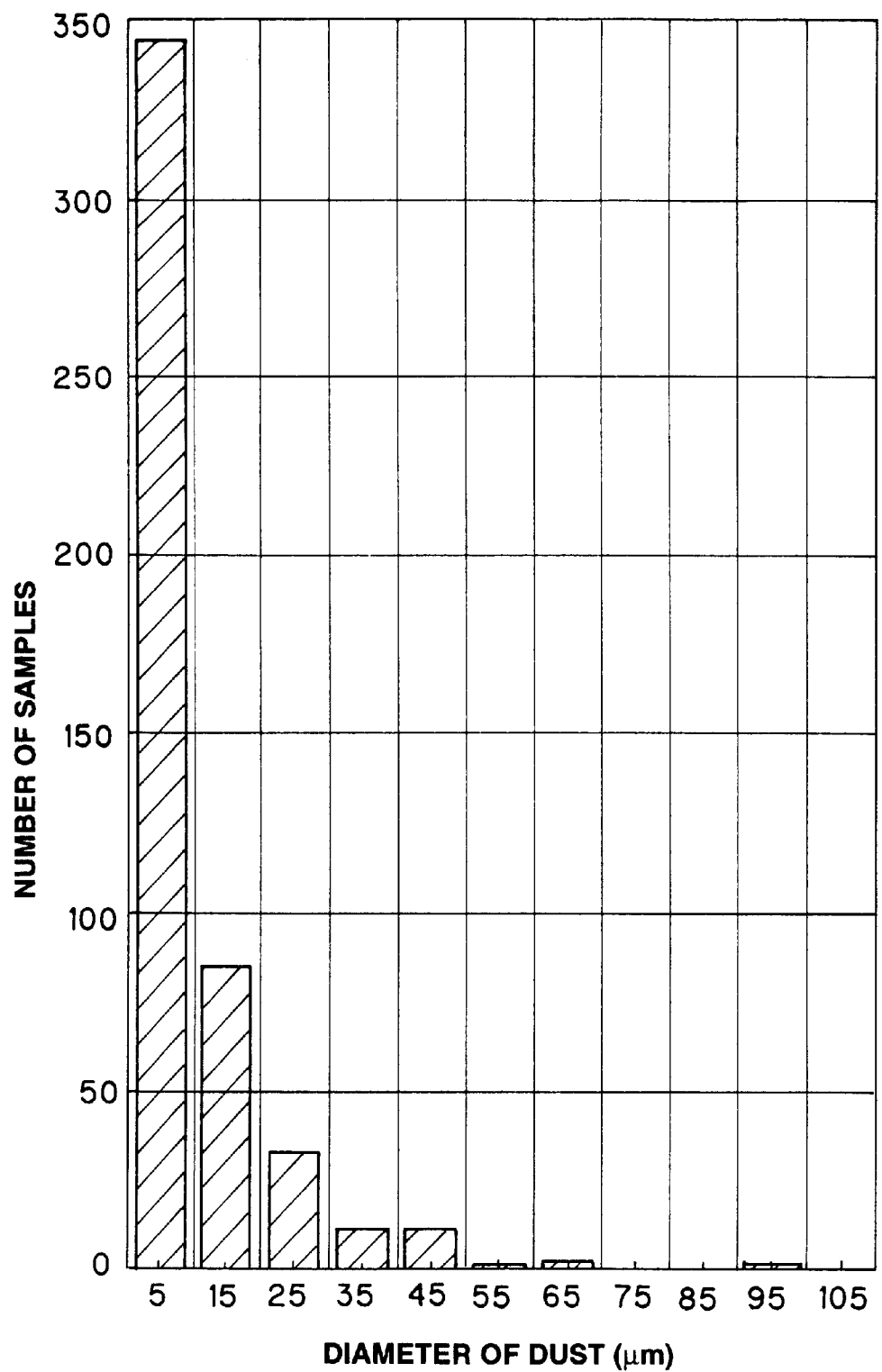
FIG. 25 is a graph showing distribution of size of dust on an optical disk.

Sizes (diameters) of dust on the surface of the optical recording medium allowed to stand in an environment of a room are usually 50 μm or smaller, as shown in FIG. 25. Therefore, the working distance must be 50 μm or greater.

4-3. Upper Limit of Working Distance

The quantity of the spherical aberration, which can be corrected by the doublet lens, with respect to a certain NA and the diameter of the beam depends on the working distance. In the present invention, various lenses are designed in consideration of the curvature (the angle θ is 55 degrees or more), the permissible decentering (±10 μm or more) and permissible angle of view (1 degree or more). Examples of the upper limit of the working distance realizing the above-mentioned permissible ranges are as indicated with points 1 to 9 shown in FIGS. 22 to 24. If the working distance exceeds the above-mentioned upper limits, the spherical aberration is enlarged excessively and therefore the curvature of the lens is sharpened excessively. Therefore, if the design is performed in such a way that the working distance is not included in the regions indicated with diagonal lines shown in FIGS. 22 to 24, the lens cannot easily be manufactured or the lens cannot be used with the optical recording medium. The preferred ranges are expressed with linear approximation performed on the basis of the designed examples, as follows:

If $$1.0 \leq BW < 4.5, 0.05 \leq WD$$

and $$0.7 \leq NA < 0.8,$$

then $$pi\ WD \leq 0.25676BW + 0.039189$$

(see FIG. 22).

If $$0.8 \leq NA < 0.9,$$

then $$WD \leq 0.14054BW - 0.064865$$

(see FIG. 23).

If $$0.9 \leq NA,$$

then $$WD \leq 0.096429BW - 0.244640$$

(see FIG. 24).

The permissible decentering (±10 μm or more) is a value determined on the basis of the accuracy when the lens is manufactured by injection molding using a mold. The permissible angle of view (1 degree or more) is a value determined on the basis of the mounting accuracy about inclination of the doublet lens from the optical axis.

Objective lenses satisfying the above-mentioned conditions shown in FIGS. 22 to 24 will be described such that the objective lens corresponding to point 2 shown in FIG. 22 will be described in an eighth embodiment, that corresponding to point 3 shown in FIG. 22 will be described in a ninth embodiment and that corresponding to point 9 shown in FIG. 24 will be described in a tenth embodiment.

5. Lens in which the ratio ($F_1/F$) of focal distance $F_1$ of the lens adjacent to an object (adjacent to the light source) and focal distance F of the overall system satisfies $$1.7 < (F_1/F) < 2.5$$

The above-mentioned lens is a lens designed to optimally distribute the refracting power of the two lens elements to realize a satisfactory manufacturing efficiency of the lens, that is, the curvature of the surface, the permissible decentering and the permissible angle of view in the range in which the lens can be manufactured. When the state of distribution of the refracting power, which is expressed with the ratio ($F_1/F$) of the focal distance $F_1$ of the first lens (the lens adjacent to the object) 3 and the focal distance F of the overall system satisfies the following range, $$1.7 < (F_1/F) < 2.5,$$

satisfactory great manufacturing tolerance for the lens can be obtained and the refracting power can be distributed optimally.

The foregoing fact indicates a fact that the optimum power distribution is performed when the power of the first lens (lens adjacent to the object) 3 is about ½ of the power of the overall system.

If ($F_1/F$)≤1.7, the focal distance $F_1$ of the first lens (the lens adjacent to the object) 3 is short, that is, the power is great. In this case the curvature, the permissible decentering and the permissible tilt for the first lens (the lens adjacent to the object) 3 are made to be strict. If $2.5 \leq (F_1/F)$, the focal distance $F_1$ of the first lens (the lens adjacent to the object) 3 is elongated and the power is reduced. However, the power of the second lens (lens adjacent to the image) 4 is enlarged. In this case, the curvature, the permissible decentering and the permissible tilt are made to be strict.

Figure 26:
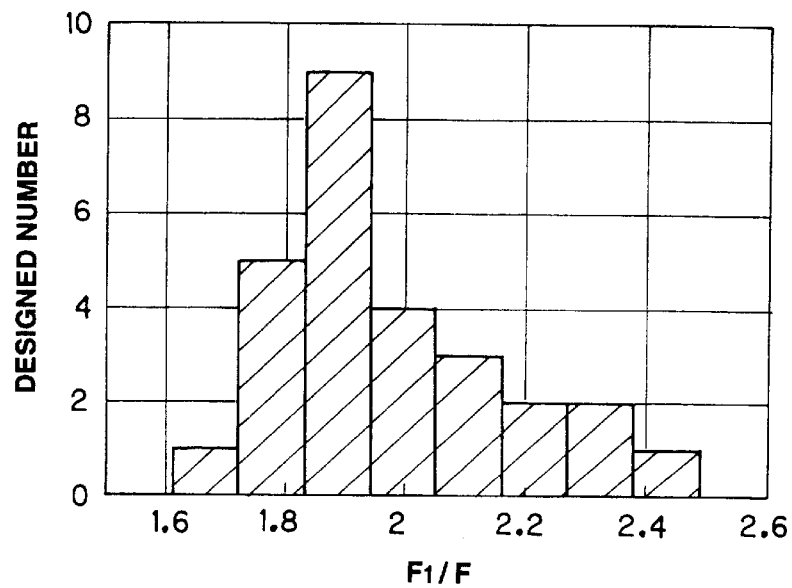
FIG. 26 is a histogram of the ratio $F_1/F$ of the focal distance in an example of design in which the design tolerance is considerably large.

When only the manufacturing tolerance for the lens is considered, the above-mentioned range is sometimes widened according to the NA, the effective diameter of the beam and the working distance. As a result of design and investigation of various lenses and manufacturing tolerances, a histogram about the lens which permitted great manufacturing tolerance was obtained, as shown in FIG. 26. That is, the power distribution can be performed optimally and the manufacturing tolerance can significantly be widened if the following relationship is satisfied:

$$1.7 < (F_1/F) < 2.5.$$

A lens satisfying the above-mentioned relationship will be described in a third embodiment.

6. Lens corrected to correspond to thickness T of a transparent substrate of an optical recording medium as follows:
if $$0.7 < NA \text{ (the number of apertures)} < 0.8,$$

then $$T \leq 0.32 \text{ mm},$$

if $$0.8 \leq NA < 0.9,$$

then $$T \leq 0.20$$

mm, and
if $$0.9 \leq NA,$$

then $$T \leq 0.11 \text{ mm}.$$

The optical recording medium, for example, the optical disk, for use in the optical pickup apparatus to which the objective lens according to the present invention is applied has a transparent substrate (the disk substrate) having a thickness of 0.1 mm which is significantly smaller than 1.2 mm which is the thickness of the conventional CD (Compact Disk) and 0.6 mm which is the thickness of the DVD (Digital Video Disk). The reason for this lies in that the skew margin equivalent or superior to the skew margin realized by the conventional structure by reducing the coma-aberration which is generated attributable to the skew of the optical recording medium. Since the quantity of the coma-aberration, which is generated attributable to the disk skew, is enlarged in proportion to the cube of the NA, a little disk skew rapidly deteriorates the RF when a signal is read by using a high-NA objective lens.

$$W_{31} = (T (n^2-1) n^2 \sin\theta \cos\theta s)/2 (n^2 - \sin^2\theta s)^{(5/2)}) \leftrightarrows (T (n^2-1) NA^3 \theta s)/(2n^3)$$

where n: refractivity of transparent substrate, T: thickness of transparent substrate and θs: angle of skew.

Figure 27:
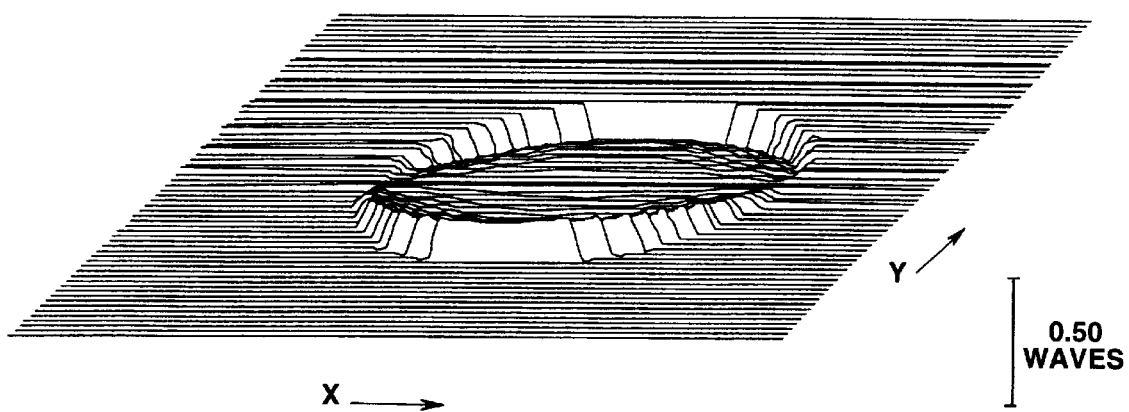
FIG. 27 is a graph showing the wave surface of a beam spot when the disk skew of a DVD (Digital Video Disk) is 0.4 degree.
Figure 28:
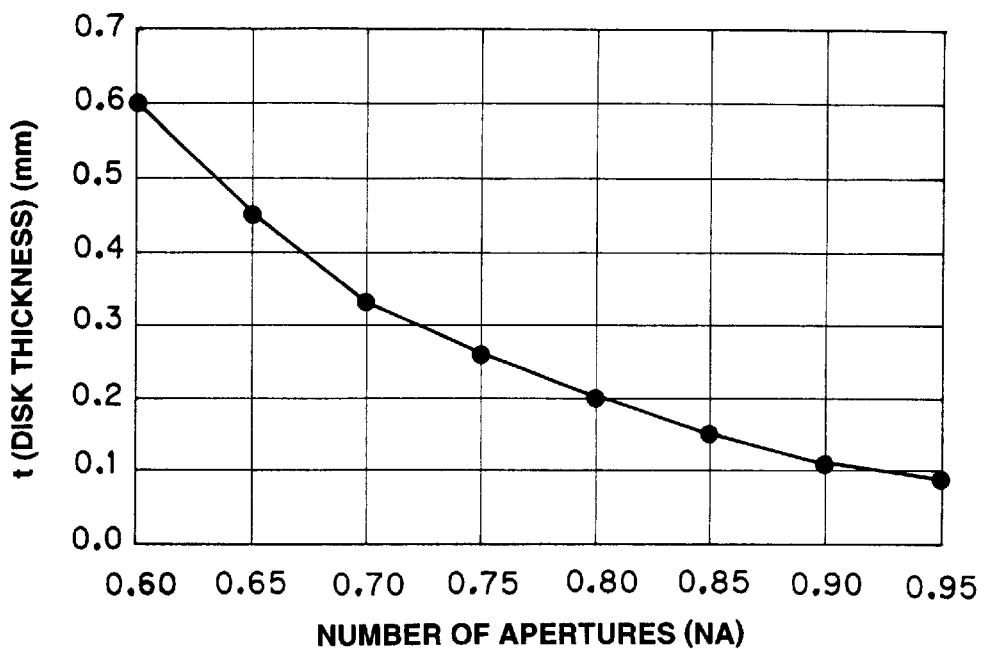
FIG. 28 is a graph showing the thickness of a disk substrate of an optical disk which generates the wavefront aberration which is the same as that generated in FIG. 27.

As can be understood from the above-mentioned equation, the coma-aberration is enlarged in proportion to the thickness T of the transparent substrate. Therefore, reduction in the thickness T of the transparent substrate is an effective means to overcome the skew. An objective lens (NA=0.6) adapted to the DVD (Digital Video Disk) (comprising the disk substrate having a thickness of 0.6 mm) generates wavefront aberration of about 0.043 rms on the imaging surface as shown in FIG. 27 when a skew (a radial skew) having a skew angle θs=0.4 degree exists. When a skew (a radial skew) of θs=0.4 degree exists when NA is enlarged to exceed 0.6, the wavefront aberration on the imaging surface is made to be 0.043 rms by making the thickness of the transparent substrate to be about 0.32 mm in a case where the NA is 0.7, about 0.20 mm in a case where the NA is 0.8 to 0.9 and about 0.11 mm in a case where the NA is 0.9, as shown in FIG. 28. If the thickness of the transparent substrate is smaller than the above-mentioned values, the wavefront aberration can furthermore be reduced.

7. Structure of Optical Pickup Apparatus

Figure 29:
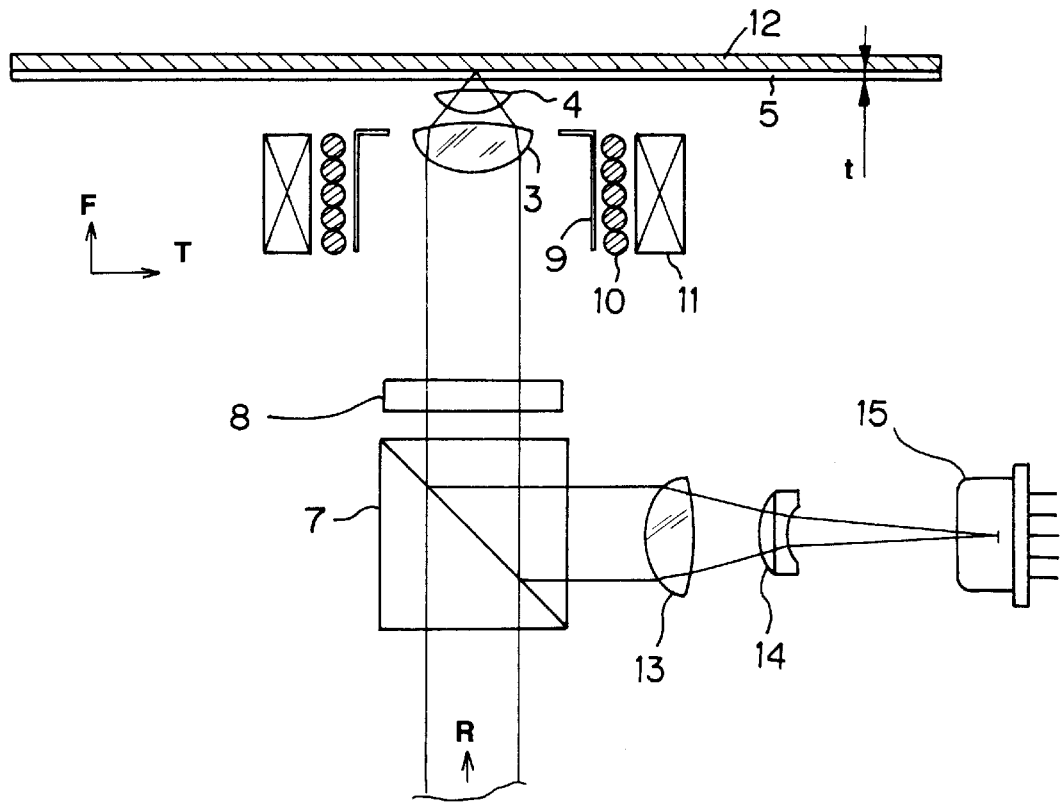
FIG. 29 is a side view showing an essential portion of an optical pickup apparatus according to the present invention.

The optical pickup apparatus according to the present invention may be an apparatus for reproducing an optical disk 12, as shown in FIG. 29. The optical pickup apparatus has the objective lens according to the present invention.

A linearly polarized light beam emitted from a semiconductor laser (not shown) which is a light source, made to be a parallel light beam and having a wavelength of 635 nm is allowed to pass through a polarizing beam splitter (PBS) 7 and a λ/4 (¼-wavelength) plate 8 so as to be brought into a circularly polarized state. The circularly polarized laser beam is allowed to pass through the objective lens and the disk substrate 5 so as to be converged on the signal recording surface of the optical disk 12. The disk substrate 5 is a thin substrate having a thickness of 0.1 mm. The foregoing objective lens is a lens formed by combining two aspheric lenses 3 and 4 and having an NA of 0.7 to 0.95.

The above-mentioned optical disk 12 is a single-layered or a multilayered disk manufactured by bonding a glass plate having a thickness of 1.2 mm to reinforce the strength of the disk substrate 5 having a thickness of 0.1 mm.

The laser beam reflected by the signal recording surface is returned through the original optical path, and then allowed to pass through the λ/4 plate 8. Thus, the laser beam is made to be a linearly polarized laser beam rotated by 90 degrees from the forward linearly polarized direction. The laser beam is reflected by the linearly polarizing beam splitter 7, and then allowed to pass through a focusing lens (a converging lens) 13 and a multilens 14 so as to be detected as an electric signal by a photodetector (PD) 15.

The multilens 14 has an incidental surface formed into a surface of a cylinder (a cylindrical surface) and an emission surface formed into a concave shape. The multilens 14 realizes astigmatism for enabling a focus error signal to be detected from the incidental laser beam by a so-called astigmatism method. The photodetector 15 is a photodiode having six elements arranged to output electric signals for performing the focus adjustment by the astigmatism method and the tracking adjustment by a so-called 3-beam method.

8. Modification

The objective lens according to the present invention is not limited to the lens of the so-called infinite system having an object point (the light source). The objective lens may be designed as a finite-system lens structured such that the object point (the light source) is positioned for a finite distance.

Embodiments

Embodiments of the objective lens according to the present invention will now be described. In the foregoing embodiments, the material for manufacturing the transparent substrate 5 is CG (having a refractivity of 1.533 when the wavelength is 635 nm and 1.5769 when the wavelength is 680 nm).

First Embodiment

An objective lens according to this embodiment has a structure in which the lenses 3 and 4 are manufactured by low-diffusion optical glass (BACD5) having an Abbe's number vd of 61.3 on the d-line and a refractivity of 1.589.

Figure 30:
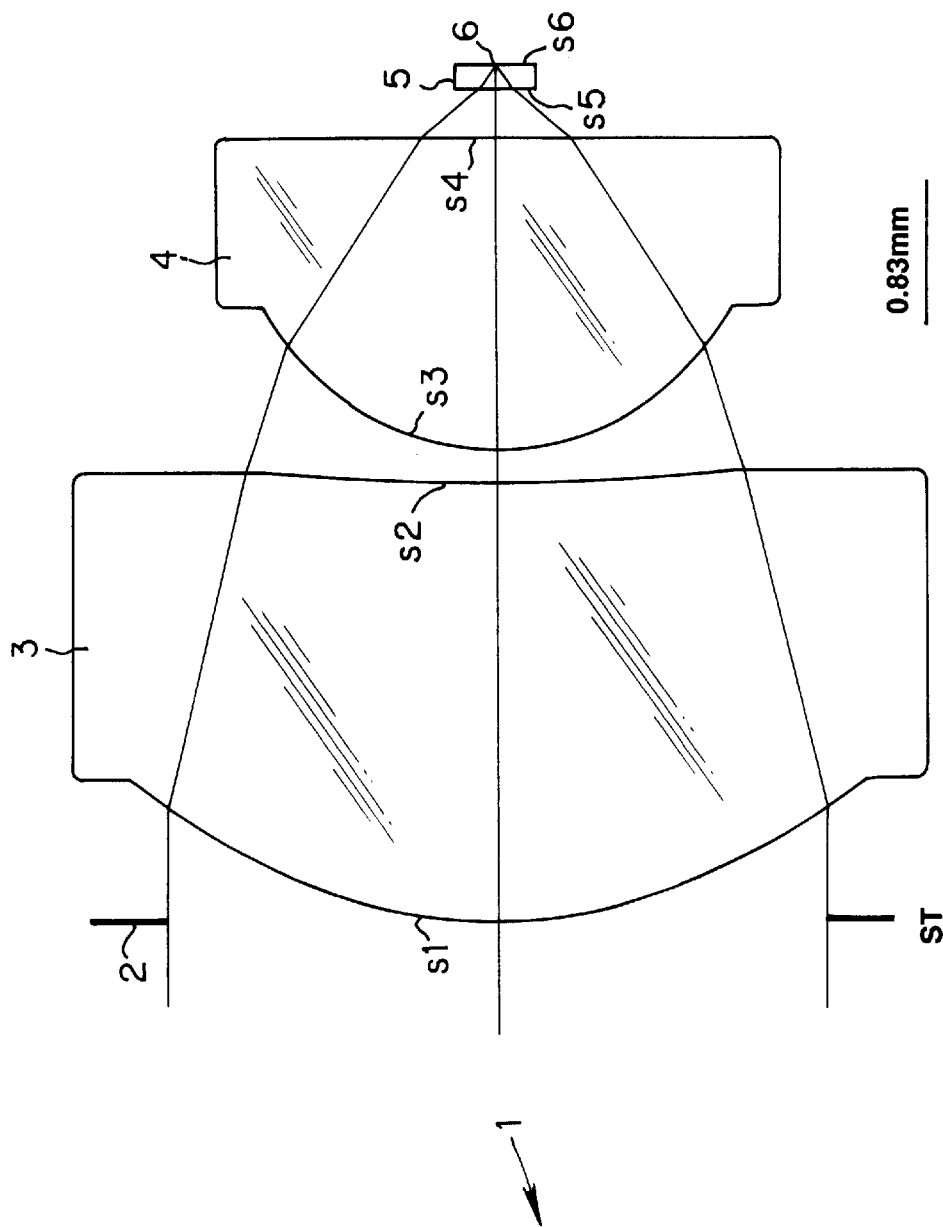
FIG. 30 is a side view showing an essential portion of the structure of a first embodiment of the objective lens according to the present invention.
Figures 31, 32, 33:
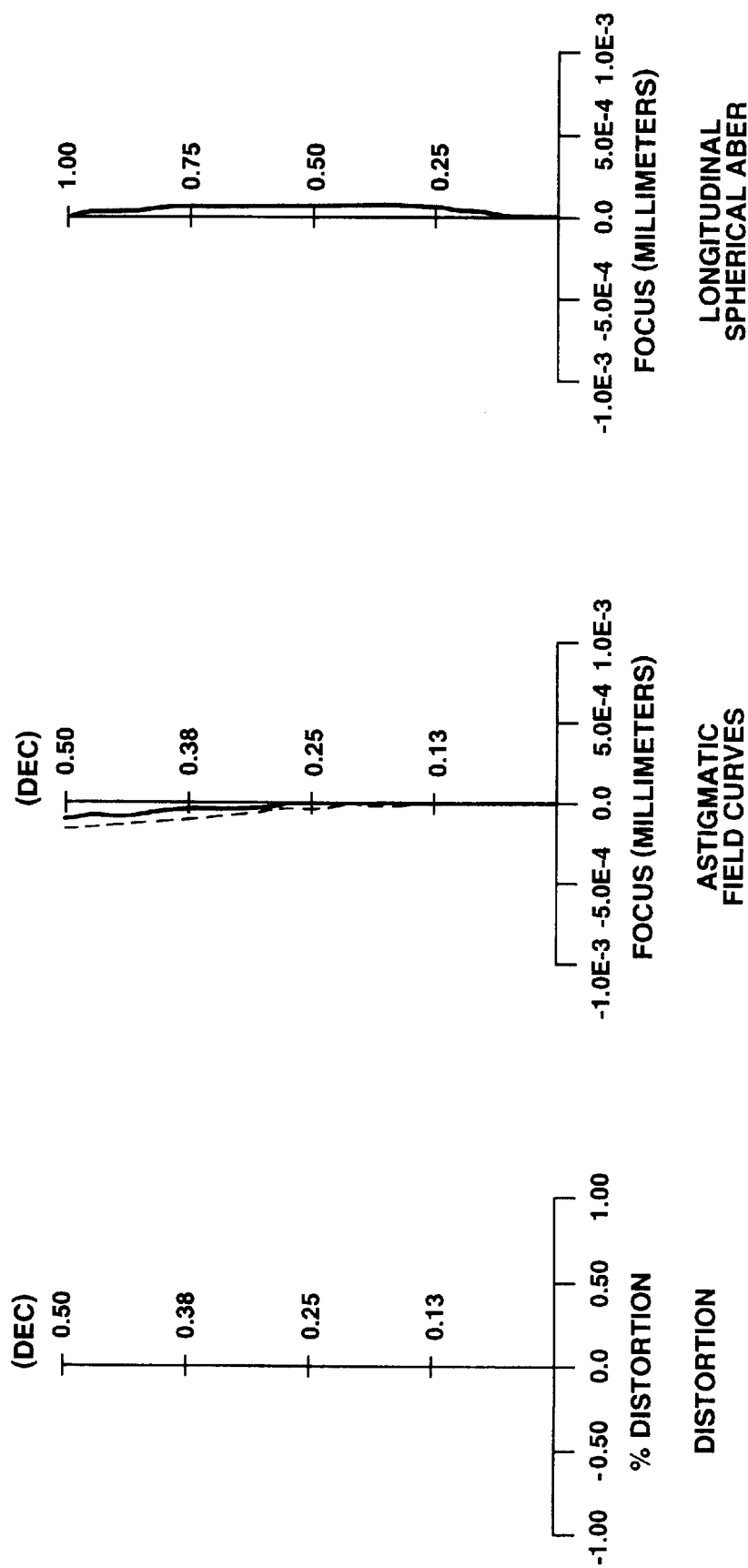
FIG. 31 is a graph showing distortion of the objective lens shown in FIG. 30.
FIG. 32 is a graph showing astigmatism of the objective lens shown in FIG. 30.
FIG. 33 is a graph showing spherical aberration of the objective lens shown in FIG. 30.
Figure 34:
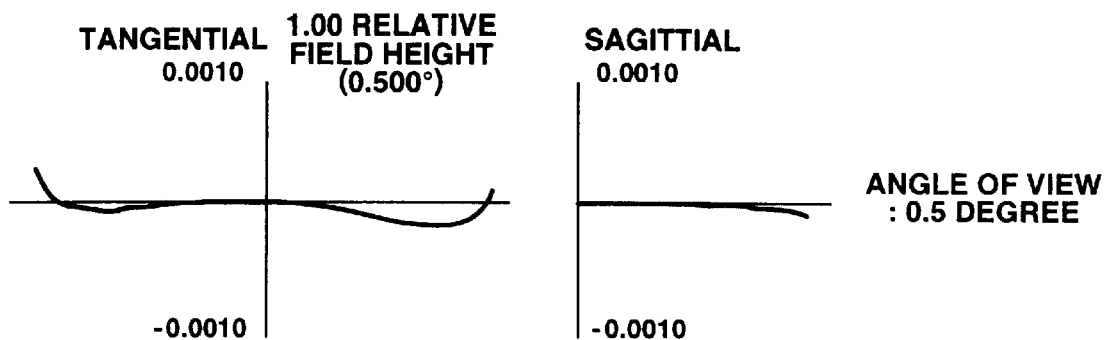
FIG. 34 is a graph showing lateral aberration (angle of view: 0.5 degree) of the objective lens shown in FIG. 30.
Figure 35:
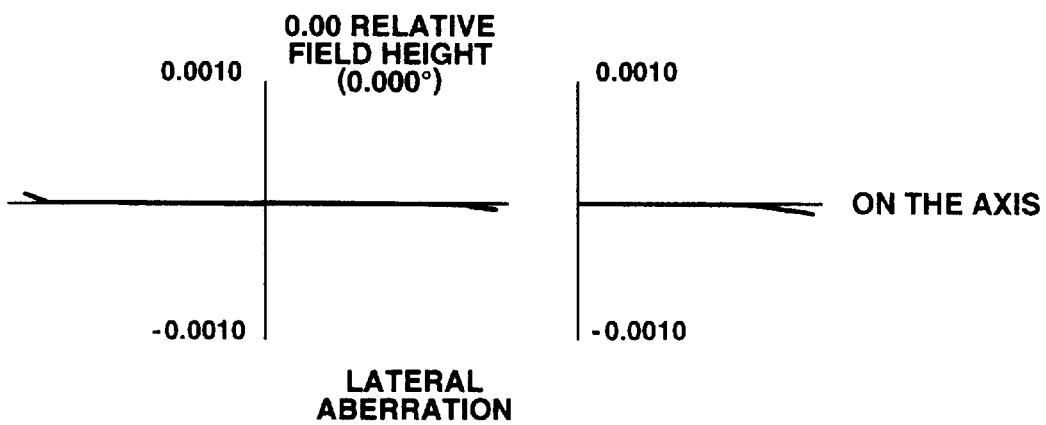
FIG. 35 is a graph showing the lateral aberration (on the axis) of the objective lens shown in FIG. 30.

An optical path is shown in FIG. 30. A graph showing distortion of the foregoing objective lens is shown in FIG. 31, astigmatism of the same is shown in FIG. 32 and spherical aberration of the same is shown in FIG. 33. A graph showing the lateral aberration (angle of view: 0.5 degree) is shown in FIG. 34 and a graph showing the lateral aberration (on the axis) is shown in FIG. 35.

Figure 36:
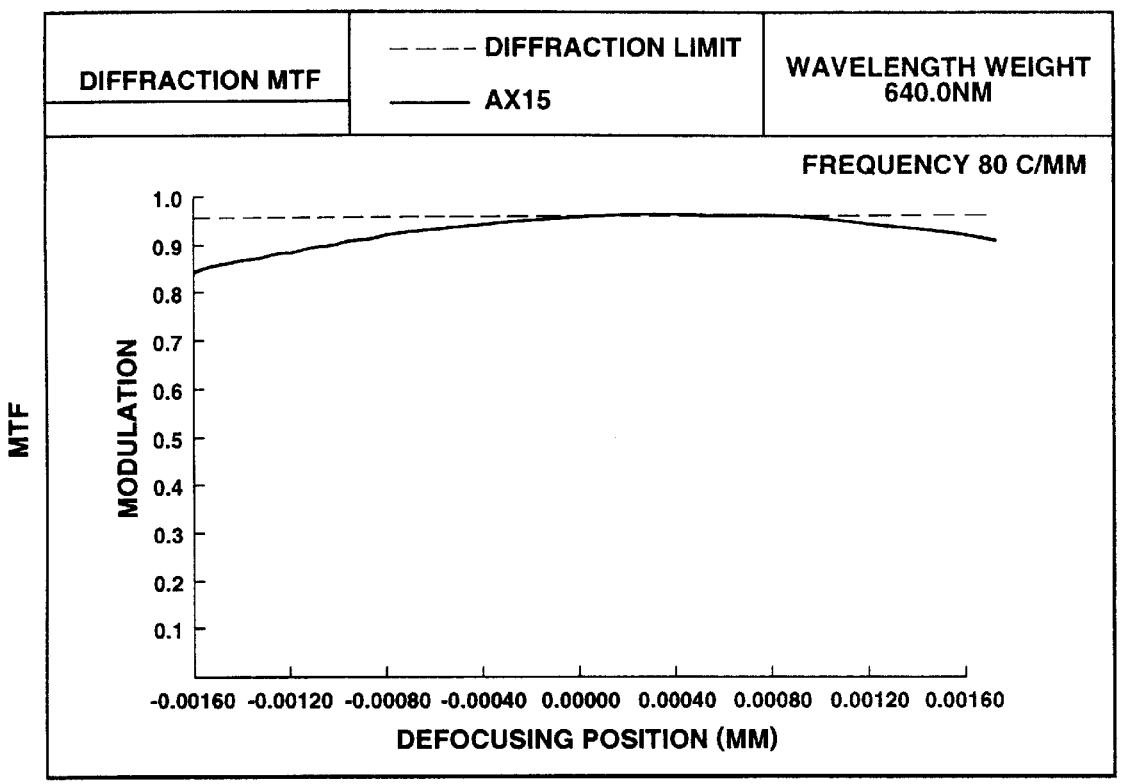
FIG. 36 is a graph showing MTF (Modulation Transfer Function) of the objective lens shown in FIG. 30.
Figure 37:
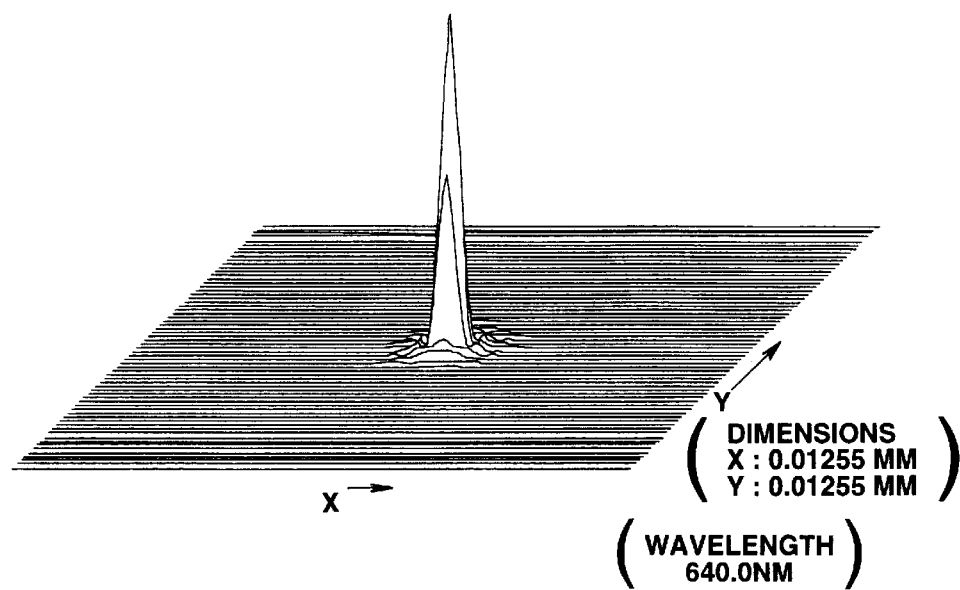
FIG. 37 is a graph showing (Modulation Transfer Function) of the objective lens shown in FIG. 30.

When the NA is made to be 0.8 by limiting the opening by using the stop 2, defocus with respect to change in the wavelength of the +5 nm semiconductor laser is 0.331 $\mu$m. The MTF (Modulation Transfer Function) when the spatial frequency in the direction of the optical axis near the imaging point is 80/mm is shown in FIG. 36 and PSF (point image intensity function) is shown in FIG. 37. As can be understood from FIG. 36, the peak of the degree of modulation is shifted and defocused from the focus position 0.0.

The conditions of the design are as shown in Table 4. The lens according to this embodiment is able to satisfactorily prevent chromatic aberration even if the focal distance is elongated or even if the NA is enlarged.

TABLE 4

| Surface | RDY (Curvature Radius) | THI (Thickness) | GLA (Name of Glass) |
|---|---|---|---|
| OBJ | Infinity | Infinity | |
| STO | Infinity | 0.0 | |
| s1 | 2.20755 | 1.936777 | BACD5 |
| | K: −0.113185 | | |
| | A: −.352973E − 02 | B: −.927936E − 03 | C: −.279329E − 03 |
| | D: −.444713E − 04 | E: −.158207E − 05 | F: −.142540E − 04 |
| s2 | 7.47812 | 0.173619 | |
| | K: 0.799767 | | |
| | A: 0.402205E − 02 | B: −.177572E − 02 | C: −.169497E − 02 |
| | D: −.116911E − 02 | E: −.260040E − 03 | F: 0.313890E − 03 |
| s3 | 1.07896 | 1.398201 | BACD5 |
| | K: −0.089540 | | |
| | A: −.767323E − 04 | B: 0.278212E − 02 | C: −.471041E − 02 |
| | D: −.133615E − 02 | E: 0.114466E − 02 | F: −.523864E − 02 |
| s4 | 6.15302 | 0.200 | |
| | K: −1022.954450 | | |
| | A: 0.352446E + 00 | B: −.575917E + 00 | C: 0.111774E + 01 |
| | D: 0.174499E + 01 | E: 0.203429E − 12 | F: 0.12891E − 13 |
| s5 | Infinity | 0.1 | CG |
| s6 | Infinity | 0.0 | |
| IMG | Infinity | 0.0 | |

Equation of Aspheric Surface $$X = \frac{Y^2/R}{1 + \{1 - (1 + K)(Y/R)^2\}^{1/2}} + AY^4 + BY^6 + CY^8 + DY^{10} + EY^{12} + FY^{14}$$

X: depth from vertex of surface
Y: height from optical axis
R: paraxis R
K: cone constant
A: aspheric coefficient of term $Y^4$
B: aspheric coefficient of term $Y^6$
C: aspheric coefficient of term $Y^8$
D: aspheric coefficient of term $Y^{10}$
E: aspheric coefficient of term $Y^{12}$
F: aspheric coefficient of term $Y^{14}$

| | |
|---|---|
| EPD (Diameter of Entrance Pupil (mm)) | 2.928 |
| WL (Wavelength (nm)) | 635.0 |
| Refractivity/Abbe's Number | |
| Name of Glass | |
| BACD5 | 1.587007/61.3 |
| CG | 1.533 |
| F (Focal Distance of Overall System) | 1.83 |
| $F_1$ (Focal Distance of Lens adjacent to Object) | 4.6974 |

Second Embodiment

An objective lens according to this embodiment has a structure in which the lenses 3 and 4 are manufactured by is prevented satisfactorily and the curvature of the second lens (the lens adjacent to the image) 4 is made to be gentle so that machining of the lens is performed easily.

TABLE 5

| Surface | RDY (Curvature Radius) | THI (Thickness) | GLA (Name of Glass) |
|---|---|---|---|
| OBJ | Infinity | Infinity | |
| STO | Infinity | 0.0 | |
| s1 | 2.15182 | 2.085603 | FCD1 |
| | K: −0.133331 | | |
| | A: −.396302E − 02 | B: −.136579E − 02 | C: −.269158E − 03 |
| | D: −.140877E − 04 | E: 0.130101E − 05 | F: −.148648E − 04 |
| s2 | 8.28264 | 0.311261 | |
| | K: −3.211588 | | |
| | A: 0.307942E − 02 | B: −.169672E − 02 | C: −.152057E − 02 |
| | D: −.710548E − 03 | E: −.165963E − 03 | F: 0.261243E − 03 |
| s3 | 1.08326 | 1.436933 | BACD5 |
| | K: −0.090747 | | |
| | A: −.933930E − 03 | B: −.405559E − 02 | C: −.606131E − 02 |
| | D: −.497401E − 02 | E: −.318784E − 02 | F: −.784888E − 02 |
| s4 | −4.03999 | 0.2000 | |
| | K: −1932.300730 | | |
| | A: 0.180398E + 00 | B: −.249506E + 00 | C: −.392373E + 00 |
| | D: 0.245165E + 01 | E: 0.203472E − 12 | F: 0.124909E − 13 |
| s5 | Infinity | 0.1 | CG |
| s6 | Infinity | 0.0 | |
| IMG | Infinity | 0.0 | |

Equation of Aspheric Surface $$X = \frac{Y^2/R}{1 + \{1 - (1+K)(Y/R)^2\}^{1/2}} + AY^4 + BY^6 + CY^8 + DY^{10} + EY^{12} + FY^{14}$$

X: depth from vertex of surface
Y: height from optical axis
R: paraxis R
K: cone constant
A: aspheric coefficient of term $Y^4$
B: aspheric coefficient of term $Y^6$
C: aspheric coefficient of term $Y^8$
D: aspheric coefficient of term $Y^{10}$
E: aspheric coefficient of term $Y^{12}$
F: aspheric coefficient of term $Y^{14}$

| | |
|---|---|
| EPD (Diameter of Entrance Pupil (mm)) | 2.928 |
| WL (Wavelength (nm)) | 635.0 |
| Refractivity/Abbe's Number | |
| Name of Glass | |
| FCD1 | 1.494122/81.6 |
| BACD5 | 1.587007/61.3 |
| CG | 1.533 |
| F (Focal Distance of Overall System) | 1.83 |
| $F_1$ (Focal Distance of Lens adjacent to Object) | 5.2884 | optical glass (FCD1) having an Abbe's number vd on the d-line of 81.6 and optical glass (BACD5) having an Abbe's number vd of 61.3.

Figure 38:
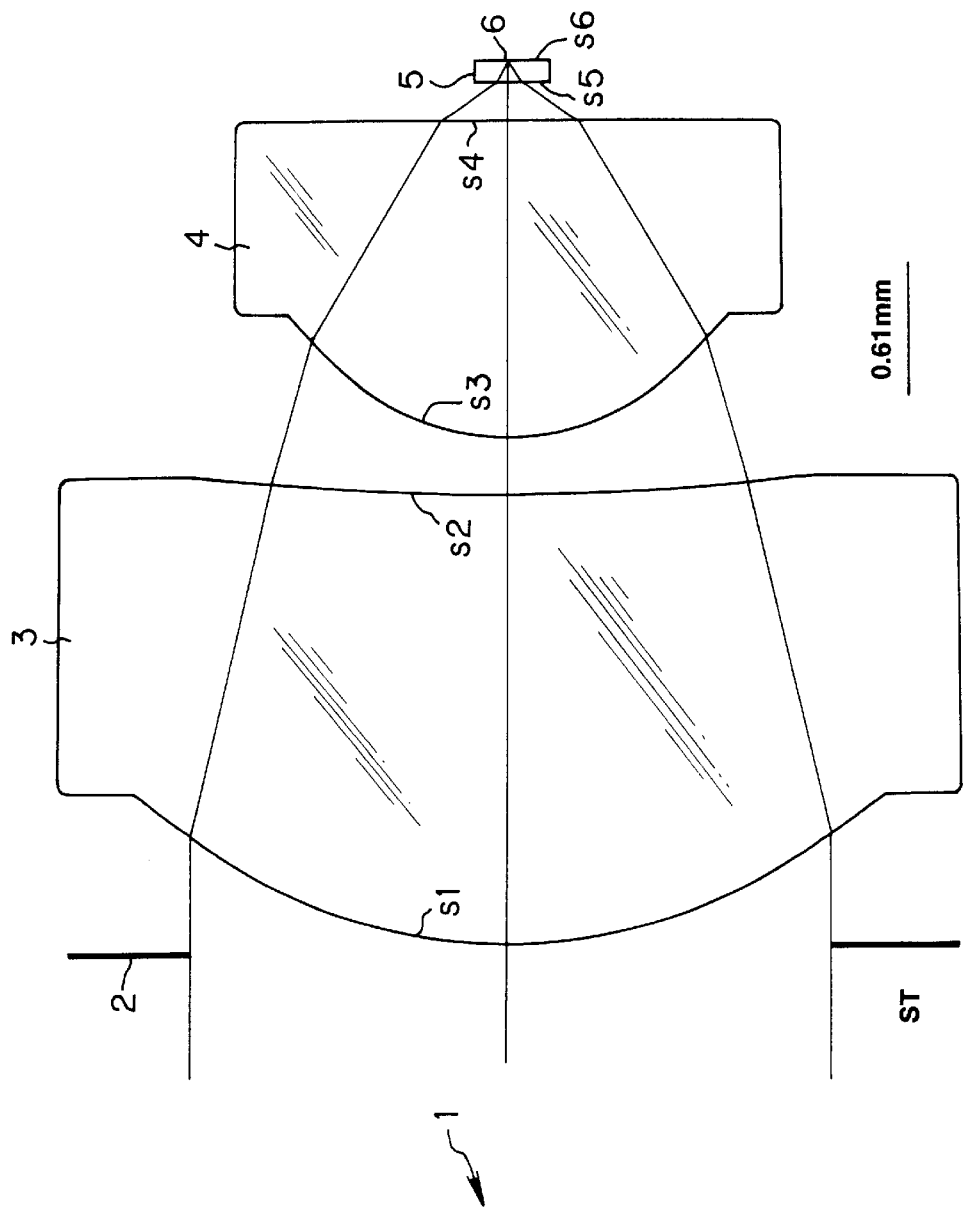
FIG. 38 is a vertical cross sectional view showing the structure of a second embodiment of the objective lens according to the present invention.
Figure 42:
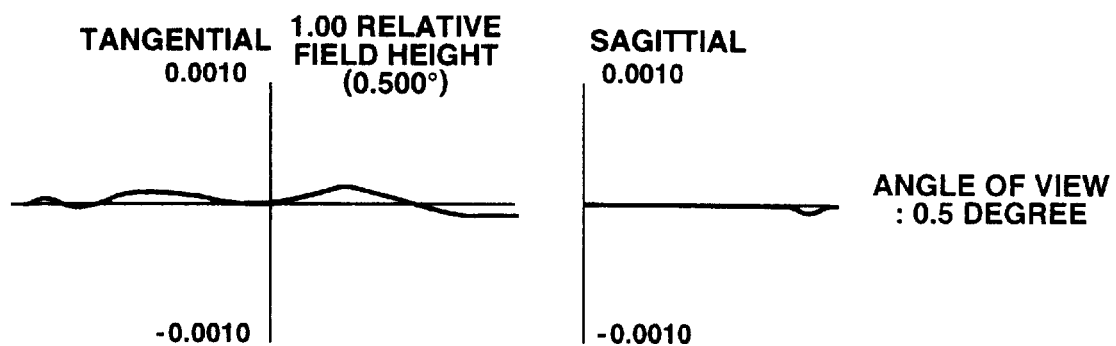
FIG. 42 is a graph showing lateral aberration (angle of view: 0.5 degree) of the objective lens shown in FIG. 38.
Figure 43:
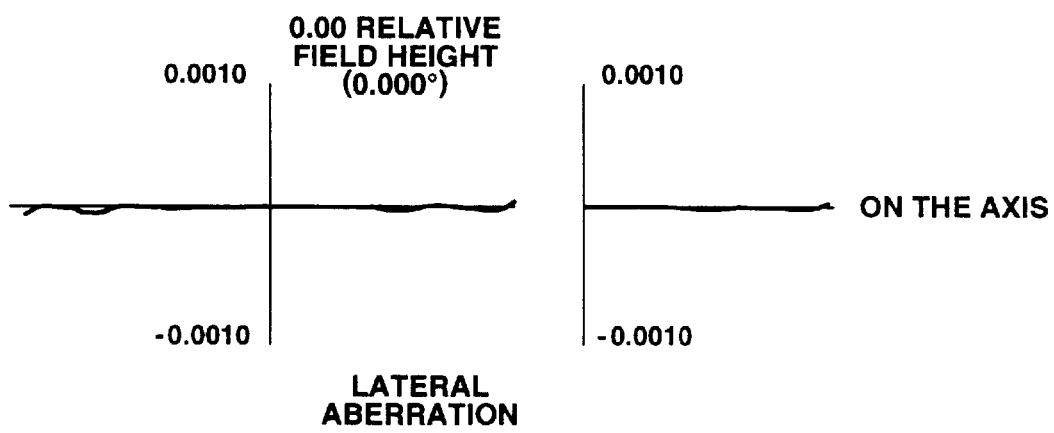
FIG. 43 is a graph showing the lateral aberration (on the axis) of the objective lens shown in FIG. 38.

An optical path is shown in FIG. 38. A graph showing distortion of the foregoing objective lens is shown in FIG. 39, astigmatism of the same is shown in FIG. 40 and spherical aberration of the same is shown in FIG. 41. A graph showing the lateral aberration (angle of view: 0.5 degree) is shown in FIG. 42 and a graph showing the lateral aberration (on the axis) is shown in FIG. 43. The conditions of the design are as shown in Table 5. The objective lens according to this embodiment is structured in such a manner that the optical glass having a higher refractivity is employed to manufacture the second lens (the lens adjacent to the image) 4 as compared with that of the first lens (the lens adjacent to the object) 3. Thus, the chromatic aberration Third embodiment An objective lens according to this embodiment has a structure in which the lenses 3 and 4 are manufactured by optical glass (FCD1) having an Abbe's number vf 81.6 and optical glass (BACD5) having an Abbe's number vd of 61.3.

Figure 44:
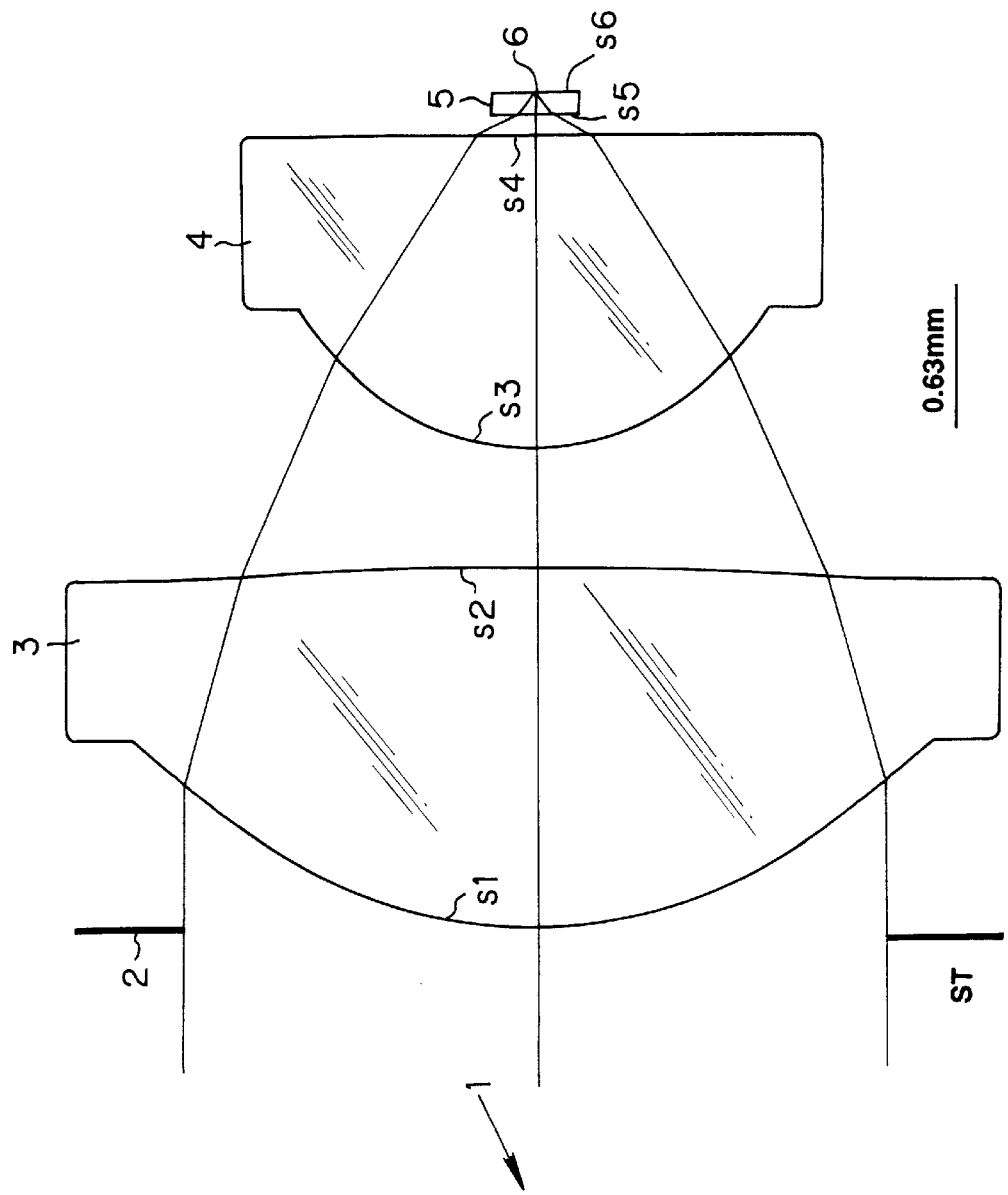
FIG. 44 is a vertical cross sectional view showing the structure of a third embodiment of the objective lens according to the present invention.
Figure 48:
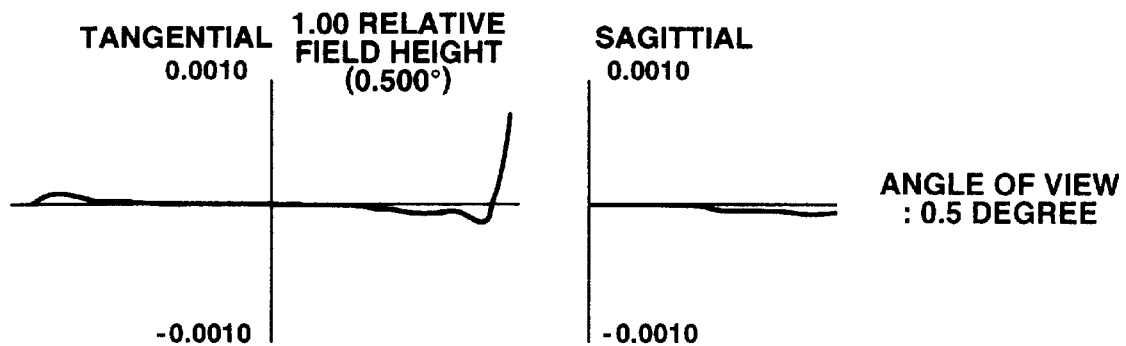
FIG. 48 is a graph showing lateral aberration (angle of view: 0.5 degree) of the objective lens shown in FIG. 44.
Figure 49:
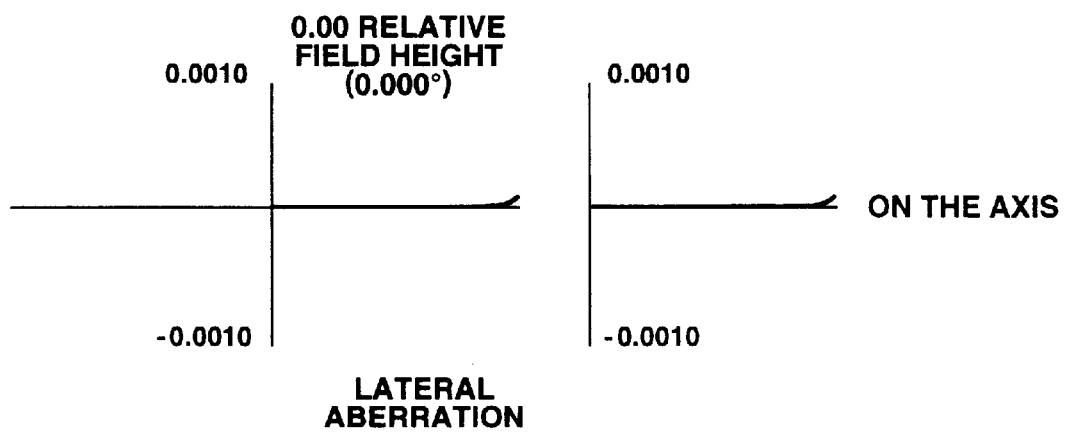
FIG. 49 is a graph showing the lateral aberration (on the axis) of the objective lens shown in FIG. 44.

An optical path is shown in FIG. 44. A graph showing distortion of the foregoing objective lens is shown in FIG. 45, astigmatism of the same is shown in FIG. 46 and spherical aberration of the same is shown in FIG. 47. A graph showing the lateral aberration (angle of view: 0.5 degree) is shown in FIG. 48 and a graph showing the lateral aberration (on the axis) is shown in FIG. 49. The conditions of the design are as shown in Table 6. The objective lens according to this embodiment satisfies the above-mentioned conditions as $1.7 < (F_1/F) < 2.5$. Therefore, the design according to this embodiment enables the power distribution to be made optimally and the manufacturing tolerance for the lenses 3 and 4 to be enlarged.

TABLE 6

| Surface | RDY (Curvature Radius) | THI (Thickness) | GLA (Name of Glass) |
|---|---|---|---|
| OBJ | Infinity | Infinity | |
| STO | Infinity | 0.0 | |
| s1 | 1.90838 | 1.567111 | FCD1 |
| | K: −0.192781 | | |
| | A: −.584096E − 02 | B: −.154354E − 02 | C: −.224902E − 03 |
| | D: −.150574E − 03 | E: 0.499346E − 04 | F: −.163557E − 04 |
| s2 | −47.77042 | 0.535335 | |
| | K: −1884.160827 | | |
| | A: 0.206660E − 02 | B: −.614175E − 03 | C: 0.604320E − 04 |
| | D: −.157033E − 03 | E: 0.678618E − 04 | F: 0.497349E − 04 |
| s3 | 1.1174 | 1.350462 | BACD5 |
| | K: −0.121891 | | |
| | A: 0.240825E − 02 | B: −.204726E − 02 | C: 0.143610E + 01 |
| | D: −.299060E − 01 | E: 0.623946E − 02 | F: −.297252E − 02 |
| s4 | −13.11538 | 0.1 | |
| | K: −54.236007 | | |
| | A: −.116656E + 00 | B: −.143241E + 01 | C: 0.655851E + 01 |
| | D: 0.797153E + 02 | E: −.477310E − 14 | F: −.161325E − 15 |
| s5 | Infinity | 0.1 | CG |
| s6 | Infinity | 0.0 | |
| IMG | Infinity | 0.0 | |

Equation of Aspheric Surface $$X = \frac{Y^2/R}{1 + \{1 - (1 + K)(Y/R)^2\}^{1/2}} + AY^4 + BY^6 + CY^8 + DY^{10} + EY^{12} + FY^{14}$$

X: depth from vertex of surface
Y: height from optical axis
R: paraxis R
K: cone constant
A: aspheric coefficient of term $Y^4$
B: aspheric coefficient of term $Y^6$
C: aspheric coefficient of term $Y^8$
D: aspheric coefficient of term $Y^{10}$
E: aspheric coefficient of term $Y^{12}$
F: aspheric coefficient of term $Y^{14}$

| | |
|---|---|
| EPD (Diameter of Entrance Pupil (mm)) | 3.000 |
| WL (Wavelength (nm)) | 635 |
| Refractivity/Abbe's Number Name of Glass | |
| FCD1 | 1.494122/81.6 |
| BACD5 | 1.587007/61.3 |
| CG | 1.533 |
| F (Focal Distance of Overall System) | 1.7240 |
| $F_1$ (Focal Distance of Lens adjacent to Object) | 3.753 |

Fourth Embodiment

An objective lens according to this embodiment has a structure in which the lenses 3 and 4 are manufactured by optical glass (FCD1) having an Abbe's number vd of 81.6 on the d-line and optical glass (BACD5) having an Abbe's number vd of 61.3.

Figure 50:
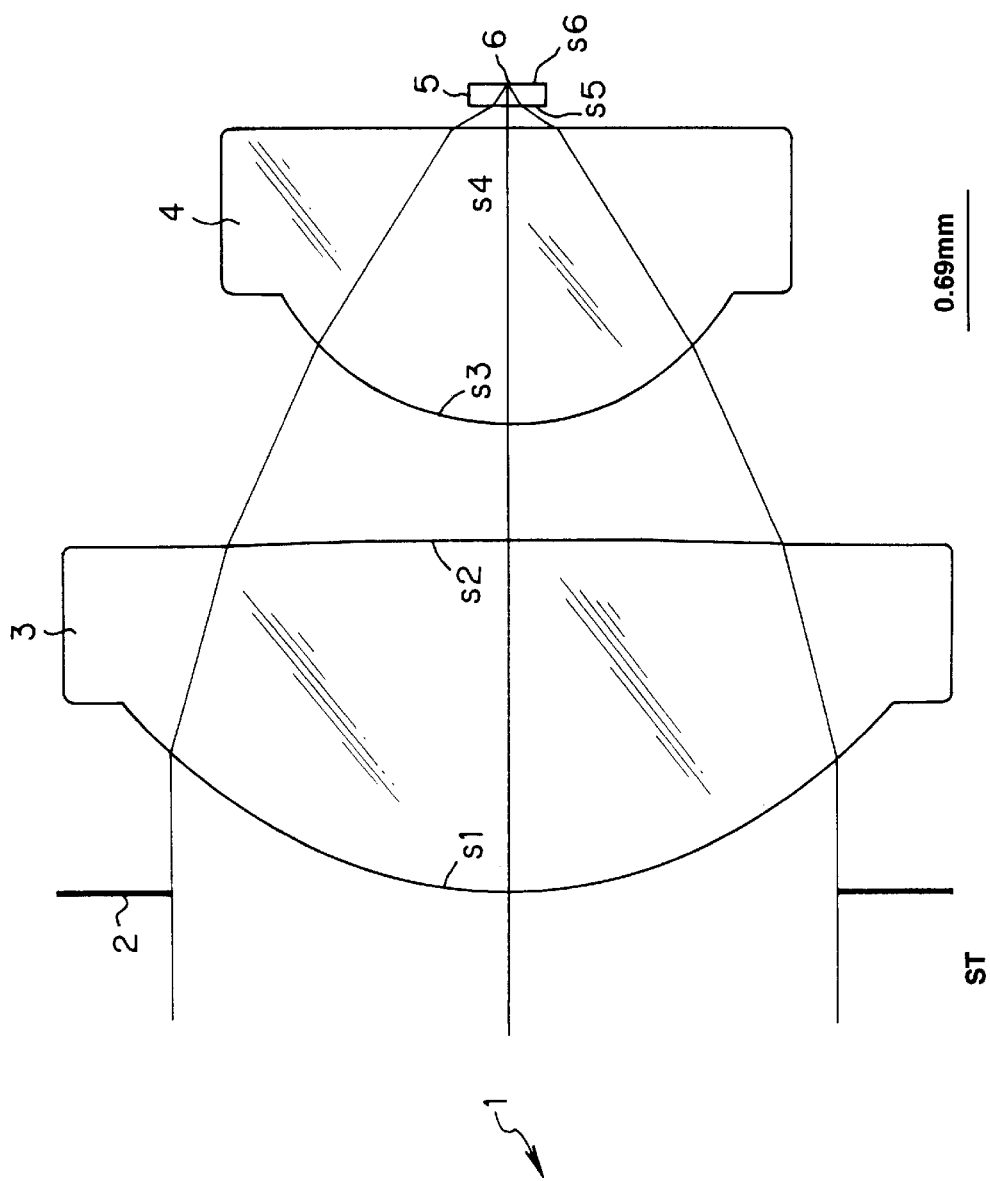
FIG. 50 is a vertical cross sectional view showing the structure of a fourth embodiment of the objective lens according to the present invention.
Figure 54:
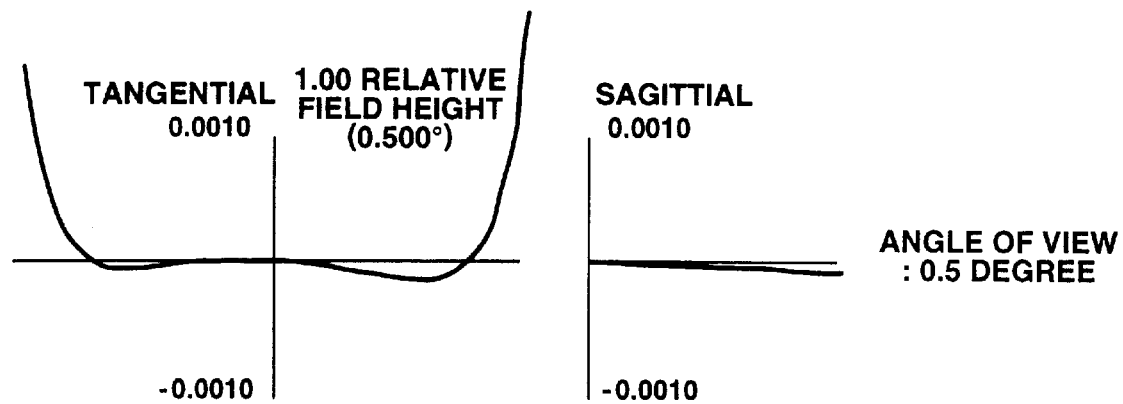
FIG. 54 is a graph showing lateral aberration (angle of view: 0.5 degree) of the objective lens shown in FIG. 50.
Figure 55:
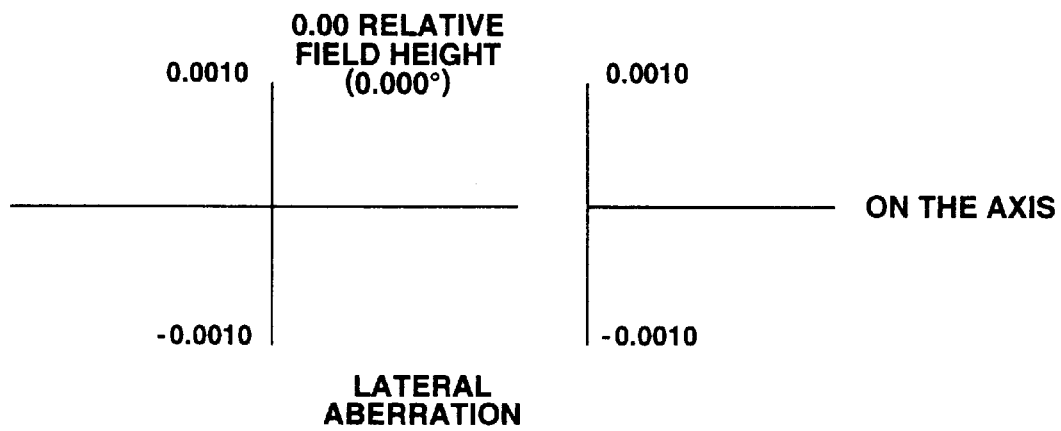
FIG. 55 is a graph showing the lateral aberration (on the axis) of the objective lens shown in FIG. 50.

An optical path is shown in FIG. 50. A graph showing distortion of the foregoing objective lens is shown in FIG. 51, astigmatism of the same is shown in FIG. 52 and spherical aberration of the same is shown in FIG. 53. A graph showing the lateral aberration (angle of view: 0.5 degree) is shown in FIG. 54 and a graph showing the lateral aberration (on the axis) is shown in FIG. 55. The conditions of the design are as shown in Table 7.

TABLE 7

| Surface | RDY (Curvature Radius) | THI (Thickness) | GLA (Name of Glass) |
|---|---|---|---|
| OBJ | Infinity | Infinity | |
| STO | Infinity | 0.0 | |
| s1 | 1.90713 | 1.572909 | FCD1 |
| | K: −0.197701 | | |

TABLE 7-continued

|  |  |  |  |
|---|---|---|---|
|  | A: −.651357E − 02 | B: −.160952E − 02 | C: −.178084E − 03 |
|  | D: −.123607E − 03 | E: 0.560740E − 04 | F: −.153752E − 04 |
| s2 | −56.67697 | 0.536935 |  |
|  | K: −2844.414929 |  |  |
|  | A: 0.214002E − 02 | B: −.604610E − 03 | C: 0.185228E − 03 |
|  | D: −.215933E − 04 | E: 0.120640E − 03 | F: −.108143E − 04 |
| s3 | 1.11205 | 1.351409 | BACD5 |
|  | K: −0.111875 |  |  |
|  | A: 0.734171E − 02 | B: −.120690E − 03 | C: 0.156026E − 01 |
|  | D: −.300969E − 01 | E: 0.367300E − 03 | F: −.297252E − 02 |
| s4 | −9.43955 | 0.1 |  |
|  | K: −963.993459 |  |  |
|  | A: −.255448E − 01 | B: −.203457E + 00 | C: −.190844E + 01 |
|  | D: 0.573442E + 02 | E: −.477310E − 14 | F: −.161324E − 15 |
| s5 | Infinity | 0.1 | CG |
| s6 | Infinity | 0.0 |  |
| IMG | Infinity | 0.0 |  |

Equation of Aspheric Surface $$X = \frac{Y^2/R}{1 + \{1 - (1 + K)(Y/R)^2\}^{1/2}} + AY^4 + BY^6 + CY^8 + DY^{10} + EY^{12} + FY^{14}$$

X: depth from vertex of surface
Y: height from optical axis
R: paraxis R
K: cone constant
A: aspheric coefficient of term $Y^4$
B: aspheric coefficient of term $Y^6$
C: aspheric coefficient of term $Y^8$
D: aspheric coefficient of term $Y^{10}$
E: aspheric coefficient of term $Y^{12}$
F: aspheric coefficient of term $Y^{14}$

| | |
|---|---|
| EPD (Diameter of Entrance Pupil (mm)) | 3.000 |
| WL (Wavelength (nm)) | 635 |
| Refractivity/Abbe's Number |  |
| Name of Glass |  |
| FCD1 | 1.494122/81.6 |
| BACD5 | 1.587007/61.3 |
| CG | 1.533 |
| F (Focal Distance of Overall System) | 1.724 |
| $F_1$ (Focal Distance of Lens adjacent to Object) | 3.7674 |

Fifth Embodiment

An objective lens according to this embodiment has a structure in which the lenses 3 and 4 are manufactured by optical glass (694.532) having an Abbe's number vd of 53.2 on the d-line.

Figure 56:
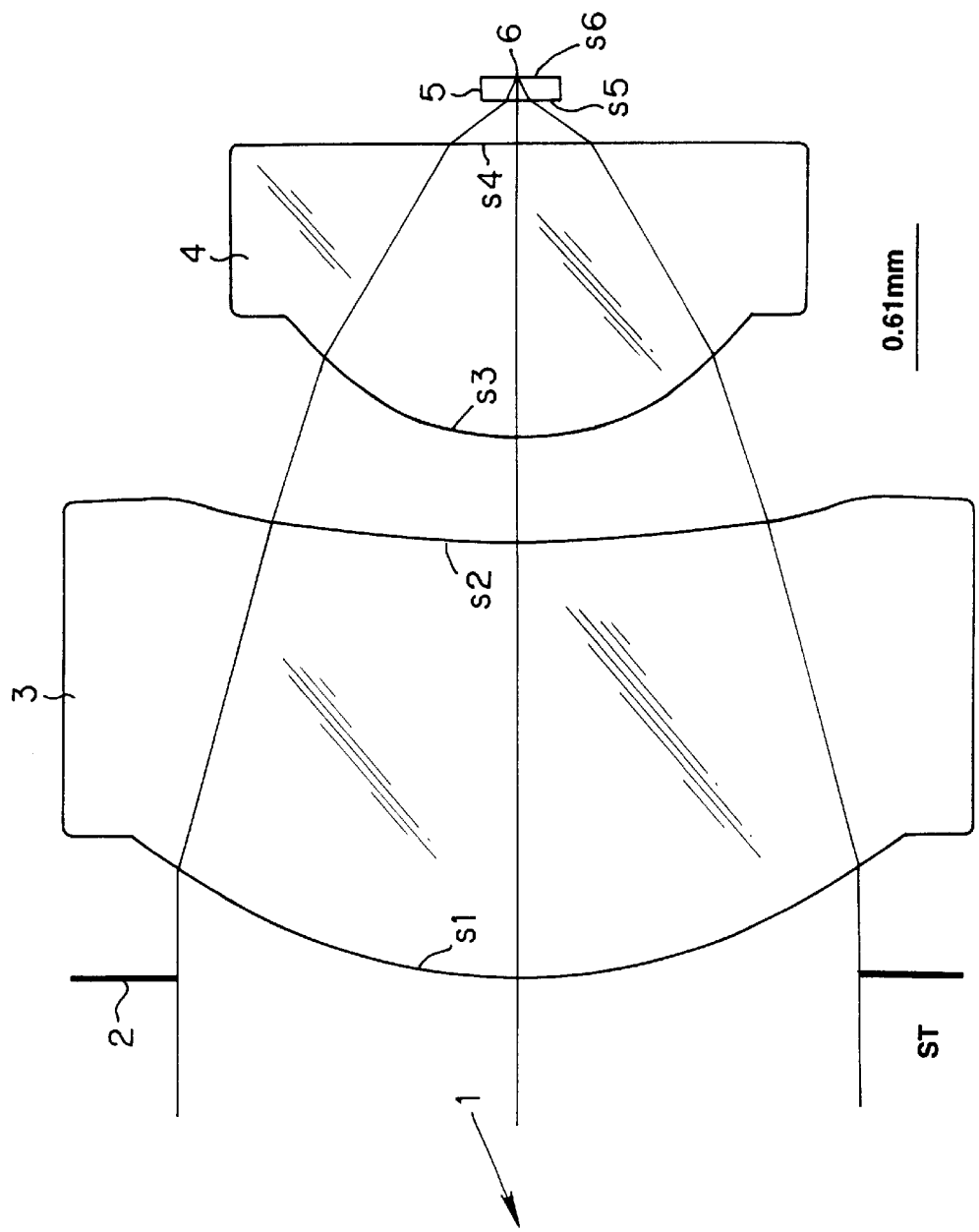
FIG. 56 is a vertical cross sectional view showing the structure of a fifth embodiment of the objective lens according to the present invention.
Figure 60:
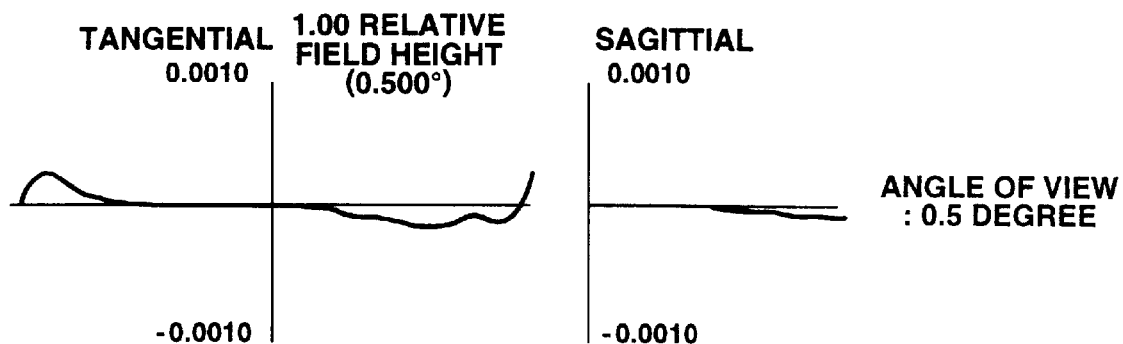
FIG. 60 is a graph showing lateral aberration (angle of view: 0.5 degree) of the objective lens shown in FIG. 56.
Figure 61:
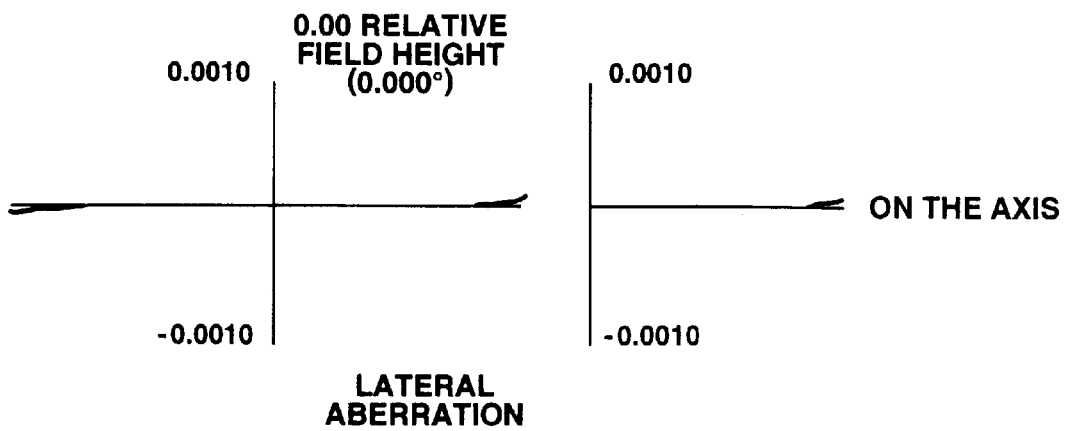
FIG. 61 is a graph showing the lateral aberration (on the axis) of the objective lens shown in FIG. 56.

An optical path is shown in FIG. 56. A graph showing distortion of the foregoing objective lens is shown in FIG. 57, astigmatism of the same is shown in FIG. 58 and spherical aberration of the same is shown in FIG. 59. A graph showing the lateral aberration (angle of view: 0.5 degree) is shown in FIG. 60 and a graph showing the lateral aberration (on the axis) is shown in FIG. 61. The conditions of the design are as shown in Table 8.

TABLE 8

| Surface | RDY (Curvature Radius) | THI (Thickness) | GLA (Name of Glass) |
|---|---|---|---|
| OBJ | Infinity | Infinity |  |
| STO | Infinity | 0.0 |  |
| s1 | 2.41517 | 1.922989 | 694.532 |
|  | K: −0.110174 |  |  |
|  | A: −.378893E − 02 | B: −.541195E − 03 | C: −.960116E − 04 |
|  | D: −.386475E − 04 | E: 0.280669E − 04 | F: −.434129E − 05 |
| s2 | 7.15010 | 0.437551 |  |
|  | K: −4.435096 |  |  |
|  | A: 0.333331E − 02 | B: −.512249E − 03 | C: −.206223E − 03 |
|  | D: −.496133E − 03 | E: 0.663443E − 03 | F: 0.211130E − 03 |
| s3 | 1.14341 | 1.283909 | 694.532 |
|  | K: −0.094861 |  |  |
|  | A: 0.872481E − 02 | B: −.149417E − 02 | C: 0.500504E − 03 |
|  | D: −.141032E − 01 | E: −.117889E − 01 | F: −.682353E − 02 |

TABLE 8-continued

| s4 | 4.20130 | 0.2 | |
| | K: −85.005628 | | |
| | A: −.161969E + 00 | B: −.702663E + 00 | C: −.814707E + 01 |
| | D: 0.549823E + 02 | E: 0.3186&8E − 16 | F: −.315831E − 17 |
| s5 | Infinity | 0.1 | CG |
| s6 | Infinity | 0.0 | |
| IMG | Infinity | 0.0 | |

Equation of Aspheric Surface $$X = \frac{Y^2/R}{1 + \{1 - (1+K)(Y/R)^2\}^{1/2}} + AY^4 + BY^6 + CY^8 + DY^{10} + EY^{12} + FY^{14}$$

X: depth from vertex of surface
Y: height from optical axis
R: paraxis R
K: cone constant
A: aspheric coefficient of term $Y_4$
B: aspheric coefficient of term $Y_6$
C: aspheric coefficient of term $Y_8$
D: aspheric coefficient of term $Y_{10}$
E: aspheric coefficient of term $Y_{12}$
F: aspheric coefficient of term $Y_{14}$

| | |
|---|---|
| EPD | 2.928 |
| (Diameter of Entrance Pupil (mm)) | |
| WL (Wavelength (nm)) | 635 |
| Refractivity/Abbe's Number | |
| Name of Glass | |
| 694.532 | 1.691156/53.2 |
| CG | 1.533 |
| F | 1.83 |
| (Focal Distance of Overall System) | |
| $F_1$ | 4.5256 |
| (Focal Distance of Lens adjacent to Object) | |

Sixth Embodiment

An objective lens according to this embodiment has a structure in which the lenses 3 and 4 are manufactured by optical glass (FCD1) having an Abbe's number vd of 81.6 on the d-line.

Figure 62:
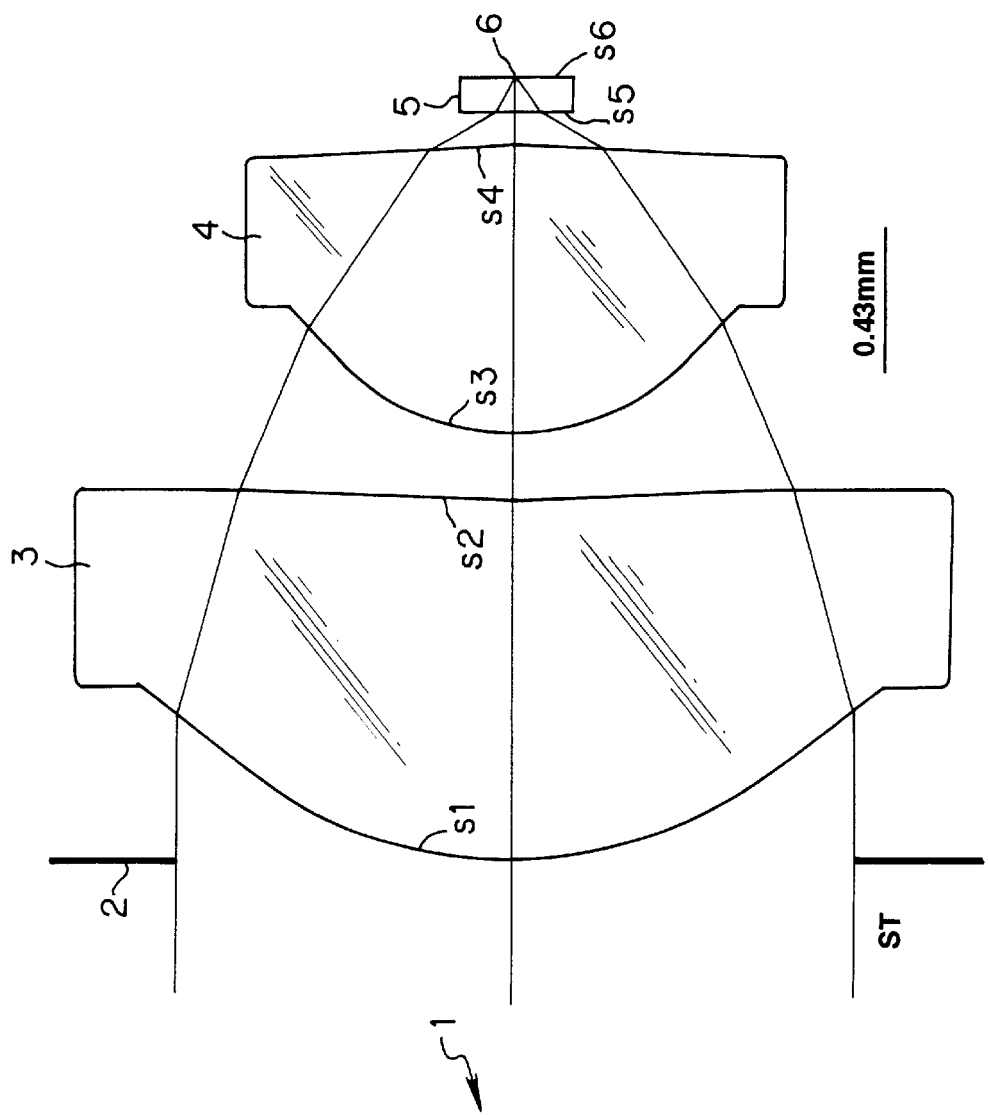
FIG. 62 is a vertical cross sectional view showing the structure of a sixth embodiment of the objective lens according to the present invention.
Figure 66:
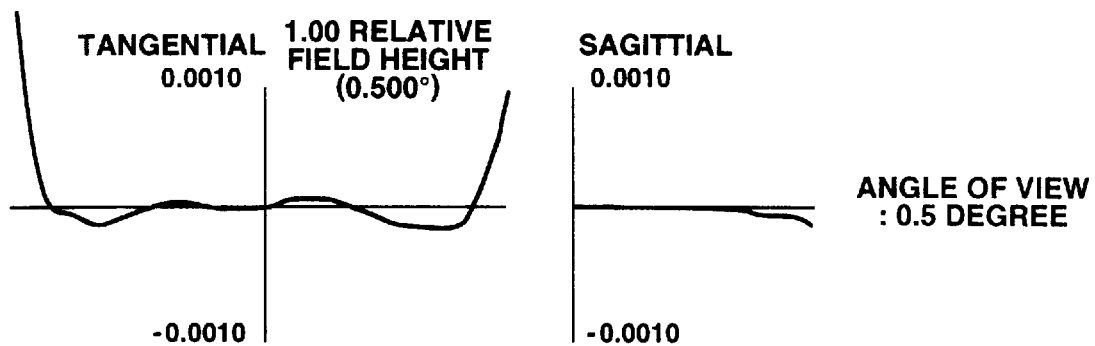
FIG. 66 is a graph showing lateral aberration (angle of view: 0.5 degree) of the objective lens shown in FIG. 62.
Figure 67:
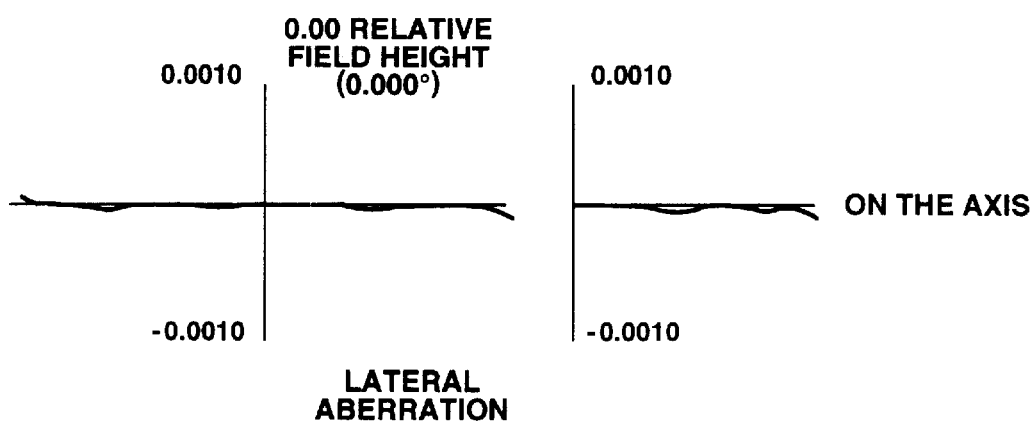
FIG. 67 is a graph showing the lateral aberration (on the axis) of the objective lens shown in FIG. 62.

An optical path is shown in FIG. 62. A graph showing distortion of the foregoing objective lens is shown in FIG. 63, astigmatism of the same is shown in FIG. 64 and spherical aberration of the same is shown in FIG. 65. A graph showing the lateral aberration (angle of view: 0.5 degree) is shown in FIG. 66 and a graph showing the lateral aberration (on the axis) is shown in FIG. 67. The conditions of the design are as shown in Table 9.

TABLE 9

| Surface | RDY (Curvature Radius) | THI (Thickness) | GLA (Name of Glass) |
|---|---|---|---|
| OBJ | Infinity | Infinity | |
| STO | Infinity | 0.0 | |
| s1 | 1.20427 | 1.079421 | FCD1 |
| | K: −0.151750 | | |
| | A: −.351418E − 01 | B: −.170891E − 01 | C: −.360726E − 02 |
| | D: 0.744766E − 03 | E: −.170337E − 02 | F: −.108452E − 01 |
| s2 | 16.78714 | 0.196694 | |
| | K: 49.948 | | |
| | A: 0.930169E − 02 | B: −.352835E − 02 | C: 0.169634E − 01 |
| | D: −.293743E − 01 | E: −.210303E − 01 | F: 0.282409E − 01 |
| s3 | 0.71596 | 0.877974 | FCD1 |
| | K: −0.158917 | | |
| | A: 0.127791E + 00 | B: −.293900E − 01 | C: 0.152007E + 00 |
| | D: −.713059E − 01 | E: −.407821E + 01 | F: −.421999E − 06 |
| s4 | −1.50236 | 0.1 | |
| | K: −653.584610 | | |
| | A: −.871780E + 00 | B: −.139204E + 01 | C: 0.142400E + 03 |
| | D: −.886033E + 03 | E: 0.139585E − 12 | F: 0.139480E − 13 |
| s5 | Infinity | 0.1 | CG |
| s6 | Infinity | 0.0 | |
| IMG | Infinity | 0.0 | |

Equation of Aspheric Surface

TABLE 9-continued $$X = \frac{Y^2/R}{1 + \{1 - (1 + K)(Y/R)^2\}^{1/2}} + AY^4 + BY^6 + CY^8 + DY^{10} + EY^{12} + FY^{14}$$

X: depth from vertex of surface
Y: height from optical axis
R: paraxis R
K: cone constant
A: aspheric coefficient of term $Y_4$
B: aspheric coefficient of term $Y_6$
C: aspheric coefficient of term $Y_8$
D: aspheric coefficient of term $Y_{10}$
E: aspheric coefficient of term $Y_{12}$
F: aspheric coefficient of term $Y_{14}$

| | |
|---|---|
| EPD (Diameter of Entrance Pupil (mm)) | 2.000 |
| WL (Wavelength (nm)) | 635 |
| Refractivity/Abbe's Number | |
| Name of Glass | |
| FCD1 | 1.494122/81.6 |
| CG | 1.533 |
| F (Focal Distance of Overall System) | 1.15 |
| $F_1$ (Focal Distance of Lens adjacent to Object) | 2.5667 |

Seventh Embodiment

An objective lens according to this embodiment has a structure in which the lenses 3 and 4 are manufactured by optical glass (FCD1) having an Abbe's number vd of 81.6 on the d-line.

Figure 68:
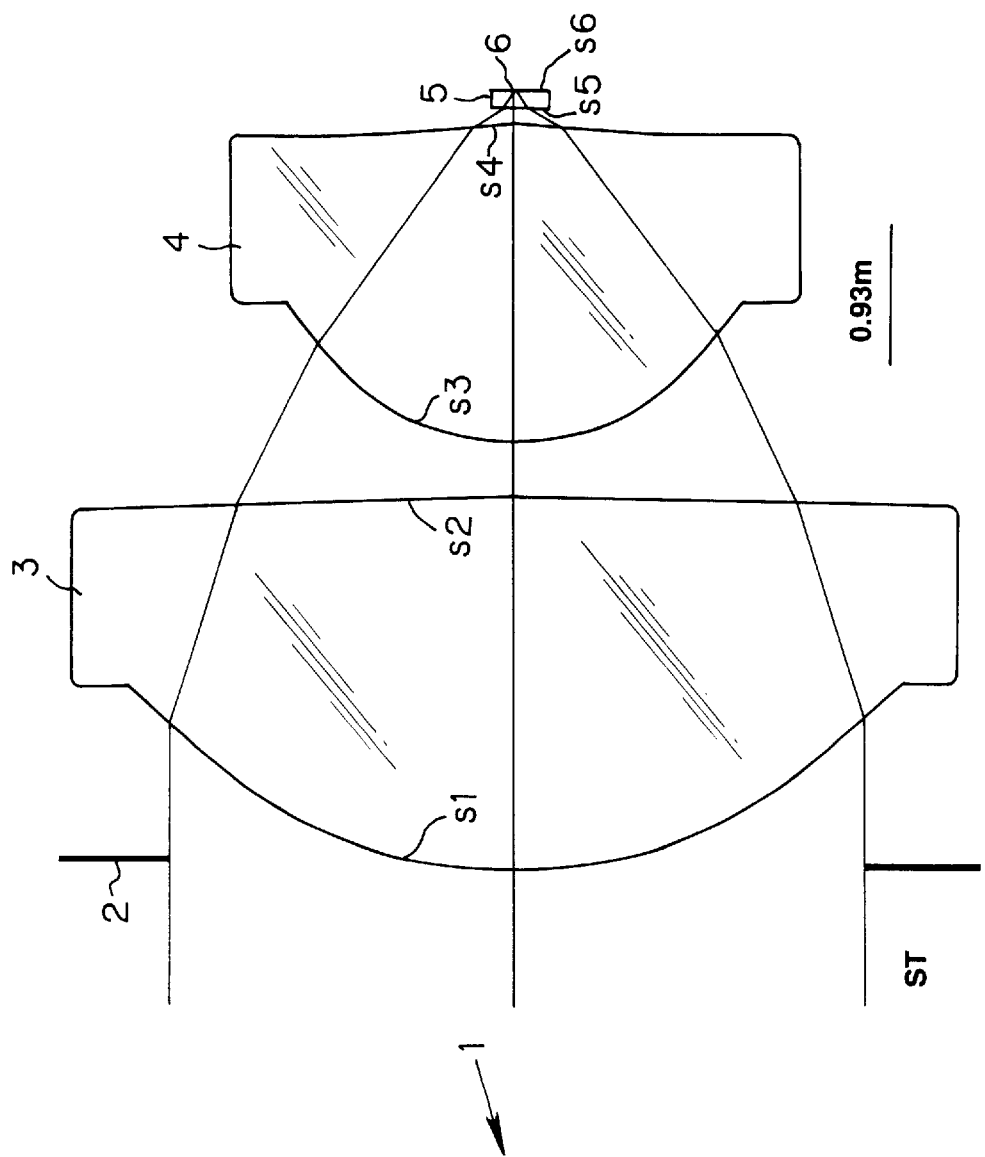
FIG. 68 is a vertical cross sectional view showing the structure of a seventh embodiment of the objective lens according to the present invention.
Figure 72:
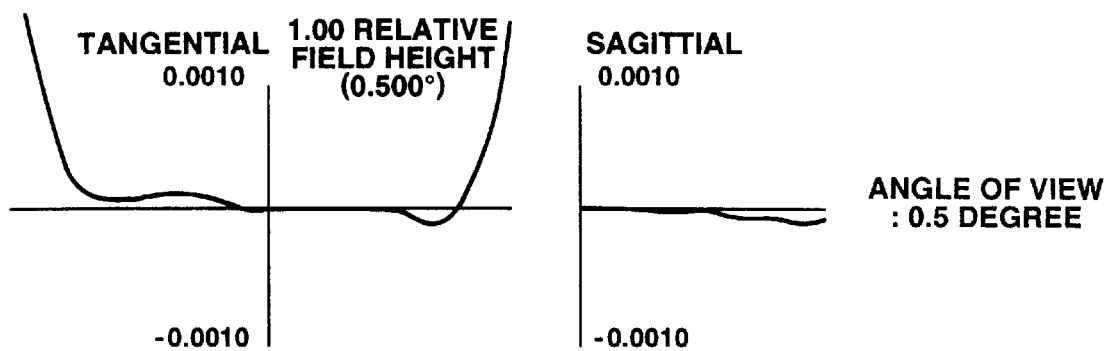
FIG. 72 is a graph showing lateral aberration (angle of view: 0.5 degree) of the objective lens shown in FIG. 68.
Figure 73:
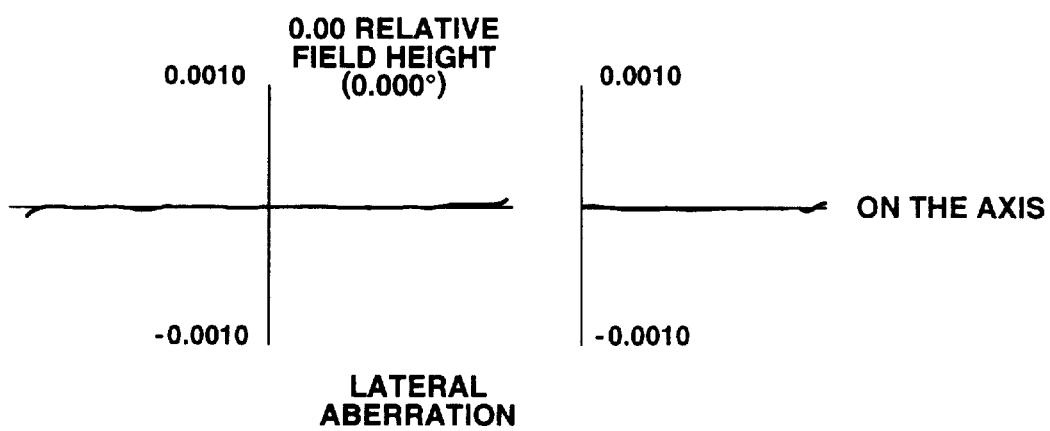
FIG. 73 is a graph showing the lateral aberration (on the axis) of the objective lens shown in FIG. 68.

An optical path is shown in FIG. 68. A graph showing distortion of the foregoing objective lens is shown in FIG. 69, astigmatism of the same is shown in FIG. 70 and spherical aberration of the same is shown in FIG. 71. A graph showing the lateral aberration (angle of view: 0.5 degree) is shown in FIG. 72 and a graph showing the lateral aberration (on the axis) is shown in FIG. 73. The conditions of the design are as shown in Table 10.

TABLE 10

| Surface | RDY (Curvature Radius) | THI (Thickness) | GLA (Name of Glass) |
|---|---|---|---|
| OBJ | Infinity | Infinity | |
| STO | Infinity | 0.0 | |
| s1 | 2.78048 | 2.499596 | FCD1 |
| | K: −0.217514 | | |
| | A: −.931418E − 03 | B: −.254650E − 03 | C: 0.674176E − 05 |
| | D: −.426555E − 05 | E: 0.0 | F: 0.0 |
| s2 | −26.70920 | 0.368815 | |
| | K: −268.285588 | | |
| | A: 0.370816E − 02 | B: −.238371E − 03 | C: −.249985E − 03 |
| | D: 0.517264E − 04 | E: 0.0 | F: 0.0 |
| s3 | 1.51391 | 2.137504 | FCD1 |
| | K: −0.424397 | | |
| | A: 0.141105E − 01 | B: 0.538826E − 02 | C: 0,239631E − 02 |
| | D: −.448922E − 03 | E: 0.0 | F: 0.0 |
| s4 | −9.00 | 0.1 | |
| | K: 0.0 | | |
| | A: 0.0 | B: 0.0 | C: 0.0 |
| | D: 0.0 | E: 0.0 | F: 0.0 |
| s5 | Infinity | 0.1 | CG |
| s6 | Infinity | 0.0 | |
| IMG | Infinity | 0.0 | |

Equation of Aspheric Surface $$X = \frac{Y^2/R}{1 + \{1 - (1 + K)(Y/R)^2\}^{1/2}} + AY^4 + BY^6 + CY^8 + DY^{10} + EY^{12} + FY^{14}$$

X: depth from vertex of surface
Y: height from optical axis
R: paraxis R
K: cone constant
A: aspheric coefficient of term $Y_4$
B: aspheric coefficient of term $Y_6$
C: aspheric coefficient of term $Y_8$

TABLE 10-continued

| | |
|---|---|
| D: aspheric coefficient of term $Y_{10}$ | |
| E: aspheric coefficient of term $Y_{12}$ | |
| F: aspheric coefficient of term $Y_{14}$ | |
| EPD | 4.45 |
| (Diameter of Entrance Pupil (mm)) | |
| WL (Wavelength (nm)) | 680 |
| Refractivity/Abbe's Number | |
| Name of Glass | |
| FCD1 | 1.494122/81.6 |
| CG | 1.5769 |
| F | 2.5 |
| (Focal Distance of Overall System) | |
| $F_1$ | 5.2551 |
| (Focal Distance of Lens adjacent to Object) | |

Eighth Embodiment

An objective lens according to this embodiment has a structure in which the lenses 3 and 4 are manufactured by optical glass (FCD1) having an Abbe's number vd of 81.6 on the d-line and optical glass (BACD5) having an Abbe's number vd of 61.3.

Figure 74:
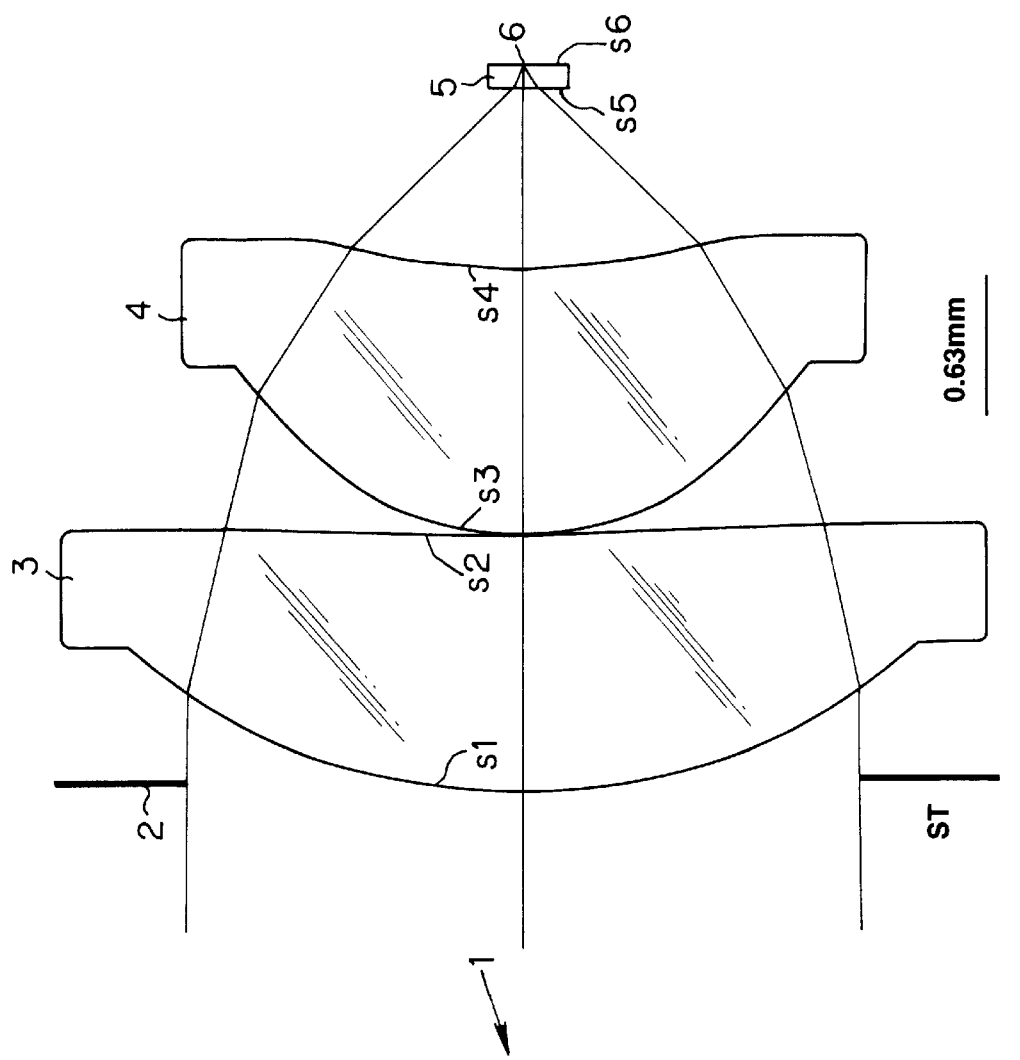
FIG. 74 is a vertical cross sectional view showing the structure of an eighth embodiment of the objective lens according to the present invention.
Figure 78:
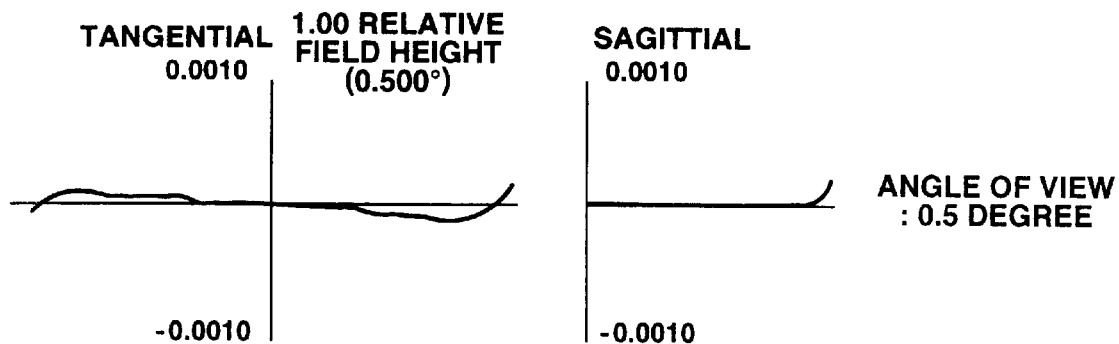
FIG. 78 is a graph showing lateral aberration (angle of view: 0.5 degree) of the objective lens shown in FIG. 74.
Figure 79:
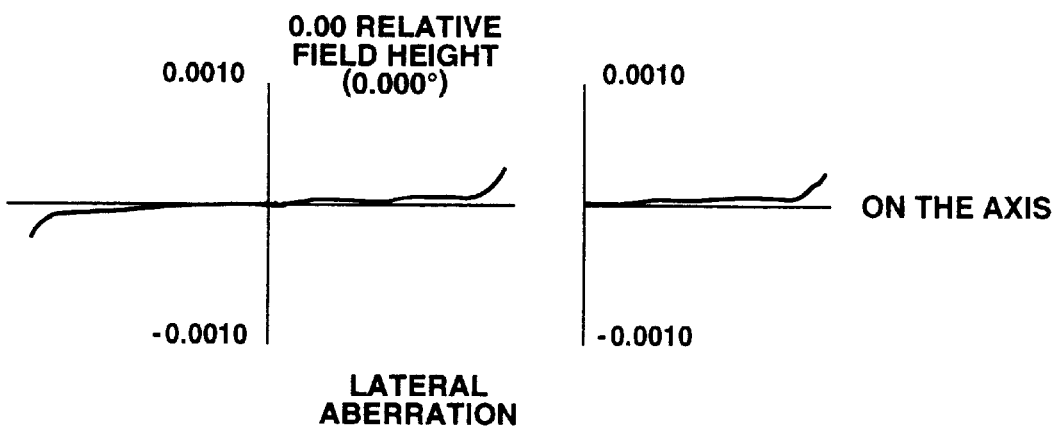
FIG. 79 is a graph showing the lateral aberration (on the axis) of the objective lens shown in FIG. 74.

An optical path is shown in FIG. 74. A graph showing distortion of the foregoing objective lens is shown in FIG. 75, astigmatism of the same is shown in FIG. 76 and spherical aberration of the same is shown in FIG. 77. A graph showing the lateral aberration (angle of view: 0.5 degree) is shown in FIG. 78 and a graph showing the lateral aberration (on the axis) is shown in FIG. 79. The conditions of the design are as shown in Table 11. The objective lens according to this embodiment is an objective lens satisfying the ranges of the diameter of the beam, the working distance (WD) and the NA shown in FIGS. 22 and 24, the objective lens according to this embodiment corresponding to point 2 shown in FIG. 22.

TABLE 11

| Surface | RDY (Curvature Radius) | THI (Thickness) | GLA (Name of Glass) |
|---|---|---|---|
| OBJ | Infinity | Infinity | |
| STO | Infinity | 0.0 | |
| s1 | 2.46928 | 1.176806 | FCD1 |
| | K: −0.093789 | | |
| | A: −.335472E − 02 | B: 0.152884E − 03 | C: 0.707504E − 04 |
| | D: 0.148633E − 04 | E: 0.553064E − 05 | F: −.174217E − 05 |
| s2 | 316.20027 | 0.020092 | |
| | K: 51211.981179 | | |
| | A: 0.773695E − 02 | B: 0.147280E − 02 | C: 0.290309E − 03 |
| | D: −.124348E − 04 | E: −.831848E − 04 | F: 0.271640E − 04 |
| s3 | 1.33699 | 1.198996 | BACD5 |
| | K: −0.092429 | | |
| | A: −.706457E − 03 | B: 0.219957E − 03 | C: −.209120E − 02 |
| | D: −.411553E − 03 | E: 0.133140E − 02 | F: −.164287E − 02 |
| s4 | 2.58980 | 0.8 | |
| | K: −8.513851 | | |
| | A: −.196541E − 01 | B: −.252808E − 01 | C: 0.649868E − 02 |
| | D: 0.166035E − 01 | E: −.920880E − 02 | F: 0.328621E − 10 |
| s5 | Infinity | 0.1 | CG |
| s6 | Infinity | 0.0 | |
| IMG | Infinity | 0.0 | |

Equation of Aspheric Surface $$X = \frac{Y^2/R}{1 + \{1 - (1 + K)(Y/R)^2\}^{1/2}} + AY^4 + BY^6 + CY^8 + DY^{10} + EY^{12} + FY^{14}$$

X: depth from vertex of surface
Y: height from optical axis
R: paraxis R
K: cone constant
A: aspheric coefficient of term $Y_4$
B: aspheric coefficient of term $Y_6$
C: aspheric coefficient of term $Y_8$
D: aspheric coefficient of term $Y_{10}$
E: aspheric coefficient of term $Y_{12}$
F: aspheric coefficient of term $Y_{14}$

| | |
|---|---|
| EPD | 3.000 |
| (Diameter of Entrance Pupil (mm)) | |
| WL (Wavelength (nm)) | 635 |
| Refractivity/Abbe's Number | |

TABLE 11-continued

| Name of Glass | |
|---|---|
| FCD1 | 1.494122/81.6 |
| BACD5 | 1.587007/61.3 |
| CG | 1.533 |
| F (Focal Distance of Overall System) | 2.1100 |
| $F_1$ (Focal Distance of Lens adjacent to Object) | 5.0304 |

Ninth Embodiment

An objective lens according to this embodiment has a structure in which the lenses 3 and 4 are manufactured by optical glass (FCD1) having an Abbe's number vd of 81.6 on the d-line and optical glass (BACD5) having an Abbe's number vd of 61.3.

Figure 80:
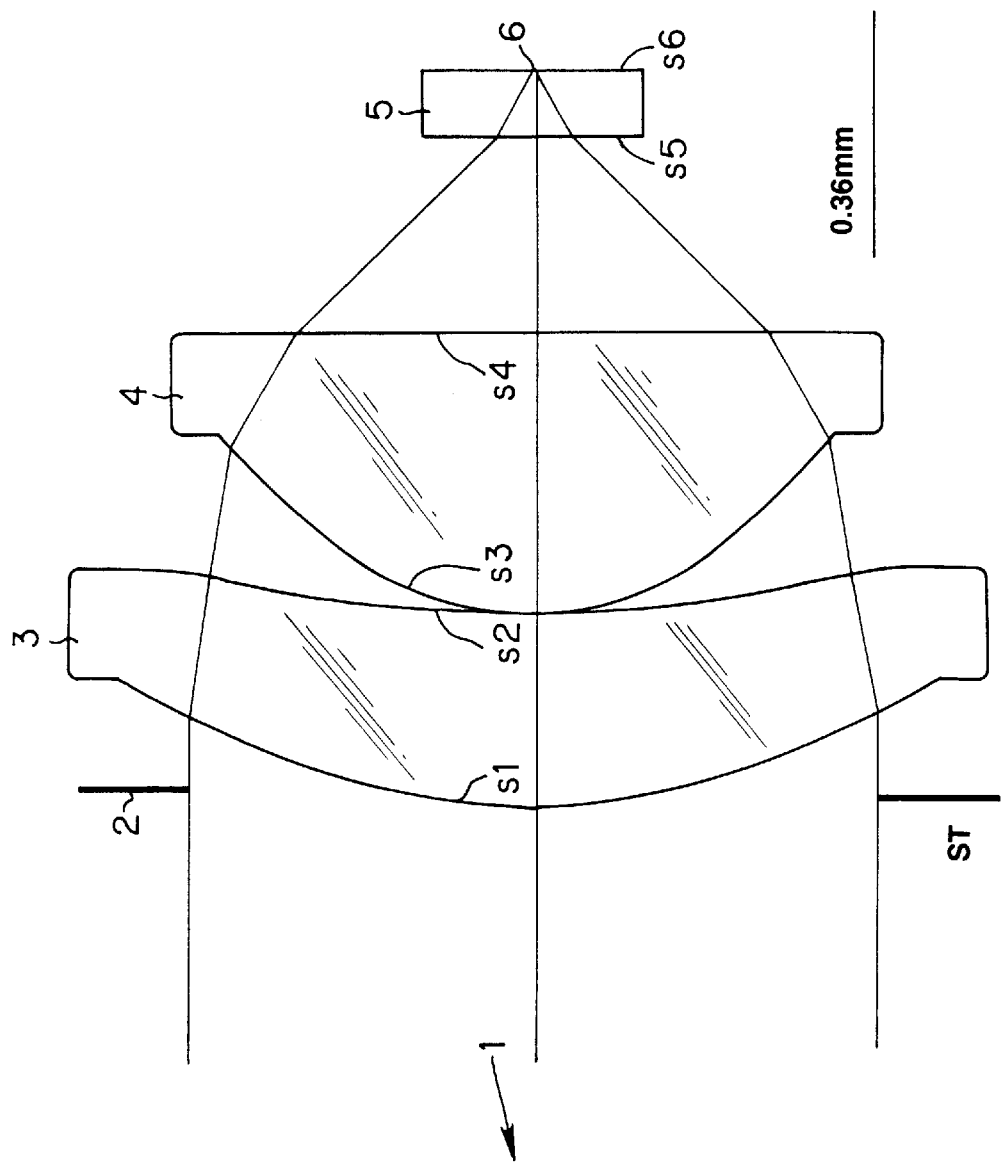
FIG. 80 is a vertical cross sectional view showing the structure of a ninth embodiment of the objective lens according to the present invention.
Figure 84:
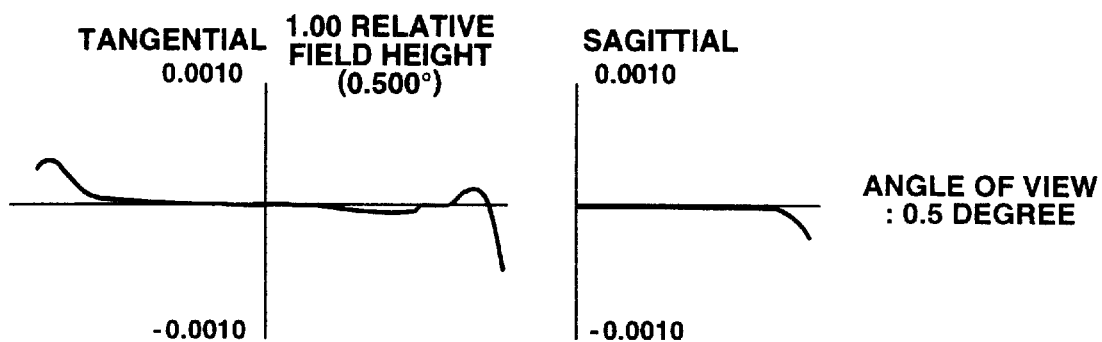
FIG. 84 is a graph showing lateral aberration (angle of view: 0.5 degree) of the objective lens shown in FIG. 80.
Figure 85:
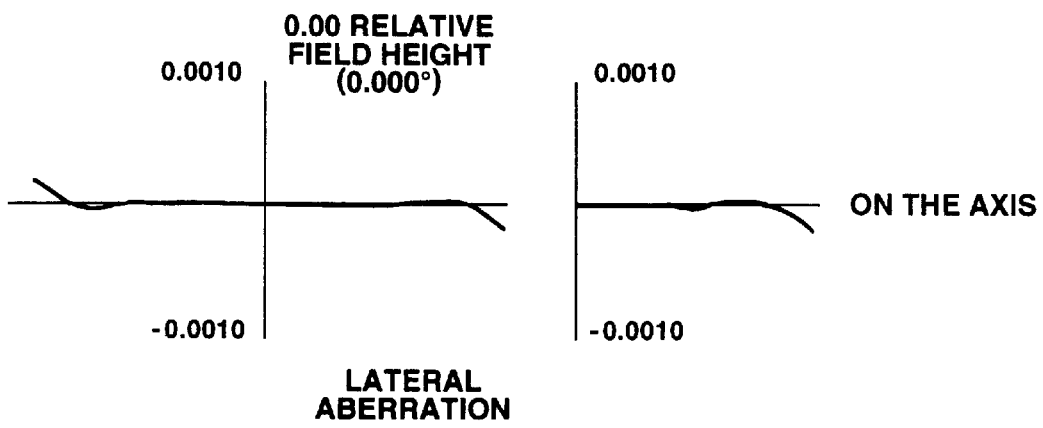
FIG. 85 is a graph showing the lateral aberration (on the axis) of the objective lens shown in FIG. 80.

An optical path is shown in FIG. 80. A graph showing distortion of the foregoing objective lens is shown in FIG. 81, astigmatism of the same is shown in FIG. 82 and spherical aberration of the same is shown in FIG. 83. A graph showing the lateral aberration (angle of view: 0.5 degree) is shown in FIG. 84 and a graph showing the lateral aberration (on the axis) is shown in FIG. 85. The conditions of the design are as shown in Table 12. The objective lens according to this embodiment is an objective lens satisfying the ranges of the diameter of the beam, the working distance (WD) and the NA shown in FIGS. 22 and 24, the objective lens according to this embodiment corresponding to point 3 shown in FIG. 22.

TABLE 12

| Surface | RDY (Curvature Radius) | THI (Thickness) | GLA (Name of Glass) |
|---|---|---|---|
| OBJ | Infinity | Infinity | |
| STO | Infinity | 0.0 | |
| s1 | 0.95940 | 0.292788 | FCD1 |
| | K: −0.230993 | | |
| | A: −.67862E − 01 | B: 0.140833E + 00 | C: 0.348581E − 01 |
| | D: −.149134E + 01 | E: −.327087E + 01 | F: 0.954103E − 01 |
| s2 | 2.80442 | 0.0 | |
| | K: −7.470389 | | |
| | A: 0.164931E + 00 | B: 0.166114E + 00 | C: 0.579542E + 00 |
| | D: −.747670E + 01 | E: −.417068E + 02 | F: 0.170241E + 03 |
| s3 | 0.46942 | 0.407387 | BACD5 |
| | K: −0.133476 | | |
| | A: −.122398E + 00 | B: −.254028E + 00 | C: −.363976E + 01 |
| | D: −.253712E + 02 | E: 0.828936E + 01 | F: −.515431E + 03 |
| s4 | 5.03874 | 0.30 | |
| | K: −1188.332634 | | |
| | A: 0.454966E + 00 | B: 0.304699E + 00 | C: −.632742E + 02 |
| | D: 0.477110E + 03 | E: −.584725E + 03 | F: −.295638E + 04 |
| s5 | Infinity | 0.1 | CG |
| s6 | Infinity | 0.0 | |
| IMG | Infinity | 0.0 | |

Equation of Aspheric Surface $$X = \frac{Y^2/R}{1 + \{1 - (1 + K)(Y/R)^2\}^{1/2}} + AY^4 + BY^6 + CY^8 + DY^{10} + EY^{12} + FY^{14}$$

X: depth from vertex of surface
Y: height from optical axis
R: paraxis R
K: cone constant
A: aspheric coefficient of term $Y_4$
B: aspheric coefficient of term $Y_6$
C: aspheric coefficient of term $Y_8$
D: aspheric coefficient of term $Y_{10}$
E: aspheric coefficient of term $Y_{12}$
F: aspheric coefficient of term $Y_{14}$

| | |
|---|---|
| EPD (Diameter of Entrance Pupil (mm)) | 1.000 |
| WL (Wavelength (nm)) | 635 |
| Refractivity/Abbe's Number | |
| Name of Glass | |
| FCD1 | 1.494122/81.6 |
| BACD5 | 1.587007/61.3 |
| CG | 1.5769 |

TABLE 12-continued

| | |
|---|---|
| F | 0.704 |
| (Focal Distance of Overall System) | |
| $F_1$ | 2.8041 |
| (Focal Distance of Lens adjacent to Object) | |

Tenth Embodiment

An objective lens according to this embodiment has a structure in which the lenses 3 and 4 are manufactured by optical glass (FCD1) having an Abbe's number vd on the d-line of 81.3 and optical glass (BACD5) having an Abbe's number vd of 61.3.

Figure 86:
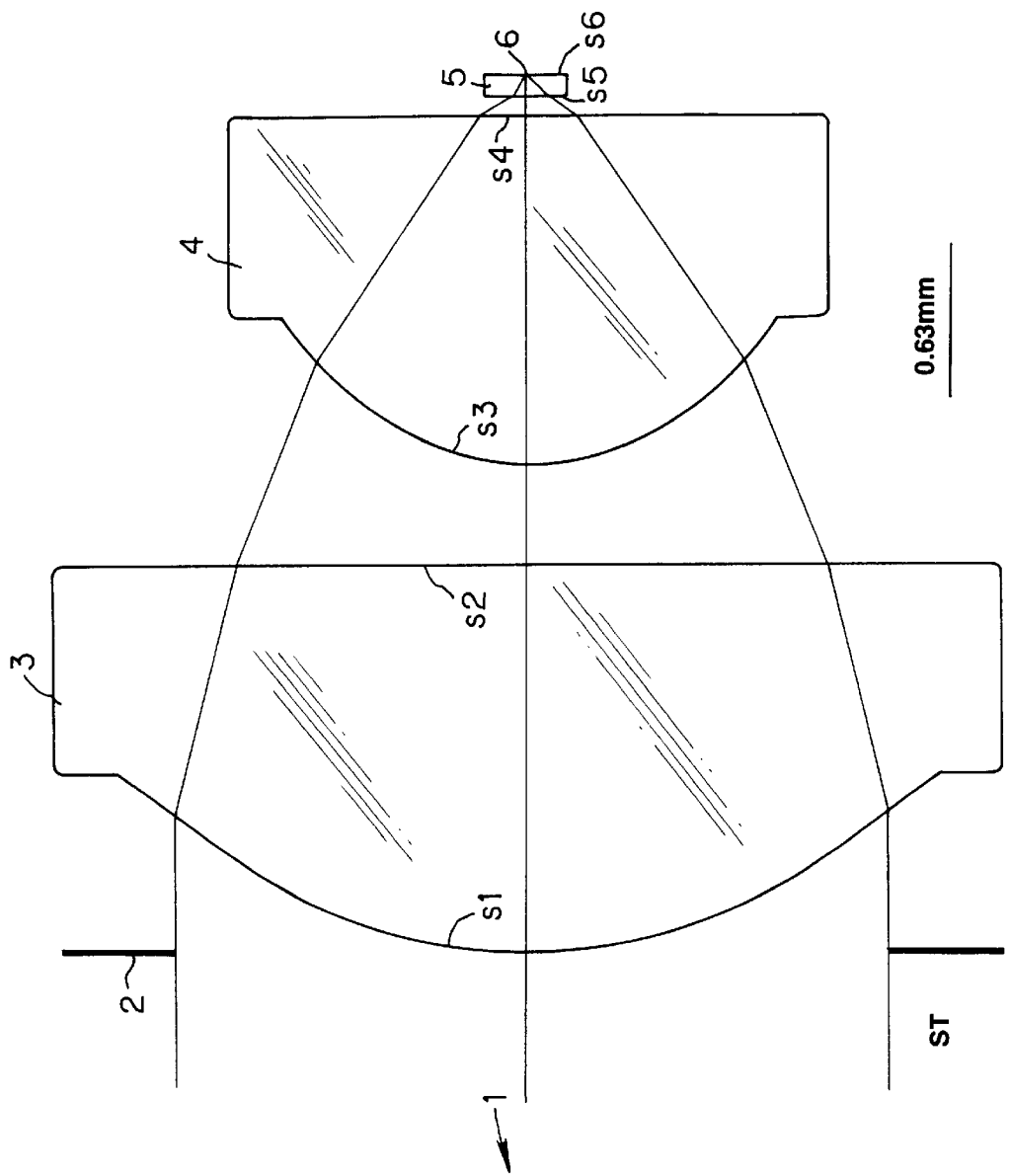
FIG. 86 is a vertical cross sectional view showing the structure of a tenth embodiment of the objective lens according to the present invention.
Figure 89:
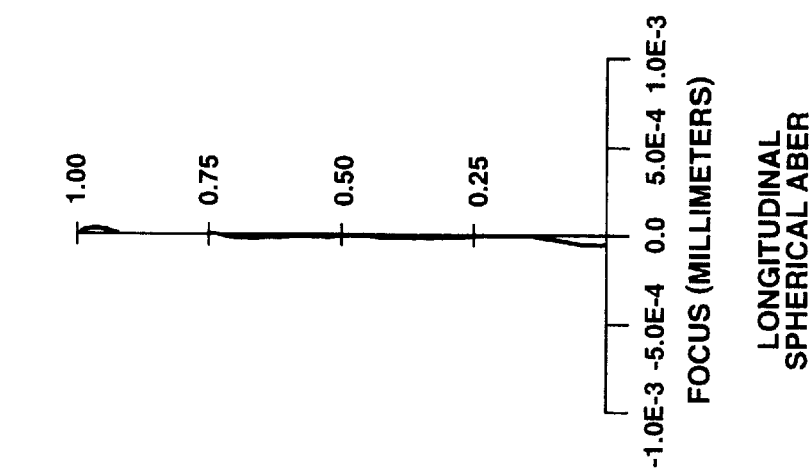
FIG. 89 is a graph showing spherical aberration of the objective lens shown in FIG. 86.
Figure 88:
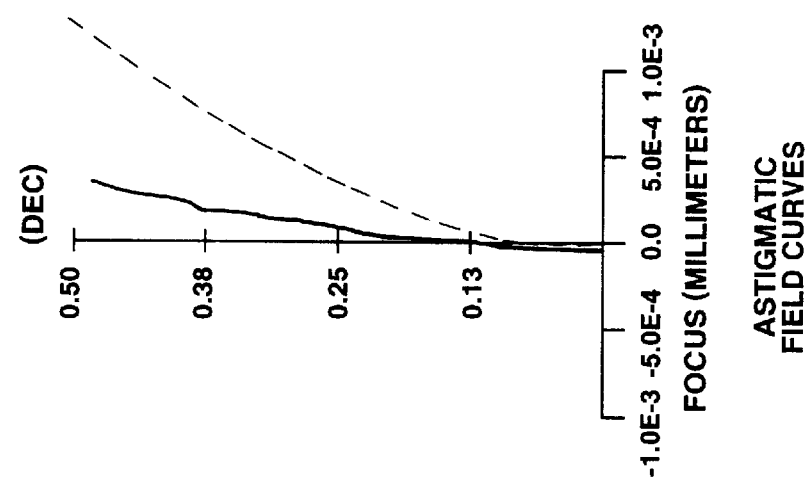
FIG. 88 is a graph showing astigmatism of the objective lens shown in FIG. 86.
Figure 87:
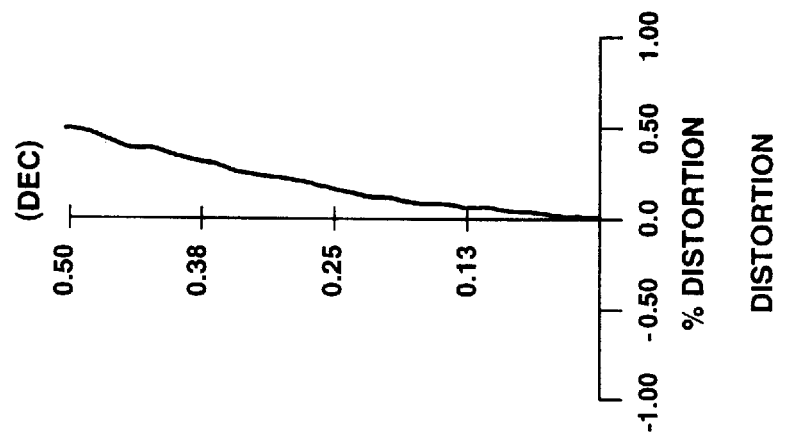
FIG. 87 is a graph showing distortion of the objective lens shown in FIG. 86.
Figure 90:
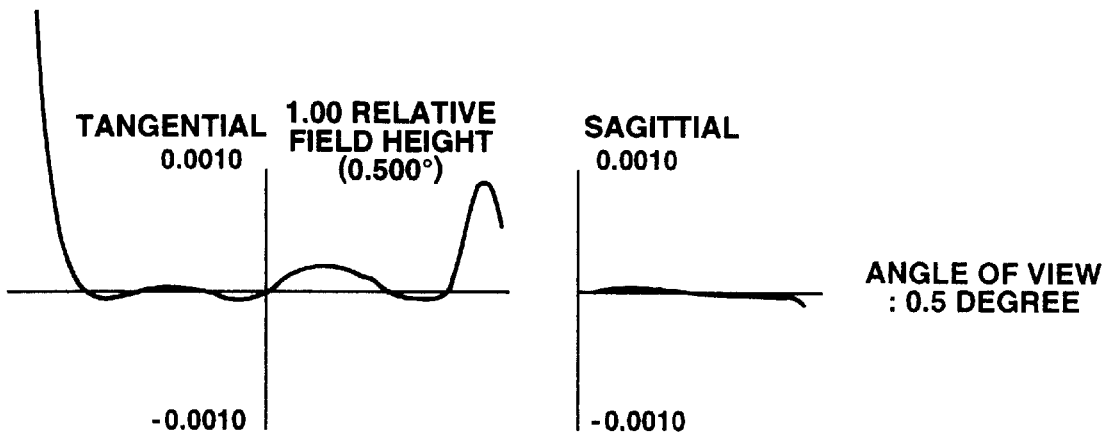
FIG. 90 is a graph showing lateral aberration (angle of view: 0.5 degree) of the objective lens shown in FIG. 86.
Figure 91:
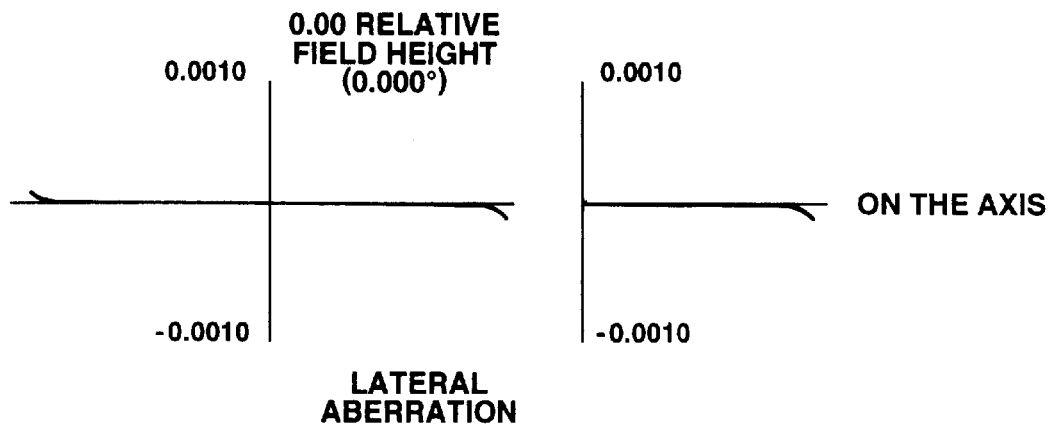
FIG. 91 is a graph showing the lateral aberration (on the axis) of the objective lens shown in FIG. 86.

An optical path is shown in FIG. 86. A graph showing distortion of the foregoing objective lens is shown in FIG. 87, astigmatism of the same is shown in FIG. 88 and spherical aberration of the same is shown in FIG. 89. A graph showing the lateral aberration (angle of view: 0.5 degree) is shown in FIG. 90 and a graph showing the lateral aberration (on the axis) is shown in FIG. 91. The conditions of the design are as shown in Table 13. The objective lens according to this embodiment is an objective lens satisfying the ranges of the diameter of the beam, the working distance (WD) and the NA shown in FIGS. 22 and 24, the objective lens according to this embodiment corresponding to point 9 shown in FIG. 24.

TABLE 13

| Surface | RDY (Curvature Radius) | THI (Thickness) | GLA (Name of Glass) |
|---|---|---|---|
| OBJ | Infinity | Infinity | |
| STO | Infinity | 0.0 | |
| s1 | 1.97265 | 1.666846 | FCD1 |
| | K: −0.136564 | | |
| | A: −.102065E − 01 | B: −.105703E − 02 | C: −.205627E − 03 |
| | D: −.102022E − 03 | E: −.167207E − 04 | F: −.847017E − 05 |
| s2 | 101.83827 | 0.438961 | |
| | K: 3327.215080 | | |
| | A: 0.237871E − 03 | B: −.106925E − 02 | C: −.509674E − 03 |
| | D: −.431489E − 03 | E: 0.166565E − 03 | F: 0.843038E − 05 |
| s3 | 1.11740 | 1.513776 | BACD5 |
| | K: −0.065262 | | |
| | A: 0.329554E − 01 | B: −.147812E − 01 | C: 0.299582E − 01 |
| | D: −.165416E − 01 | E: −.161770E − 01 | F: 0.177083E − 01 |
| s4 | −1.09291 | 0.05 | |
| | K: −860.033414 | | |
| | A: 0.540356E + 00 | B: 0.690883E + 01 | C: 0.445748E + 03 |
| | D: −.100405E + 05 | E: 0.842897E − 21 | F: −.149771E − 21 |
| s5 | Infinity | 0.1 | CG |
| s6 | Infinity | 0.0 | |
| IMG | Infinity | 0.0 | |

Equation of Aspheric Surface $$X = \frac{Y^2/R}{1 + \{1 - (1+K)(Y/R)^2\}^{1/2}} + AY^4 + BY^6 + CY^8 + DY^{10} + EY^{12} + FY^{14}$$

X: depth from vertex of surface
Y: height from optical axis
R: paraxis R
K: cone constant
A: aspheric coefficient of term $Y_4$
B: aspheric coefficient of term $Y_6$
C: aspheric coefficient of term $Y_8$
D: aspheric coefficient of term $Y_{10}$
E: aspheric coefficient of term $Y_{12}$
F: aspheric coefficient of term $Y_{14}$

| | |
|---|---|
| EPD | 3.000 |
| (Diameter of Entrance Pupil (mm)) | |
| WL (Wavelength (nm)) | 635 |
| Refractivity/Abbe's Number | |
| Name of Glass | |
| FCD1 | 1.494122/81.6 |
| BACD5 | 1.587007/61.3 |
| CG | 1.533 |
| F | 1.65 |
| (Focal Distance of Overall System) | |
| $F_1$ | 4.0487 |
| (Focal Distance of Lens adjacent to Object) | |

Eleventh Embodiment

An objective lens according to this embodiment has a structure in which the lenses 3 and 4 are manufactured by optical glass (FCD1) having an Abbe's number vd on the d-line of 81.6 and optical glass (BK7) having an Abbe's number vd of 64.1.

Figure 92:
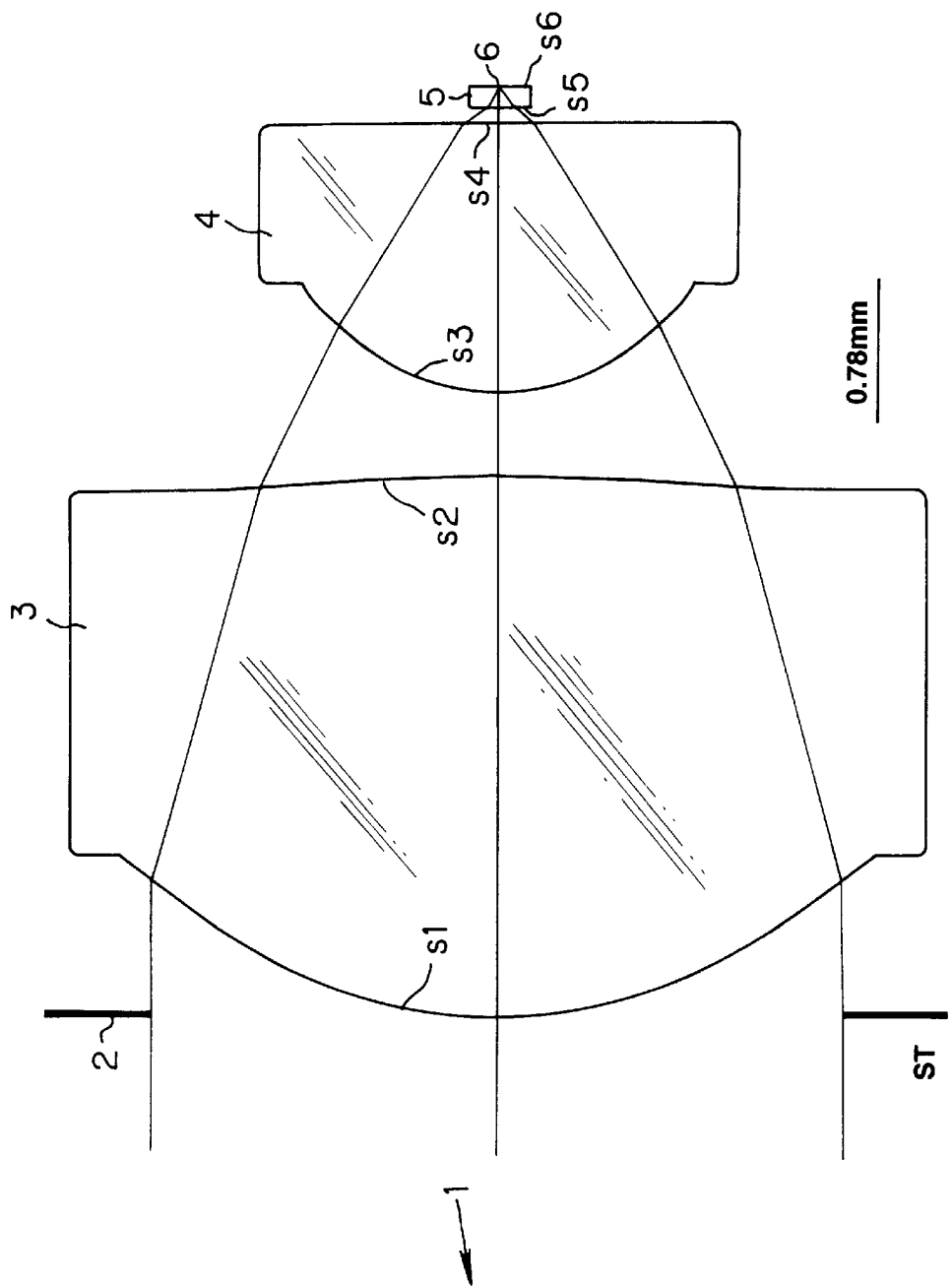
FIG. 92 is a vertical cross sectional view showing the structure of an eleventh embodiment of the objective lens according to the present invention.
Figure 96:
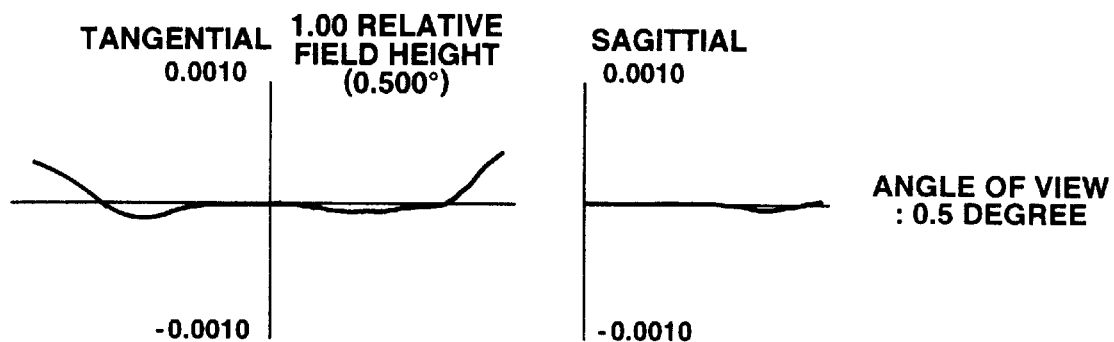
FIG. 96 is a graph showing lateral aberration (angle of view: 0.5 degree) of the objective lens shown in FIG. 92.
Figure 97:
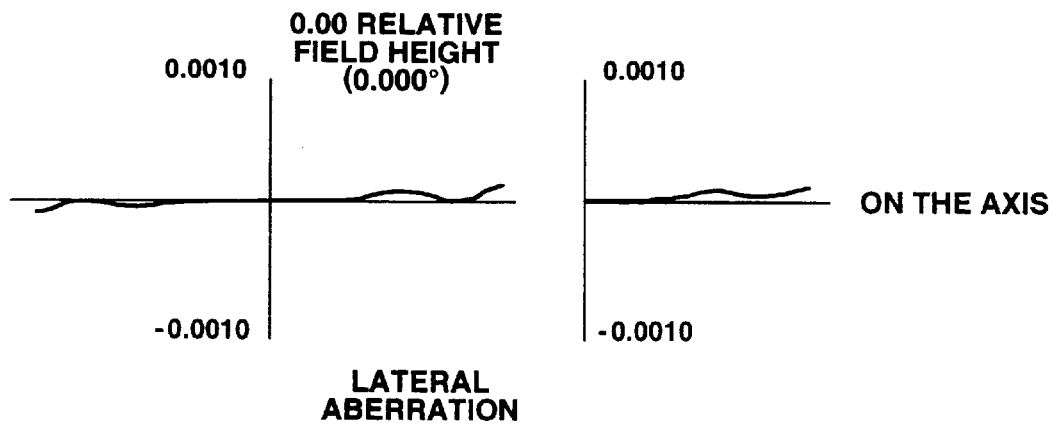
FIG. 97 is a graph showing the lateral aberration (on the axis) of the objective lens shown in FIG. 92.

An optical path is shown in FIG. 92. A graph showing distortion of the foregoing objective lens is shown in FIG. 93, astigmatism of the same is shown in FIG. 94 and spherical aberration of the same is shown in FIG. 95. A graph showing the lateral aberration (angle of view: 0.5 degree) is shown in FIG. 96 and a graph showing the lateral aberration (on the axis) is shown in FIG. 97. The conditions of the design are as shown in Table 14.

Twelfth Embodiment

An objective lens according to this embodiment has a structure in which the lenses 3 and 4 are manufactured by optical glass (FCD1) having an Abbe's number vd on the d-line of 81.6 and optical glass (BK7) having an Abbe's number vd of 64.1.

Figure 98:
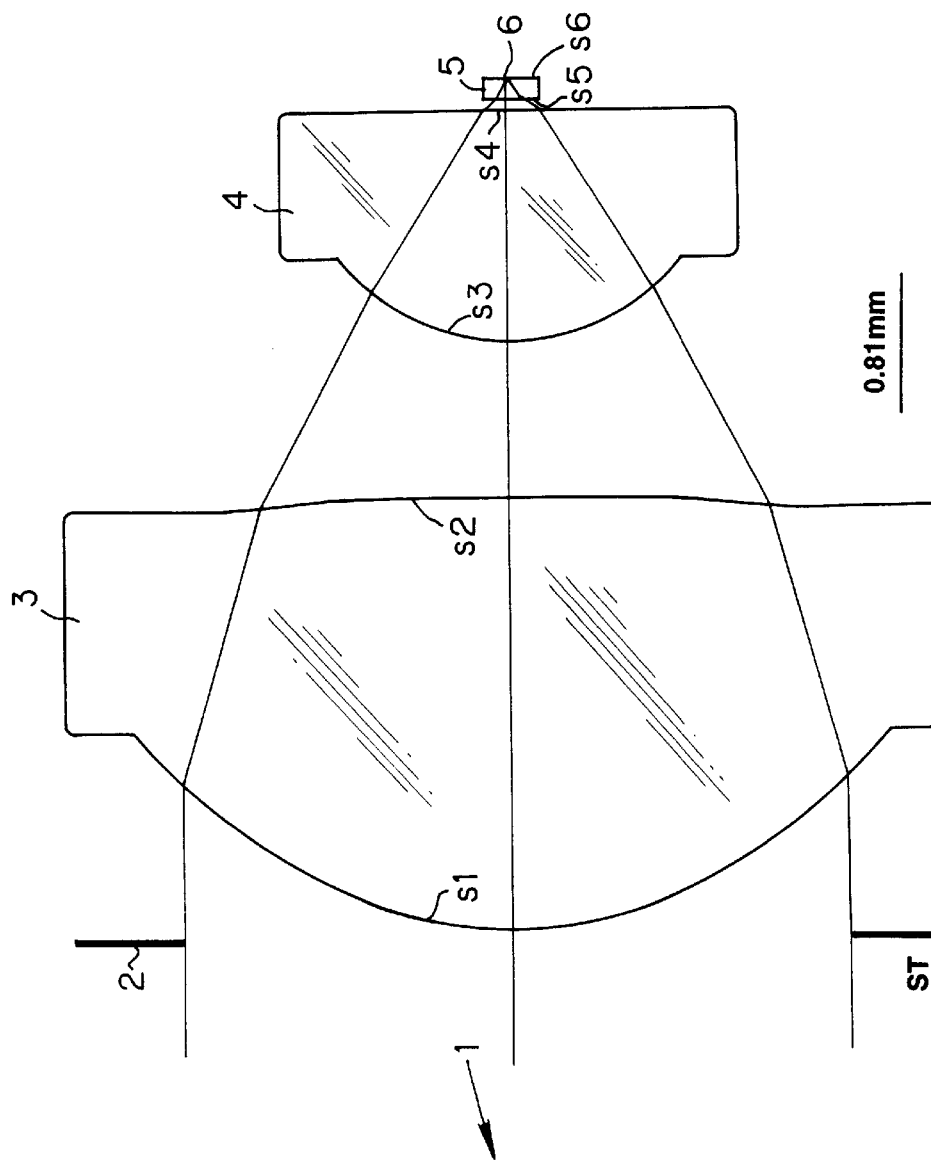
FIG. 98 is a vertical cross sectional view showing the structure of a twelfth embodiment of the objective lens according to the present invention.
Figure 102:
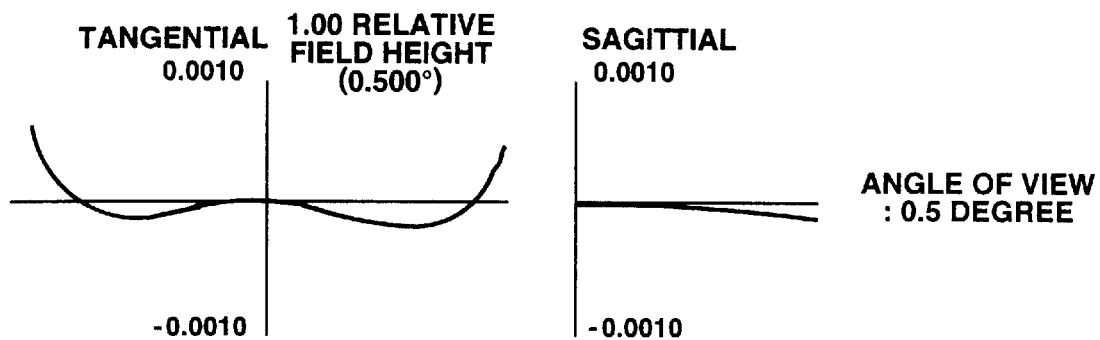
FIG. 102 is a graph showing lateral aberration (angle of view: 0.5 degree) of the objective lens shown in FIG. 98.
Figure 103:
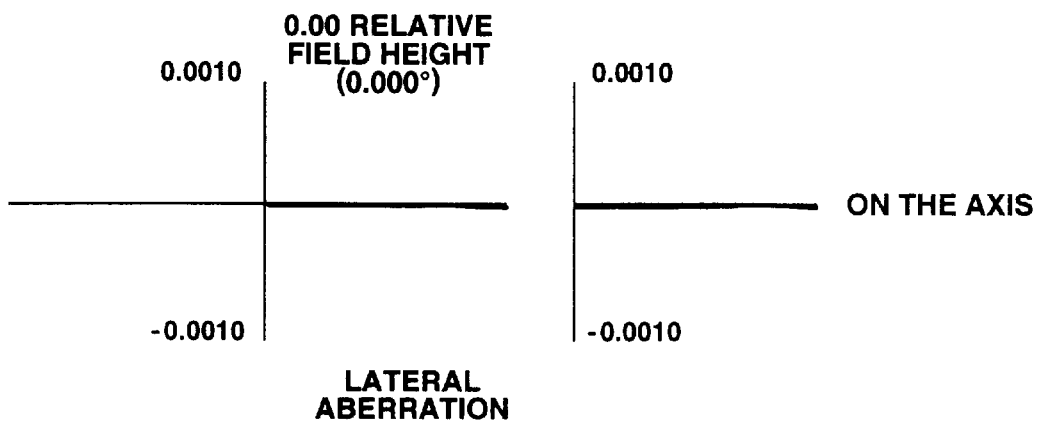
FIG. 103 is a graph showing the lateral aberration (on the axis) of the objective lens shown in FIG. 98.

An optical path is shown in FIG. 98. A graph showing distortion of the foregoing objective lens is shown in FIG. 99, astigmatism of the same is shown in FIG. 100 and spherical aberration of the same is shown in FIG. 101. A graph showing the lateral aberration (angle of view: 0.5 degree) is shown in FIG. 102 and a graph showing the lateral aberration (on the axis) is shown in FIG. 103. The conditions of the design are as shown in Table 15.

TABLE 14

| Surface | RDY (Curvature Radius) | THI (Thickness) | GLA (Name of Glass) |
|---|---|---|---|
| OBJ | Infinity | Infinity | |
| STO | Infinity | 0.0 | |
| s1 | 2.46917 | 3.042666 | FCD1 |
| | K: −0.177274 | | |
| | A: −.353215.E − 02 | B: −.452433E − 03 | C: −.556160E − 05 |
| | D: −.991159E − 05 | E: −.128023E − 07 | F: −.159371E − 06 |
| s2 | −12.58525 | 0.491772 | |
| | K: −13.032252 | | |
| | A: 0.307368E − 02 | B: 0.799138E − 04 | C: 0.242782E − 03 |
| | D: −.981829E − 04 | E: −.324027E − 04 | F: 0.162258E − 04 |
| s3 | 1.25000 | 1.481326 | BK7 |
| | K: 0.0 | | |
| | A: 0.0 | B: 0.0 | C: 0.0 |
| | D: 0.0 | E: 0.0 | F: 0.0 |
| s4 | Infinity | 0.30 | |
| | K: 0.0 | | |
| | A: 0.0 | B: 0.0 | C: 0.0 |
| | D: 0.0 | E: 0.0 | F: 0.0 |
| s5 | Infinity | 0.1 | CG |
| s6 | Infinity | 0.0 | |
| IMG | Infinity | 0.0 | |

Equation of Aspheric Surface $$X = \frac{Y^2/R}{1 + \{1 - (1+K)(Y/R)^2\}^{1/2}} + AY^6 + BY^6 + CY^8 + DY^{10} + EY^{12} + FY^{14}$$

X: depth from vertex of surface
Y: height from optical axis
R: paraxis R
K: cone constant
A: aspheric coefficient of term $Y^4$
B: aspheric coefficient of term $Y^6$
G: aspheric coefficient of term $Y^8$
D: aspheric coefficient of term $Y^{10}$
E: aspheric coefficient of term $Y^{12}$
F: aspheric coefficient of term $Y^{14}$

| | |
|---|---|
| EDP (Diameter of Entrance Pupil (mm)) | 3.7894 |
| WL (Wavelength (nm)) | 635 |
| Refractivity/Abbe's Number | |
| Name of Glass | |
| FCD1 | 1.494122/81.6 |
| BACD5 | 1.515014 |
| CG | 1.533 |
| F (Focal Distance of Overall System) | 2.3684 |
| $F_1$ (Focal Distance of Lens adjacent to Object) | 4.4767 |

TABLE 15

| Surface | RDY (Curvature Radius) | THI (Thickness) | GLA (Name of Glass) |
|---|---|---|---|
| OBJ | Infinity | Infinity | |
| STO | Infinity | 0.0 | |
| s1 | 2.42115 | 2.6000 | FCD1 |
| | K: −0.346742 | | |
| | A: −.244830E − 02 | B: −.285636E − 03 | C: −.146599E − 04 |
| | D: −.503982E − 05 | E: 0.0 | F: 0.0 |
| s2 | −13.23414 | 0.946290 | |
| | K: 23.517622 | | |
| | A: 0.319611E − 02 | B: 0.260898E − 03 | C: −.104377E − 03 |
| | D: 0.264903E − 04 | E: 0.0 | F: 0.0 |
| s3 | 1.25 | 1.4 | BK7 |
| | K: 0.0 | | |
| | A: 0.0 | B: 0.0 | C: 0.0 |
| | D: 0.0 | E: 0.0 | F: 0.0 |
| s4 | Infinity | 0.075 | |
| | K: 0.0 | | |
| | A: 0.0 | B: 0.0 | C: 0.0 |
| | D: 0.0 | E: 0.0 | F: 0.0 |
| s5 | Infinity | 0.1 | CG |
| s6 | Infinity | 0.0 | |
| IMG | Infinity | 0.0 | |

Equation of Aspheric Surface $$X = \frac{Y^2/R}{1 + \{1 - (1+K)(Y/R)^2\}^{1/2}} + AY^6 + BY^6 + CY^8 + DY^{10} + EY^{12} + FY^{14}$$

X: depth from vertex of surface
Y: height from optical axis
R: paraxis R
K: cone constant
A: aspheric coefficient of term $Y^4$
B: aspheric coefficient of term $Y^6$
G: aspheric coefficient of term $Y^8$
D: aspheric coefficient of term $Y^{10}$
E: aspheric coefficient of term $Y^{12}$
F: aspheric coefficient of term $Y^{14}$

| | |
|---|---|
| EDP (Diameter of Entrance Pupil (mm)) | 3.9571 |
| WL (Wavelength (nm)) | 680 |
| Refractivity/Abbe's Number | |
| Name of Glass | |
| FCD1 | 1.493009/81.6 |
| BACD5 | 1.513615/64.1 |
| CG | 1.5769 |
| F (Focal Distance of Overall System) | 2.4732 |
| $F_1$ (Focal Distance of Lens adjacent to Object) | 4.3923 |

Thirteenth Embodiment

An objective lens according to this embodiment has a structure in which the lenses 3 and 4 are manufactured by optical glass (FCD1) having an Abbe's number vd of 81.3 on the d-line and optical glass (BACD5) having an Abbe's number vd of 61.3.

Figure 104:
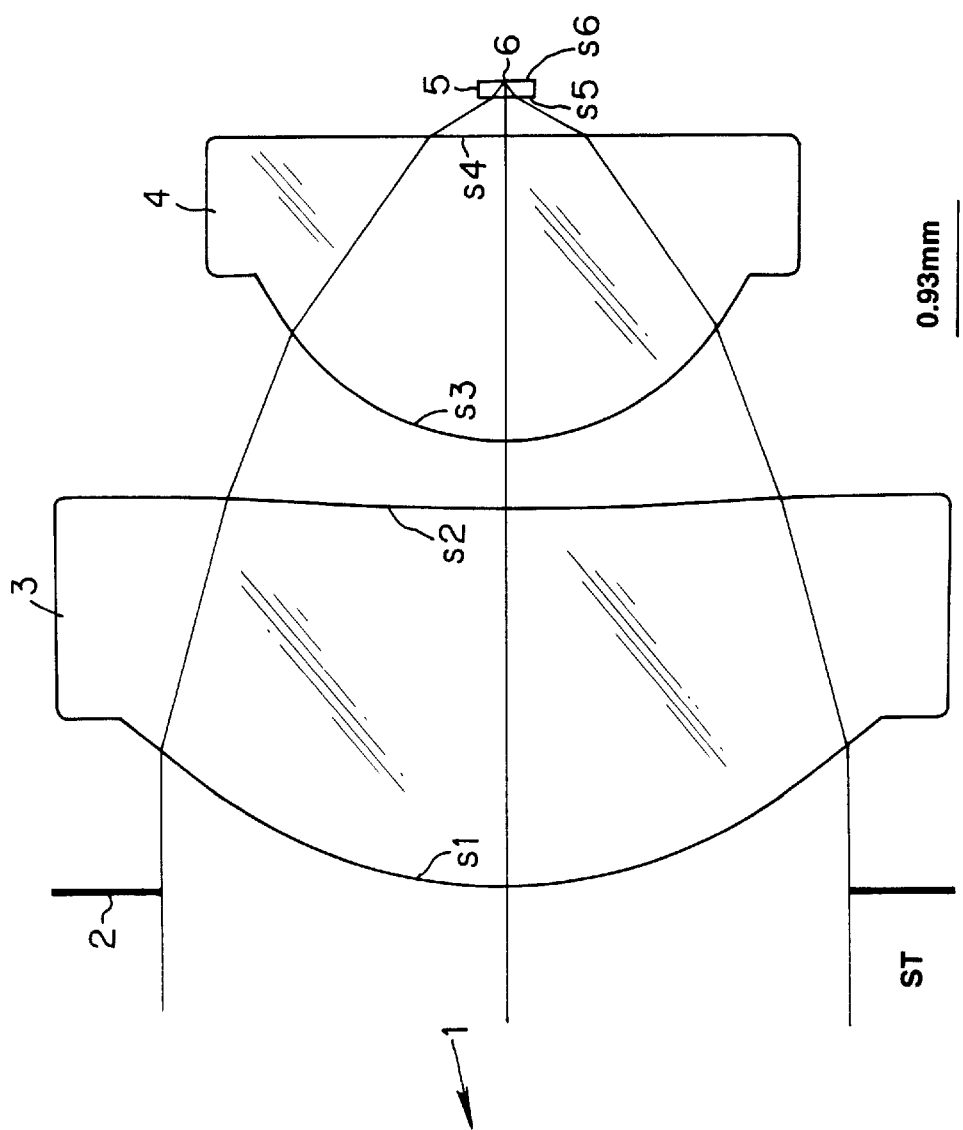
FIG. 104 is a vertical cross sectional view showing the structure of a thirteenth embodiment of the objective lens according to the present invention.
Figures 105, 106, 107:
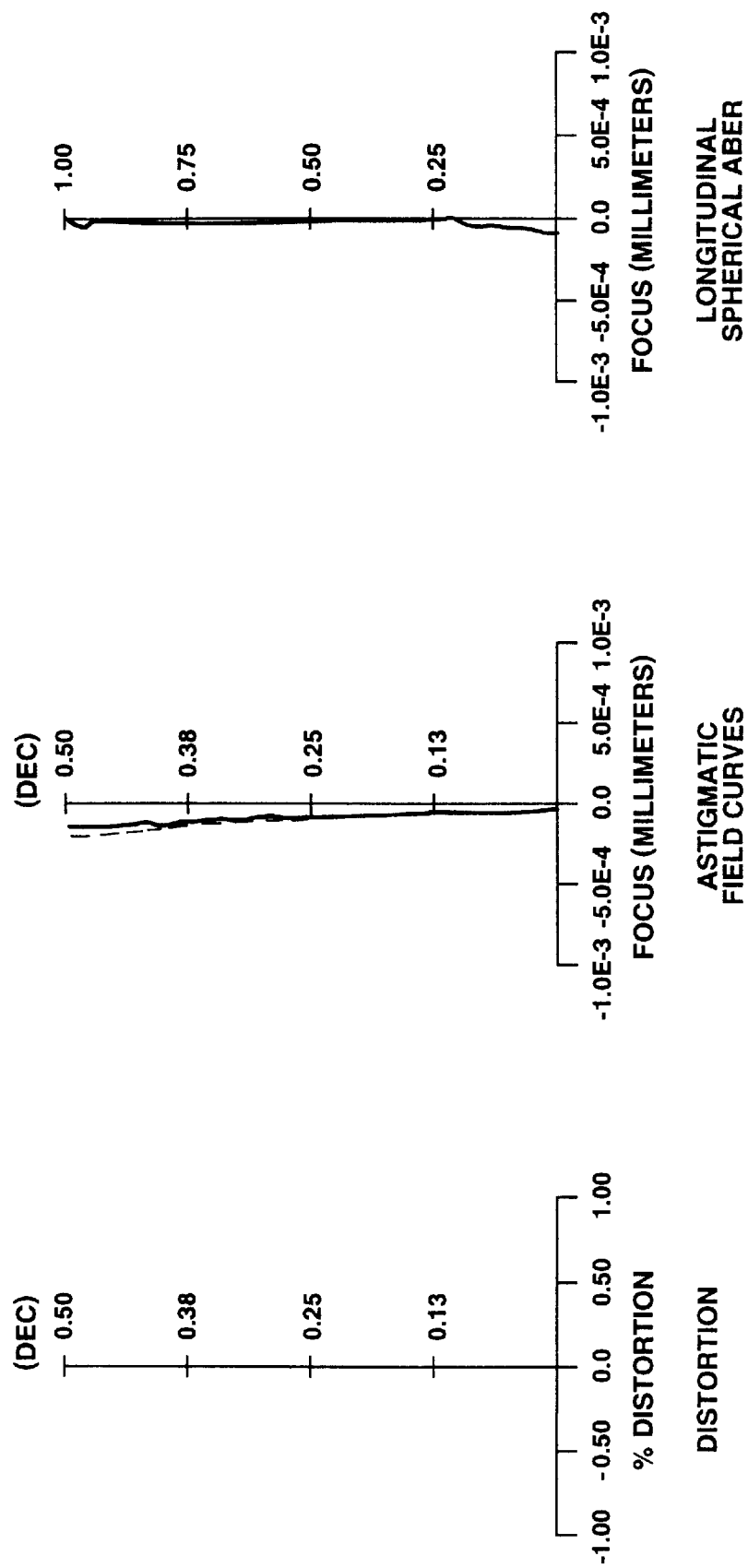
FIG. 105 is a graph showing distortion of the objective lens shown in FIG. 104.
FIG. 106 is a graph showing astigmatism of the objective lens shown in FIG. 104.
FIG. 107 is a graph showing spherical aberration of the objective lens shown in FIG. 104.
Figure 108:
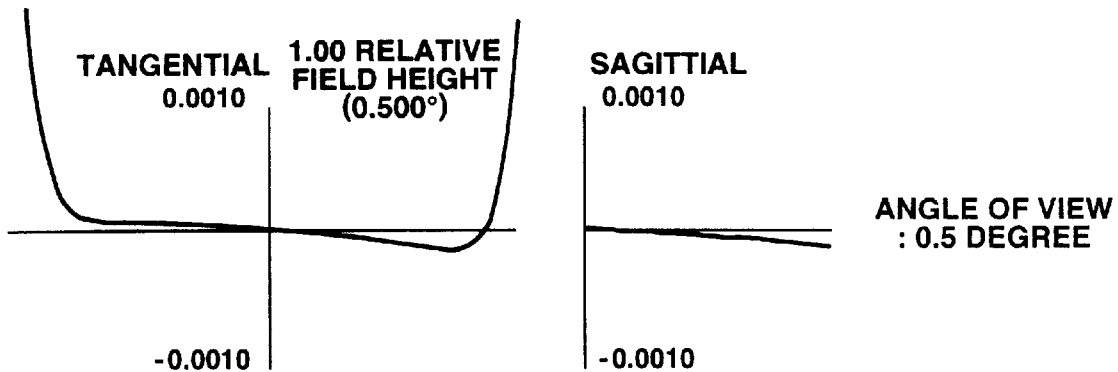
FIG. 108 is a graph showing lateral aberration (angle of view: 0.5 degree) of the objective lens shown in FIG. 104.
Figure 109:
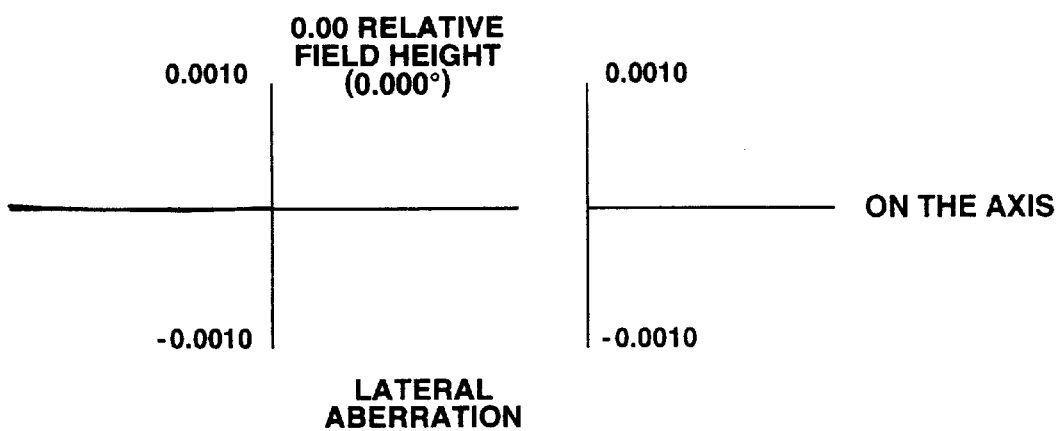
FIG. 109 is a graph showing the lateral aberration (on the axis) of the objective lens shown in FIG. 104.

An optical path is shown in FIG. 104. A graph showing distortion of the foregoing objective lens is shown in FIG. 105, astigmatism of the same is shown in FIG. 106 and spherical aberration of the same is shown in FIG. 107. A graph showing the lateral aberration (angle of view: 0.5 degree) is shown in FIG. 108 and a graph showing the lateral aberration (on the axis) is shown in FIG. 109. The conditions of the design are as shown in Table 16.

TABLE 16

| Surface | RDY (Curvature Radius) | THI (Thickness) | GLA (Name of Glass) |
|---|---|---|---|
| OBJ | Infinity | Infinity | |
| STO | Infinity | 0.0 | |
| s1 | 2.87688 | 2.571836 | FCD1 |
| | K: −0.101486 | | |

TABLE 16-continued

| Surface | RDY (Curvature Radius) | THI (Thickness) | GLA (Name of Glass) |
|---|---|---|---|
| | A: −.199167E − 02 | B: −.236129E − 03 | C: −.317683E − 04 |
| | D: −.174187E − 06 | E: −.824255E − 06 | F: 0.0 |
| s2 | 30.59199 | 0.450272 | |
| | K: 94.410598 | | |
| | A: 0.151777E − 02 | B: −.507697E − 04 | C: −.650070E − 04 |
| | D: −.178174E − 04 | E: 0.425677E − 05 | F: 0.0 |
| s3 | 1.665155 | 2.046516 | BACD5 |
| | K: −0.196808 | | |
| | A: 0.281473E − 02 | B: 0.168084E − 02 | C: −.205195E − 03 |
| | D: 0.402182E − 03 | E: −.867889E − 04 | F: 0.0 |
| s4 | 14.89061 | 0.3 | |
| | K: 0.0 | | |
| | A: 0.0 | B: 0.0 | C: 0.0 |
| | D: 0.0 | E: 0.0 | F: 0.0 |
| s5 | Infinity | 0.1 | CG |
| s6 | Infinity | 0.0 | |
| IMG | Infinity | 0.0 | |

Equation of Aspheric Surface $$X = \frac{Y^2/R}{1 + \{1 - (1+K)(Y/R)^2\}^{1/2}} + AY^6 + BY^6 + CY^8 + DY^{10} + EY^{12} + FY^{14}$$

X: depth from vertex of surface
Y: height from optical axis
R: paraxis R
K: cone constant
A: aspheric coefficient of term $Y^4$
B: aspheric coefficient of term $Y^6$
G: aspheric coefficient of term $Y^8$
D: aspheric coefficient of term $Y^{10}$
E: aspheric coefficient of term $Y^{12}$
F: aspheric coefficient of term $Y^{14}$

| | |
|---|---|
| EDP (Diameter of Entrance Pupil (mm)) | 4.5 |
| WL (Wavelength (nm)) | 635 |
| Refractivity/Abbe's Number | |
| Name of Glass | |
| FCD1 | 1.494122/81.6 |
| BACD5 | 1.587007/61.3 |
| CG | 1.533 |
| F (Focal Distance of Overall System) | 2.647 |
| $F_1$ (Focal Distance of Lens adjacent to Object) | 6.235 |

As described above, the present invention is structured such that the objective lens having a number of apertures (NA) of 0.7 is realized by a doublet lens including an aspheric surface and the optical pickup apparatus comprises the foregoing objective lens so that an optical recording medium exhibiting a high information recording density is used practically.

That is, the objective lens according to the present invention is made of the optical glass having the Abbe's number of 40 or more so that chromatic aberration is prevented even if the NA is enlarged. If a semiconductor laser is employed as the light source, the tolerance for the change in the wavelength of the semiconductor laser can be enlarged and thus the manufacturing yield can be improved.

Since the objective lens according to the present invention is structured such that the refractivity of the lens having a sharper curvature is raised, the curvature can be made to be gentle and the lens can easily be manufactured.

Since the objective lens according to the present invention is structured such that the diameter of the beam, the NA and the working distance are limited, the size of the optical pickup apparatus can be reduced, the focal distance can be shortened and the lens having a high NA can easily be manufactured. Sine the objective lens according to the present invention has a small size, the size of the biaxial actuator for moving the objective lens can be reduced.

Since the objective lens according to the present invention has the proper focal distance, the power distribution of the two lens element can be performed optimally. Thus, each lens element can easily be manufactured and the performance of the same can easily be improved, thus resulting in a satisfactory manufacturing yield.

That is, the present invention is able to provide an objective lens which is capable of satisfactorily correcting the chromatic aberration although it has a sufficiently large number of apertures (NA), the weight of which can be reduced and which can easily be manufactured.

The optical pickup apparatus according to the present invention, having the above-mentioned objective lens and adapted to the optical recording medium comprising the transparent substrate, the thickness of which is specified, is able to prevent coma-aberration. As a result, the optical recording medium can easily be manufactured.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. An objective lens comprising:

two lens elements made of optical glass having an Abbe's number of 40 or greater on a d-line and having a doublet structure, each lens element having a first and second surface, wherein at least one of said first and second surfaces of said lens elements is formed into an aspheric surface and has a numerical aperture of 0.7 or more.

2. An objective lens according to claim 1, wherein the Abbe's number of the optical glass forming the two lens elements on the d-line is 60 or greater and the number of apertures is made to be 0.8 or more.

3. An objective lens according to claim 1, wherein the relationship $n_1 > n_2$ is satisfied when the refractivity of optical glass for forming one of said lens elements, in which an angle made between a tangential plane of a plane in the periphery of the lens element and a plane perpendicular to an optical axis is larger than the angle of the other of said lens elements, is $n_1$ and the refractivity of the optical glass forming the other of said lens elements is $n_2$.

4. An objective lens according to claim 1, wherein the following relationships are satisfied if the diameter of an incidental laser beam is BW, the working distance is WD and the numerical aperture is NA:

if $$1.0 \leq BW < 4.5, \ 0.05 < WD$$

and $$0.7 \leq NA < 0.8,$$

then $$WD \leq 0.25676 BW + 0.039189,$$

if $$0.8 \leq NA < 0.9,$$

then $$WD \leq 0.14054 BW - 0.064865,$$

and if $$0.9 \leq NA,$$

then $$WD \leq 0.096429 BW - 0.244640.$$

5. An objective lens according to claim 1, wherein ratio $F_1/F$ of focal distance $F_1$ of the lens disposed on the side on which a laser beam is made incident and focal distance F of the overall system of the lens satisfies the following relationship:

$$1.7 < (F_1/F) < 2.5.$$

6. An objective lens according to claim 1, wherein the aberration of said objective lens is corrected to correspond to thickness T of a transparent substrate of an optical recording medium on a signal recording surface and supporting said signal recording surface and said objective lens satisfies the following relationships:

if $$0.7 \leq NA[\text{(the number of apertures)}] \text{ (numerical aperture)} < 0.8,$$

then $$T \leq 0.32 \text{ mm},$$

if $$0.8 \leq NA < 0.9,$$

then $$T \leq 0.20 \text{ mm},$$

and if $$0.9 \leq NA,$$

then $$T \leq 0.11 \text{ mm}.$$

7. An optical pickup apparatus comprising:

a light source; and an objective lens for converging a laser beam emitted from said light source onto a signal recording surface of an optical recording medium, wherein said objective lens has two lens elements made of optical glass having an Abbe's number of 40 or greater on a d-line and having a doublet structure, each lens element having a first and a second surface, and wherein at least one of said first and second surfaces of said lens elements is formed into an aspheric surface and has a numerical aperture of 0.7 or more.

8. An optical pickup apparatus according to claim 7, wherein the Abbe's number of the optical glass forming the two lens elements on the d-line is 60 or greater and the number of apertures is made to be 0.8 or more.

* * * * *

UNITED STATES PATENT AND TRADEMARK OFFICE
CERTIFICATE OF CORRECTION

PATENT NO.    : 6,058,095
DATED         : May 2, 2000
INVENTOR(S)   : Yamamoto et al.

Page 1 of 1

It is certified that error appears in the above-identified patent and that said Letters Patent is hereby corrected as shown below:

<u>Column 47,</u>
Line 32, the first equation should read;
-- $1.0 \leqq BW < 4.5, \ 0.05 \leqq WD$ --

Signed and Sealed this

Fourteenth Day of May, 2002

Attest:

JAMES E. ROGAN
*Attesting Officer*          *Director of the United States Patent and Trademark Office*